United States Patent
Cox

(10) Patent No.: US 10,806,649 B1
(45) Date of Patent: Oct. 20, 2020

(54) ENHANCED MOBILITY WHEELCHAIR

(71) Applicant: Kenneth Ray Cox, Arlington, TX (US)

(72) Inventor: Kenneth Ray Cox, Arlington, TX (US)

( * ) Notice: Subject to any disclaimer, the term of this patent is extended or adjusted under 35 U.S.C. 154(b) by 0 days.

(21) Appl. No.: 16/925,735

(22) Filed: Jul. 10, 2020

(51) Int. Cl.
*A61G 5/06* (2006.01)
*A61G 5/04* (2013.01)
*A61G 5/10* (2006.01)
*A61G 5/12* (2006.01)
*A61G 5/08* (2006.01)
*B60K 26/02* (2006.01)

(52) U.S. Cl.
CPC ............. *A61G 5/061* (2013.01); *A61G 5/046* (2013.01); *A61G 5/08* (2013.01); *A61G 5/1059* (2013.01); *A61G 5/1067* (2013.01); *A61G 5/127* (2016.11); *A61G 5/128* (2016.11); *B60K 26/02* (2013.01); *B60K 2026/029* (2013.01)

(58) Field of Classification Search
CPC ...... A61G 5/061; A61G 5/128; A61G 5/1059; A61G 5/127; A61G 5/046; A61G 5/1067; A61G 5/08; B60K 26/02; B60K 2026/029
See application file for complete search history.

(56) References Cited

U.S. PATENT DOCUMENTS

| | | | |
|---|---|---|---|
| 2,742,973 A | 4/1956 | Johannesen | |
| 2,931,449 A * | 4/1960 | King | B62B 5/026 180/8.2 |
| 4,512,588 A * | 4/1985 | Cox | A61G 5/023 180/8.2 |
| 4,794,999 A * | 1/1989 | Hester | A61G 5/065 180/8.2 |
| 4,993,912 A | 2/1991 | King et al. | |
| 5,423,563 A * | 6/1995 | Wild | A61G 5/061 280/250.1 |
| 5,701,965 A * | 12/1997 | Kamen | B60L 50/52 180/7.1 |
| 5,791,425 A | 8/1998 | Kaman et al. | |
| 6,311,794 B1 * | 11/2001 | Morrell | A61G 5/061 180/8.3 |
| 6,435,538 B2 | 8/2002 | Ellis et al. | |
| 6,484,829 B1 * | 11/2002 | Cox | A61G 5/061 180/8.1 |
| 6,799,649 B2 * | 10/2004 | Kamen | A61G 5/061 180/8.2 |
| 9,527,213 B2 * | 12/2016 | Luo | B25J 9/1694 |

(Continued)

*Primary Examiner* — Kevin Hurley
*Assistant Examiner* — Marlon A Arce

(57) ABSTRACT

An enhanced mobility wheelchair with semi-autonomous control logic includes criteria for selecting level, stair, and slope modes. Each mode progresses through criteria-invoked phases as the wheelchair travels. Each axis performs an assigned duty for each mode and phase combination to seek a defined target. Control logic invokes stair mode from the level mode when steps are sensed. Criteria restricts negotiating obstacle angles and heights encountered beyond capability and permits reversed travel to exit obstacle. Front and rear support systems include the ability to sense both forward and backward facing steps by adding distance sensors, sensing linkage and rotary sensors. Legrest adjustment raises the feet for forward step climbing and shortens the wheelchair length for tight turns. Steep down slope and steep up slope modes are invoked from a small angle slope mode. Absolute measurement of spider rotation and spider cam engagement does not require adjustment.

18 Claims, 29 Drawing Sheets

(56) References Cited

U.S. PATENT DOCUMENTS

| | | | |
|---|---|---|---|
| 10,597,100 B2 * | 3/2020 | Gerhardt | ............... B62D 63/04 |
| 2004/0149499 A1 | 8/2004 | Kim | |
| 2015/0272793 A1 | 10/2015 | Lu | |

* cited by examiner

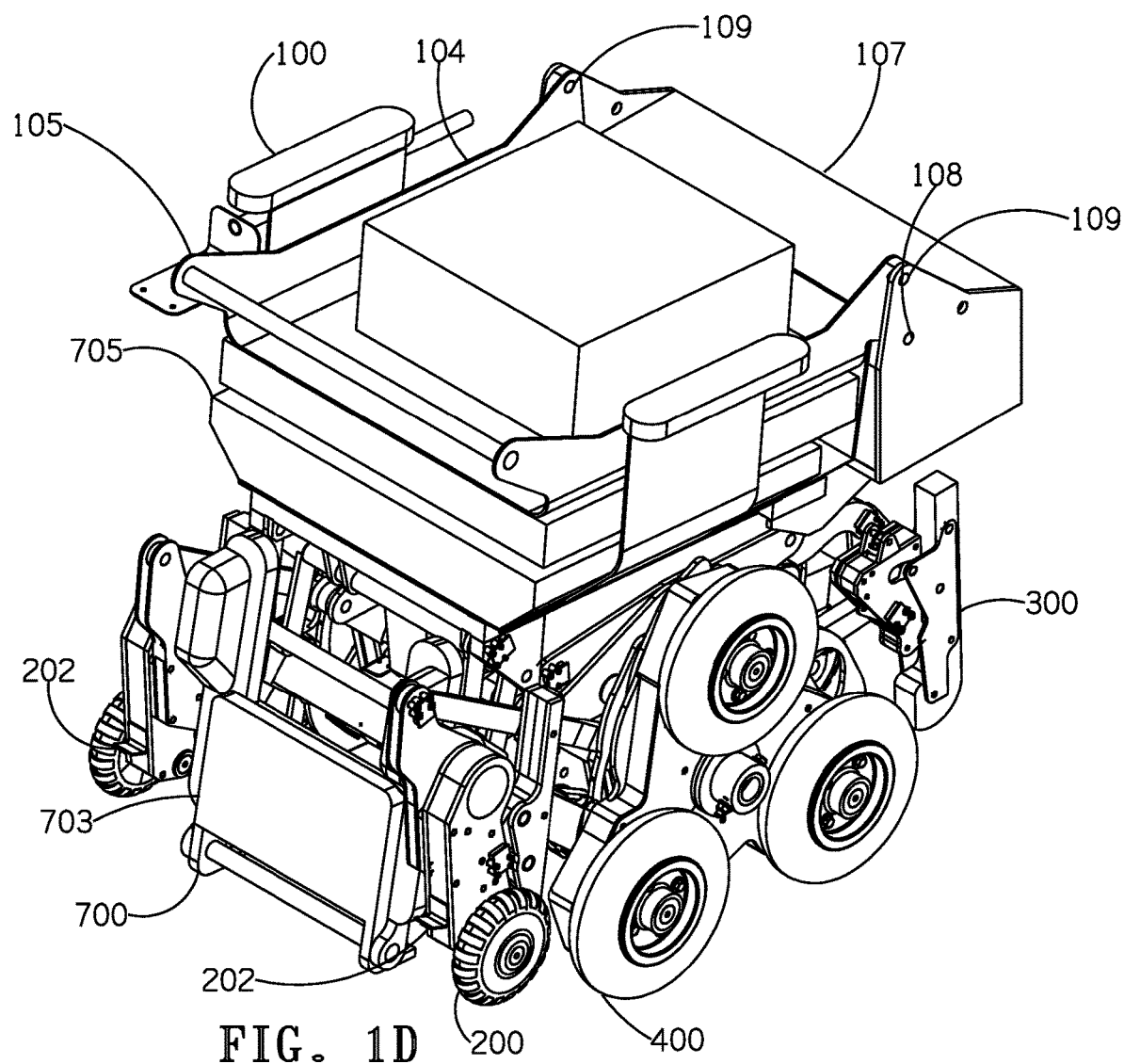

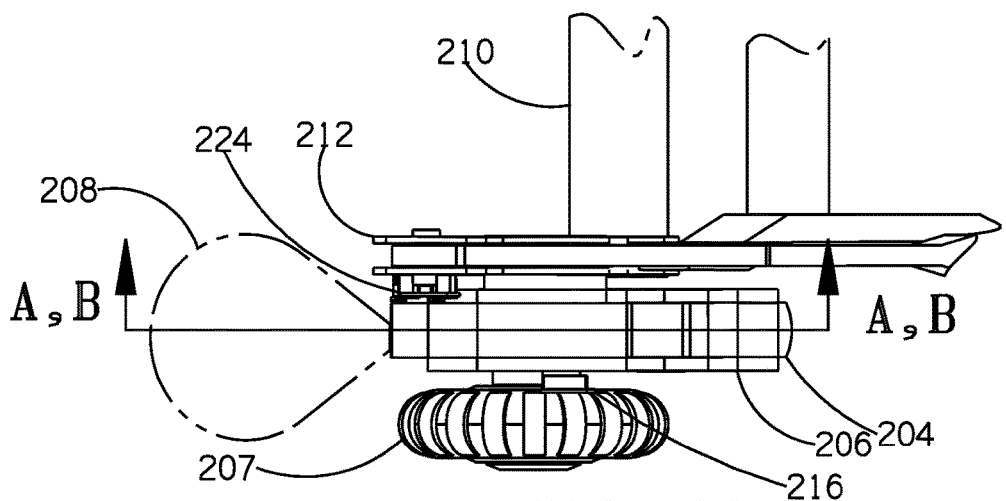
FIG. 3D
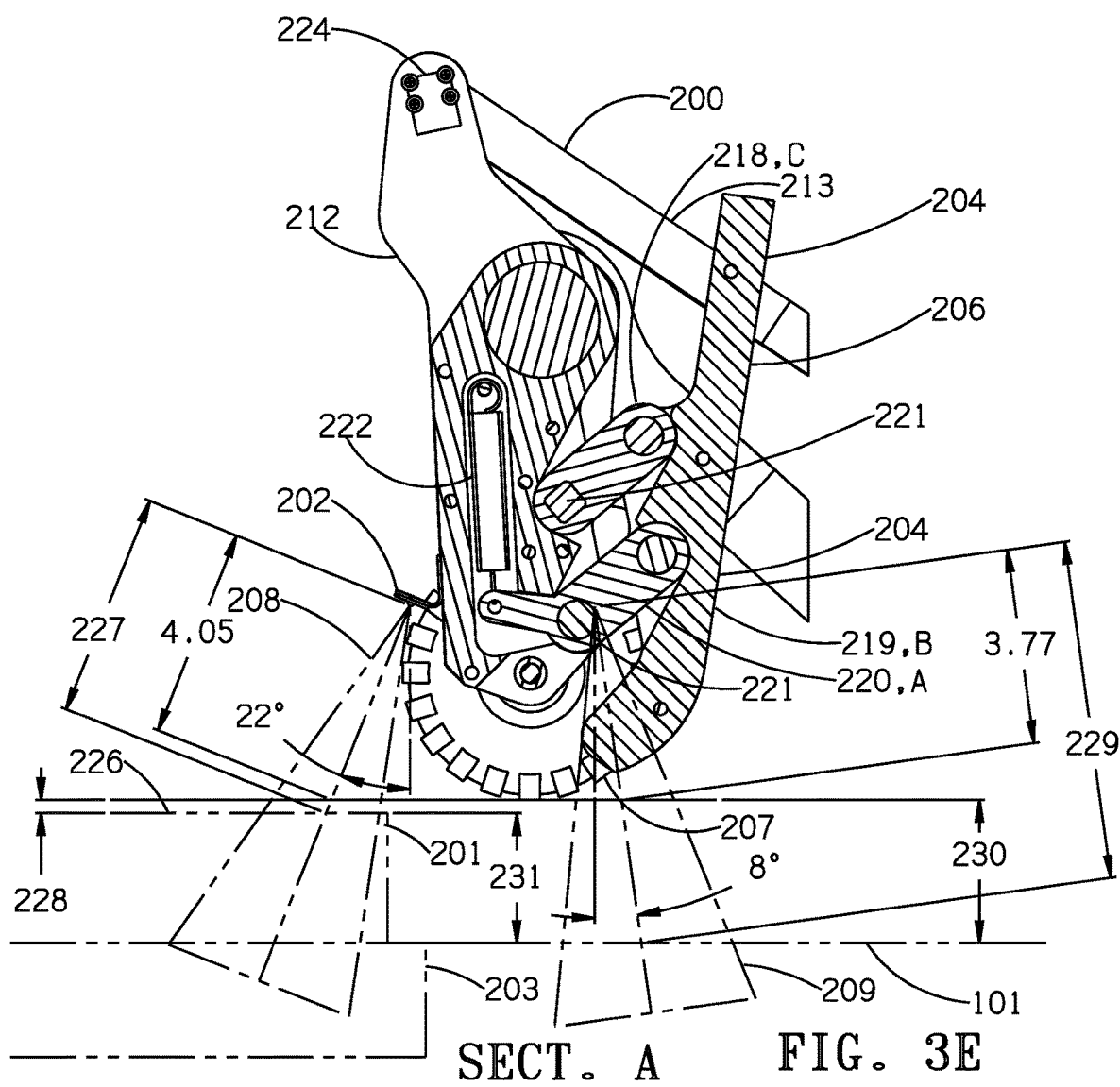
SECT. A  FIG. 3E

SECT. B

SECT. C

SECT. D

SECT. E

SECT. F

SECT. G

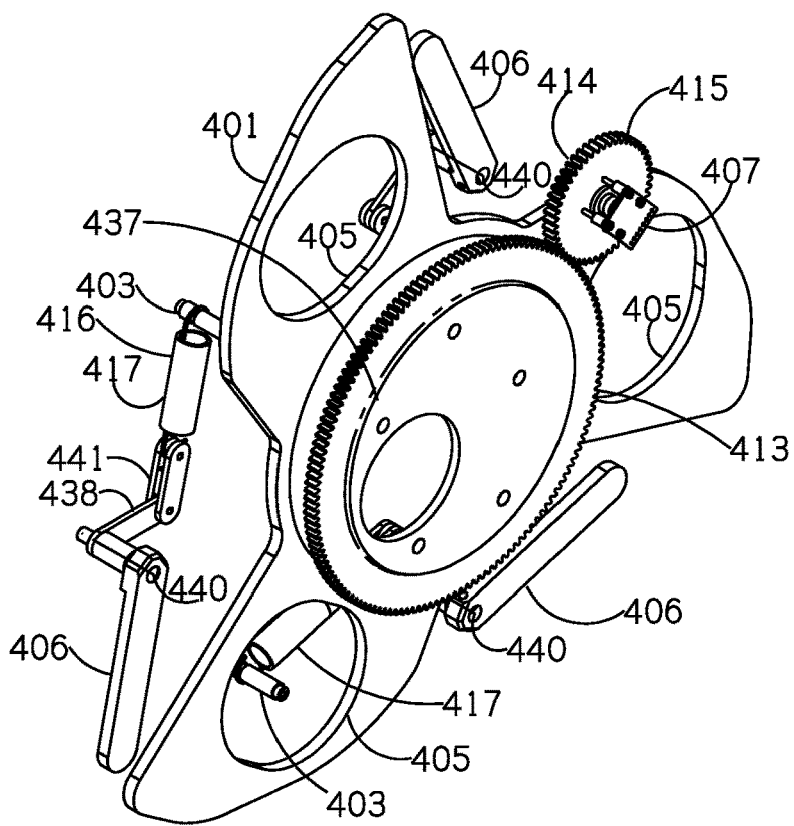
FIG. 6G
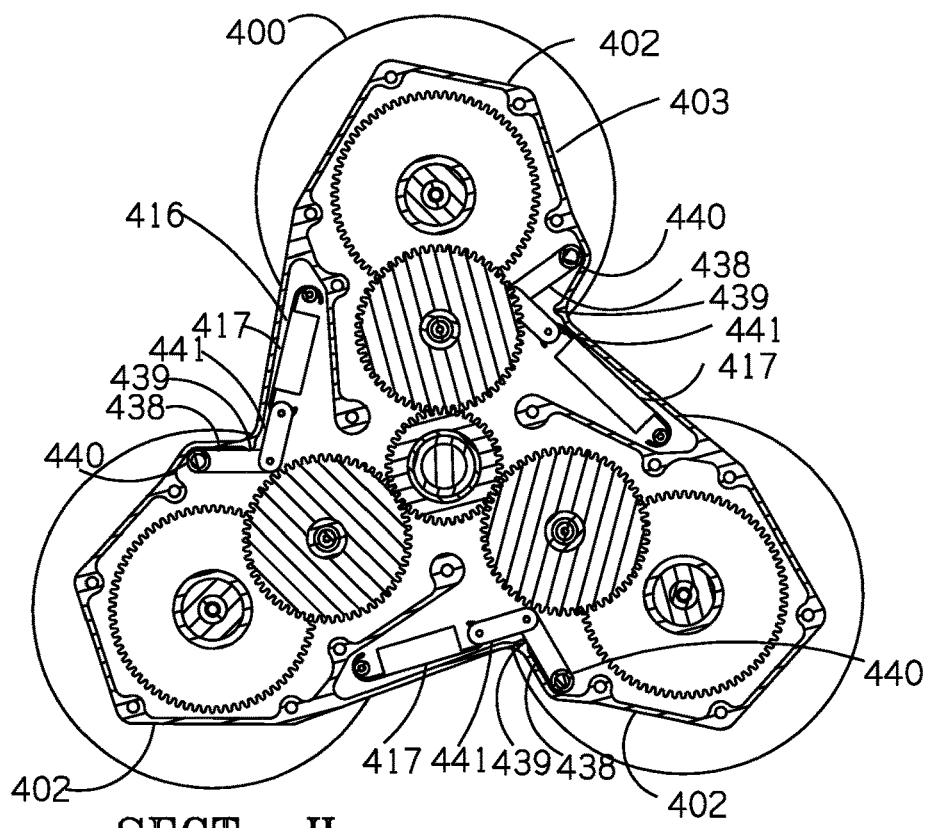
SECT. H    FIG. 6H

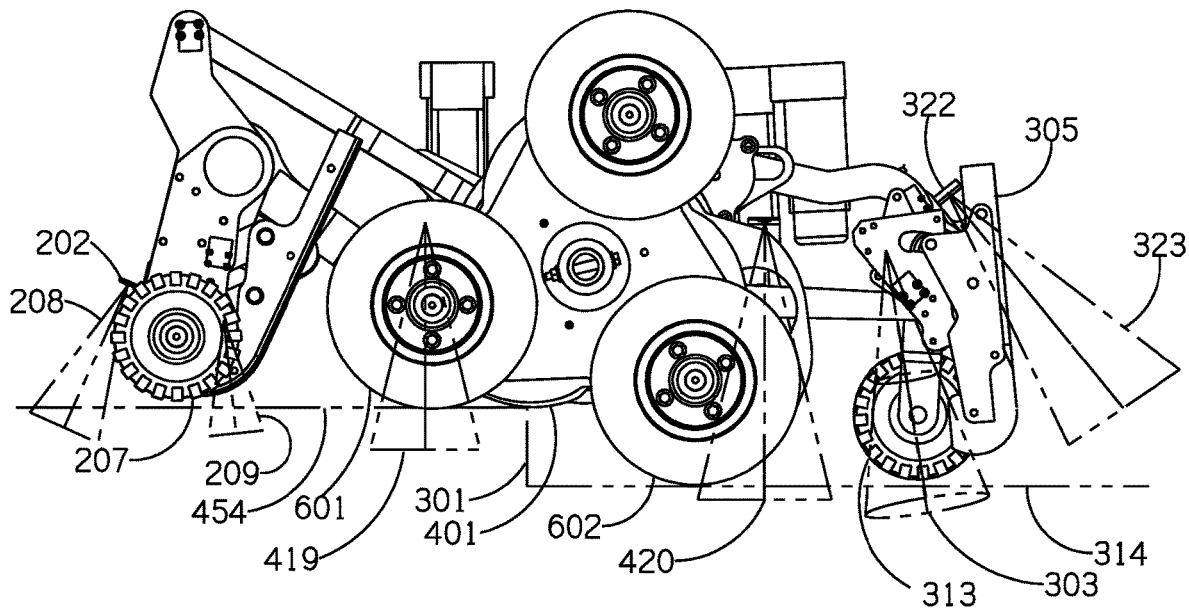
FIG. 11
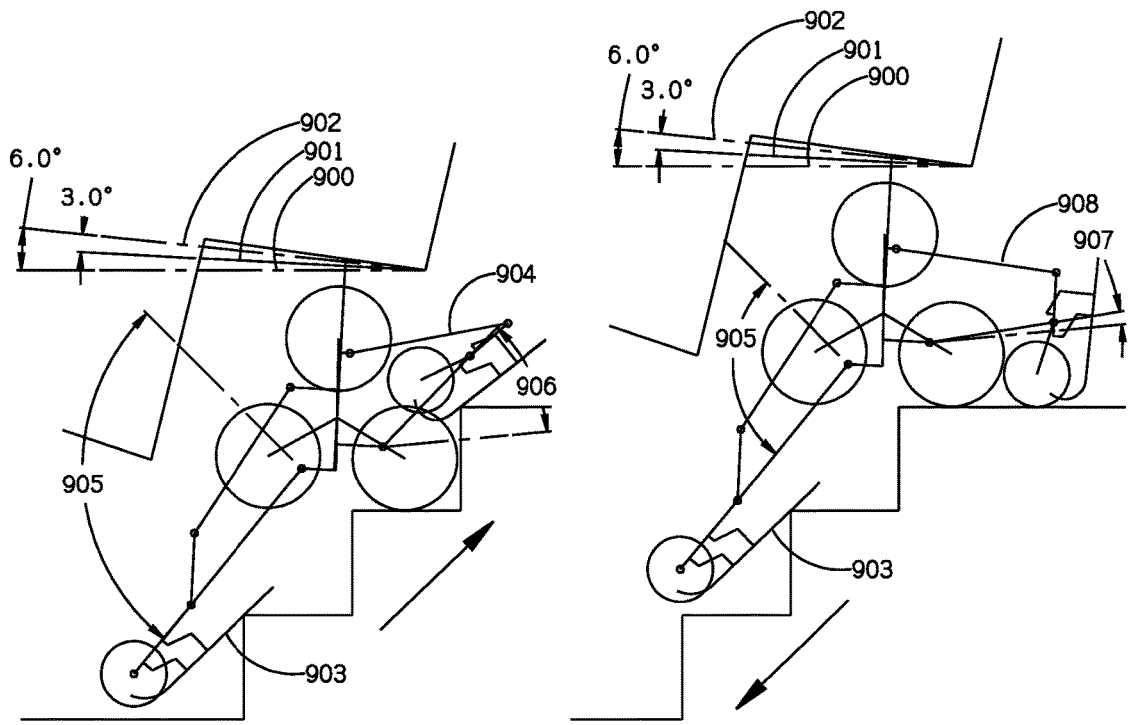
FIG. 12A
FIG. 12B

ENHANCED MOBILITY WHEELCHAIR

CROSS-REFERENCE TO RELATED APPLICATION

It is an object of this invention to define improvements over the previously patented construction by this inventor (U.S. Pat. No. 6,484,829) entitled "BATTERY POWERED STAIR-CLIMBING WHEELCHAIR" with these new designs offering semi-autonomous control logic with criteria for selecting level, stair, and slope modes, phases for each mode, duties for each axis and command values for each axis to seek target values. A further improvement is means to forward-ascend and backward-descend low height steps, adjust seat height, and adjust legrest while improving the capacity to back up high steps and climb stairs, as well as provide improved sensing spider crowd engagement of steps and stairs. A further improvement is the ability to approach operational stair angle, step height, and slope angle limits and reverse direction to avoid exceeding the operational limits. While this invention is primarily intended for use as a wheelchair for carrying occupants, it could also be used as a vehicle for transporting packages or instruments with the seating removed.

FEDERAL FUNDS STATEMENT

No Federal funds received.

BACKGROUND OF THE INVENTION

While U.S. Pat. No. 6,484,829 is well suited for aft climbing and forward descending of multiple height steps and stairs, it is not suitable for forward ascending and aft descending of even small steps. Turning around to negotiate low height steps would be a hindrance that would not be tolerated by wheelchair occupants. This invention will provide means to address rising low-height steps in the direction that the wheelchair is facing.

Large diameter wheels are well suited for single low height steps, but larger diameter wheels and tracks do not properly load stairs by resting on stair treads. While large diameter wheels and tracks have been shown to climb stairs, they require high friction to grab step edges. Inadequate coefficient of friction can result in a stair-climbing device sliding down the stairs. This invention will provide means to limit the traction required by U.S. Pat. No. 6,484,829 for balancing force provided by slanted runners resting on a step edge.

U.S. Pat. No. 6,484,829 included spring biased cams that were used to provide control signals which maintain spider crowd engagement with the steps and stairs. The means for monitoring cam angles had several issues, including adjustment slipping, failure to hold the lower cam tips off the ground, lack of absolute angle measurement and large volume required to house it. This invention addresses those issues. This invention also adds additional functions to make the wheelchair more useful including: seat height adjustment for 3-dimensional space home access, legrest forward adjustment to lift feet for forward step or slope climbing and aft legrest adjustment to shorten the wheelchair for tight turns and a folding seatback for compact transport. This invention is shown in FIG. 1A through FIG. 1D.

DETAILED DESCRIPTION OF THE INVENTION

For this invention, down steps in the direction that the wheelchair faces, such as for aft ascending and forward descending are defined as forward down steps, FDS. Up steps in the direction the wheelchair faces, such as for forward ascending and aft descending steps are defined as forward up steps, FUS. Climbing refers to either ascending or descending. The front balancing means or skid system 200 includes articulated skid runners 204 and balancing wheels, or skid wheels 207 and is named the skid system 200 and is shown in FIG. 3A. Multi-directional skid wheels are preferred for their reduce lateral operating width although they could be castering type wheels. The rear balancing means or caster system 300 includes the function of a castering wheel but also includes caster runners 319 and is named the caster system 300 and is shown in FIG. 5A. Multi-directional wheels are well known wheels such as those manufactured by Rotacaster of Australia. They provide the function of caster wheels without castering, providing reduce lateral space and a fixed fore and aft support position. The multi-directional wheels include multiple rollers around the periphery of the wheel which permit lateral motion. The runner deflection sensors include rotary sensors that monitor linkage rotation. The rotary position sensors are absolute angle sensors such as the AS5147P magnetic position sensor manufactured by AMS AG of Austria. The rotary sensors provide an electrical signal relative to the absolute angle of rotation of a shaft mounted magnet.

The U.S. Pat. No. 6,484,829 patent accommodated sensing loads from below and the rear on FDS steps by sensing rotation of linkages. This arrangement is not effective for sensing FUS steps when approaching. This invention includes optical distance sensors to indicate the presence of FUS steps. The sensors are time-of-flight, ToF, LIDAR laser distance sensors such as the VL6180 or VL53LOX made by Pololu of Las Vegas, Nev. and mounted to a small circuit board. They measure the time it takes for laser light to reach a surface and return for measuring distance. Several ToF sensors are also used in this invention to determine when a wheel is approaching an up step, approaching a down step, is contacting a surface, or is near or engaging a surface. The vehicle or wheelchair comprises multiple systems attached to a frame.

Skid System 200.

A front balancing means or a skid system 200 is provided for climbing stairs and FDS 203 steps and steep down slopes 455. When not supporting, the skid system 200 is quickly available to provide support by engaging the floor, stair tread or stair edge.

Skid system 200 engagement is monitored by three means. A pair of forward step ToF sensors 202 monitor virtual engagement to up steps 201 (FUS) forward of the skid wheel 207 (see FIG. 1C and FIG. 3A). A skid wheel-to-step ToF sensor 205 (See FIG. 3A) monitors virtual engagement of the skid wheel 207 to a horizontal surface 101 or tread 225. A pair of skid runner 204 rotary sensors 216 (FIG. 1C and FIG. 3D) monitor skid runner 204 engagement to an FDS 203 step edge. Skid system 200 engagement (SKD_EMT=Max of SKD_RN_EMT, KFT_EMT, and KWT_EMT) is the maximum engagement of any of the skid sensors 202, 205, 216. The forward step ToF sensor 202 is only included for advancing to ascend a FUS step. The skid system 200 is commanded to engage (SKD_ENG) or position control (SKD_PN) in all operations if not supporting. Engagement with the forward step sensors 202, and skid wheel-to-step sensor 205 is a range minus a wheel-to-surface distance. Engagement with the skid runners 204 is measurement of spring-loaded deflection of runners.

To engage, the skid system 200 is controlled to target a given engagement to a step in front of the skid wheel 207 (KLFT_EMT or KRFT_EMT) or is controlled to target a skid wheel 207 distance to the floor (KWT_EMT) or is controlled to target a given skid runner 204 deflection (KGLA_EMT or KGRA_EMT). The pair of skid runner 204 rotary sensors 216 are included in skid runner deflection sensing devices 206. Sensing devices 206 are included on the left and right sides of the skid system 200 and are used to control engagement, steering, or supporting as required. The wheelchair forward step height (WF_HT) 231 and advancing direction (ADV) are monitored to sense the skid system 200 approaching and up (FUS) or down step (FDS).

(SKD_APR_FUS=(WF_HT>1) & ADV) and (SKD_APR_FDS=(WF_HT<−1) & ADV) to begin the STAIR mode logic (MSL).

A positive skid engagement axis command value (SKD_ENG) lowers the skid system 200 increasing the skid system engagement (SKD_EMT) for a skid system engagement target (SKD_EN_TG) higher than the engagement (SKD_EMT).

(SKD_ENG=JEL*(SKD_EN_TG−SKD_EMT)).

A positive skid system axis position command value (SKD_PN) lowers the skid system 200 and increases the skid system position value (SKD_ANG) for an angle target (SKD_PN_TG) higher than the skid system angle.

(SKD_PN=+JEL*(SKD_PN_TG−SKD_ANG))

A positive skid system axis pitch control command value (SKD_PC) lowers the skid system 200 and raises the pitch (CHR_ATT) for target (PTC_TG) higher than the pitch.

(SKD_PC=+JEL*(PTC_TG−CHR_ATT))

Caster System 300.

The caster system 300 provides rear balance support for climbing stairs, FUS 301 steps, FDS 302 steps and steep slopes 324. The caster system 300, like the skid system 200 must be available to quickly provide support when needed. This invention includes one centrally located caster multi-direction wheel 303 for support and a caster wheel-to-step ToF sensor 304 for sensing engagement or support. Caster multi-direction wheel 303 also provides support for PHS_1, LEVEL TRAVEL, to enable lifting the aft drive wheels 602 off the horizontal surface 101 to avoid tire scrubbing. See FIG. 1C. A pair of runner deflection sensing devices 305 are located on the left and right sides for sensing FDS 302 steps. See FIG. 5E. The runner deflection sensing devices 305 are used to engage, steer, or support as required. Caster system 300 position is monitored by caster position rotary sensor 306. See FIG. 5A.

A positive caster axis engagement command value (CST_ENG) raises the caster system 300 reducing caster engagement (CST_EMT) for an engagement larger than the engagement target (CST_EN_TG).

(CST_ENG=+JEL*(CST_EMT−CST_EN_TG))

A positive caster position control command value (CST_PN) raises the caster system 300 increasing the caster position (CST_ANG) for a position target (CST_PN_TG) larger than the caster position.

(CST_PN=+JEL*(CST_PN_TG−CST_ANG))

A positive caster pitch control command (CST_PC) raises the caster system 300 increasing the pitch for a pitch target (PTC_TG) higher than the pitch (CHR_ATT).

(CST_PC=+JEL*(PTC_TG−CHR_ATT))

Spider System 400.

Drive wheels 601/602 provide primary wheelchair support on step treads 225 and other horizontal surfaces 101. To maintain the drive wheels 606 axis within step treads 225 fore and aft limits during climbing steps, spider crowd engagement (CWD_LFT and CWD_RHT) to riser is controlled. Devices existing in the prior art employed cams that rotated in unison with the wheel clusters or spiders by a gear system connecting the spider cams and the spiders. A spring-loaded joint permitted the cams to deflect as an indication of engagement. A friction joint provided adjustment means and a mechanical fuse to avoid overloading the system. These prior-art systems can slip out of adjustment and require correction. The system also did not provide an absolute angle reading, so the wheelchair must be powered up from a known spider angle to report accurate readings. The spider spoke angle (SD_ANG) 951 is measured clockwise as viewed in FIG. 1C from an aft horizontal line 457 relative to the frame to a centerline of the first spoke centerline 458. SD_ANG is an angle from 0 to 120°.

The spider system 400 addresses prior issues with new features. The means to force the spider cams 401 to move in unison with the spider spokes 402, permit limited deflection, and preload to move in unison is relocated to the spiders 403 and accomplished with posts 404 inside spider internal cam cutouts 405 in the spider cam 401 rather than with gearing. See FIG. 6B. Preloading to the unison position is provided by spring loaded cam-engaging arms 406 which operate on the spider cam 401. Monitoring the spider cams 401 rotation is provided by absolute spider cam angle rotary sensors 407. See FIG. 6E and FIG. 6G. Monitoring the spiders 403 rotation is provided by absolute spider angle rotary sensor 408 which monitors spider shaft 409 rotation. See FIG. 6I. Both sensors 407 and sensor 408 are geared to one full rotation per spider spoke 402.

The measured difference between spider 403 and spider cam 401 angles is the spider crowd engagement angle (CWD_LFT or CWD_RHT). The drive wheels 601/602 travel is controlled to a target cam engagement angle during climbing to maintain engagement to FDS 410 step riser. See FIG. 6D. The left and right cams 401 steer the spiders 403 to engage and align with the FDS 410 steps.

Front drive wheel-to-step height sensors 411 on the front side of the gearbox 102 and in line with front drive wheels 601 monitor the distance to a surface below. See FIG. 5C. When the wheelchair is descending a landing and the step is at least 4 inches below the drive wheel 601 as indicated by a distance sensor 411 and spider angle (SD_ANG), (FDS_ADV_P5=PHS_5 & ADV & (FDS_HT>4)*not CST_RN_ENGD) PHS_7D is invoked and the spider 403 rotates to descend. This provides an improved indication over the prior invention. The prior invention sensed cam rotation from cam contact on the lower side of the spider between the FDW wheel 601 and RDW wheel 602. That approach allowed a false indication in the level travel mode when the spider cams 401 contacted small surface obstacles.

RDW wheel-to-step sensor 412 is provided on the back side of the gearbox 102 and in line with the RDW wheels 602. See FIG. 2 and FIG. 5C. The RDW sensor 412 reading (RDW_RD) 956 and spider angle 951 (SD_ANG) are used to compute the RDW 602 engagement (RDW_EMT). An RDW 602 supporting indication (RDW_SUPT) verifies that the RDW wheels 602 are securely on an FUS 301 step and that the caster system 300 can be safely lifted for advancing up an FUS 301 step by invoking PHS_4. See FIG. 5C.

Spider Drive System 500.

The spider motor 501 is a brushless direct drive motor located inside the gearbox 102. See FIG. 7A. The brushless direct drive spider motor 501 and drive wheel motors 603 are more powerful and compact than the conventional brushless motor with the bevel gear arrangement of the prior patent, and provide power for faster travel speeds, faster step climbing, steeper slopes, and accommodating larger occupants while freeing up spaces for other systems. The motor 501 and motors 603 are controlled by electrical motor drives 103 at speed and direction controlled by the control system. The motor 501 and motors 603 have motor position feedback needed for brushless motor control. The electrical motor drives 103 provide position signals to the controller 104. The motors and electrical drives are ones such as those manufactured by Kollmorgen of Radford, Va.

The spider motor 501 rotor is connected to two planetary gear stages. See FIG. 7A. The output of the second stage drives the spider shaft 409 and the two spiders 403. The spider motor 501 is braked and released by spider motor brake 502 which is rotationally linked to the spider motor 501 rotor.

A positive spider rotate command (SPD_RO) increases the spider angle to ascend (BCK) an FDS 410 step and a negative command decrease the spider angle to descend an FDS step.

(SPD_RO=+JLE*(BCK−ADV)*SPDR_OK)

A positive spider pitch control command value (SPD_PC) increases the spider angle (SD_ANG) and lowers the pitch (CHR_ATT) for a pitch higher than the target (PTC_TG).

(SPD_PC=+JEL*(CHR_ATT−PTC_TG)*SP-
DR_OK).

A positive spider position control command (SPD_PN) increases the spider angle (SD_ANG) for position target (SPD_PN_TG) higher than the position.

(SPD_PN=+JEL*(SPD_PN_TG−SD_ANG)*SP-
DR_OK)

A positive spider crowd engagement control value (SPD_EN_CAM) increases spider angle (SD_ANG) and increases spider cam 401 engagement for engagement on the below the spider and with support by the forward drive wheel 601 (PHS_6 and PHS_8) for a target (SPD_EN_TG) greater than cam engagement (CWD_MIN).

(SPD_EN_CAM=+JEL*(SPD_EN_TG−CWD_MIN)

A positive spider control skid system 200 engagement value command (SPD_EN_SKD) increases spider angle (SD_ANG) lowering the skid system 200 and increasing skid system engagement (SKD_EMT) for skid system 200 engage target (SKD_EN_TG) higher than skid system 200 engagement. In the up-slope mode, MP3, the spider angle (SD_ANG) is limited to the value for up slopes by the M3_SPD_LM_OK criteria. If the slope is too steep and the spider system 400 is unable to reduce the skid engagement (SKD_EMT) to the skid engage target (SKD_EN_TG) by increasing spider angle (SD_ANG) because it is prevented by the M3_SPD_LM_OK criteria, the spider system 400 holds the spider angle (SD_ANG) position 930. The position is held until the skid engagement (SKD_EMT) is reduced to less than the skid engage target (SKD_EMT<SKD_EN_TG) and the spider system 400 resumes skid engagement SPD_EN_SKD). Limiting SD_ANG avoids the possibility of overshooting with possible support by the rear drive wheels 602 and a potential tip back on an up-slope.

(SPD_EN_SKD=JEL*((SKD_EN_TG−SKD_EMT)*
(M3_SPD_LM_OK or
(SKD_EN_TG>SKD_EMT))*SPDR_OK)

Drive System 600.

The drive system 600 is enclosed in the gearbox 102 and spiders 403 and located on the left and right side of the wheelchair 100. The drive wheel motors are brushless direct drive motors 603 located inside the gearbox 102. See FIG. 7B. The electrical motor drives 103 provide speed feedback signals to the controller 104 which it uses to compute drive wheel travel. The motor 603 rotors drive a central gear A 604 which rotates about the spider shaft 409 and drives a gear train 605 in each spider spoke 402 driving each drive wheel 606 simultaneously.

The drive wheels 606 are braked when the wheelchair is not commanded to move. The prior invention incorporated motors with spring loaded and electrically released brakes. This invention uses direct drive motors that do not include brakes. This invention includes externally mounted drive wheel brakes 607 which are geared to the drive wheel motors 603. See FIG. 7C and FIG. 7D. The brakes 607 are spring loaded and released electrically or manually. The manual release handles 608 are located on the front of the gearbox 102 and are accessible by the wheelchair occupant or an attendant. In the freewheel mode, the wheelchair can be pushed, or occupant driven by rotating the upper drive wheels 606. The manual release is held in position by a detent in either the operate or the freewheel position. The spider is braked by spider brake 502 in similar means except without the manual release. See FIG. 7A.

For advancing (ADV) or pivoting (PVT), the left turn command value (DR_JS_ST_LH) drives the right drive wheels 606 forward for a forward left turn with a positive JLA joystick axis value. Advancing (ADV) is a forward joystick deflection. Pivoting (PVT) is a lateral joystick deflection. Backing (BCK) is an aft joystick deflection. For backing (BCK), the left turn command value (DR_JS_ST_LH) drives the right drive wheels backward for a negative joystick axis value (JRA) for a backing left turn. Right turn command values (DR_JS_ST_RH) are a mirror copy of left turn values. JLA values are positive for joystick deflection forward and to the left and negative for aft and to the right. JRA values are positive for joystick deflection forward and to the right and negative for aft and to the left.

(DR_JS_ST_LH=+(JLA*(ADV+PVT)+JRA*BCK)
*TRVL_OK)

(DR_JS_ST_RH=+(JRA*(ADV+PVT)+JLA*
BCK)*TRVL_OK)

A positive left hand cam steering command value (DR_CAM_STR_LH) drives the right drive wheels forward to reduce cam engagement for a right spider crowd engagement (CWD_RHT) greater than the right spider crowd engagement target (DR_EN_TG_RH). DR_CAM_STR_RH is a mirror copy of DR_CAM_STR_LH.

(DR_CAM_STR_LH=+JLE*(CWD_RHT−
DR_EN_TG_RH)*TRVL_OK)

(DR_CAM_STR_RH=+JLE*(CWD_LFT−
DR_EN_TG_LH)*TRVL_OK)

A positive left hand caster steering command value (DR_CST_STR_LH) drives the right drive wheels forward to reduce the right hand caster runner engagement (CSRA_EMT) for a caster runner engagement greater than the caster engagement target (CST_EN_TG). The right hand caster steering command value (DR_CST_STR_RH) is a mirror copy of DR_CST_STR_LH.

(DR_CST_STR_LH=+JLE*(CSRA_EMT-CST_EN_TG)*TRVL_OK))

(DR_CST_STR_RH=+JLE*(CSLA_EMT-CST_EN_TG)*TRVL_OK))

A negative left hand skid engage command value (DR_SKD_EN_LH) with left drive wheels backing and negative JRA value drives the right drive wheels backwards to increase the right skid runner engagement (KGRA_EMT) to skid system engagement target (SKD_EN_TG). DR_SKD_EN_RH is a mirror copy of DR_SKD_EN_LH.

(DR_SKD_EN_LH=+JRA*(SKD_EN_TG-KGRA_EMT)*TRVL_OK)

(DR_SKD_EN_RH=+JLA*(SKD_EN_TG-KGLA_EMT)*TRVL_OK)

Command values are reduced by the factor TRVL_OK for safety reasons.

Legrest System 700.

Providing a low seat height requires the wheelchair occupant's feet to be raised to accommodate forward step (FUS) or UP-SLOPE mode (MP3) climbing. See FIG. 8B and FIG. 15B. This increases the wheelchair length which hinders tight turns found in homes. This invention provides an actuated legrest 700 to easily accommodate both on command. Legrest 701 are moved forward and up (LR_OP with EX_LR) for occupant comfort, forward step or slope climbing. The legrest 701 is moved aft (LR_OP with RT_LR) to shorten the wheelchair for turning in tight spaces. See FIG. 8C and FIG. 8D. A virtual legrest hinge line 702 near the occupant's knee joint will permit the occupant's feet to rest on the footrest 703 during legrest 701 movement. Adding hinge hardware near the occupant's knee would hinder occupant lateral transfers. This invention incorporates an actuated virtual hinge legrest to provide these legrest functions. Some wheelchairs with legrest elevation require a second actuator and control for footrest extension to maintain feet contacting the footrest.

A positive extend legrest command (LR_OP with RT_LR) extends legrest actuator 713 increasing the legrest angle (LR_ANG) to retract the legrest and a negative value (LR_OP with EX_LR) extends the legrest.

(LR_OP=+RT_LR-EX_LR)

Seat Height Adjustment System 800.

Seat height adjustment enhances access to high cabinets by raising the seat height or permits table approach by lowering the seat. Seat height adjustment also facilitates lateral occupant transfers by matching transfer surface heights or adjusting to move from a higher to a lower surface. The seat height adjustment system 800 is the well-known scissors type. This invention accommodates lower seat heights than the prior invention by reduced gearbox height made possible with the cam angle gear system removed. Space for a central pole type seat height adjustment system is not available.

A positive raise the seat command value (ST_OP) increases the seat angle (SH_ANG) to raise the seat and a negative value lowers the seat.

(ST_OP=+RS_ST-LW_ST)

Control System and Operations

The control system consists of multiple sensors including rotary position sensors, ToF distance sensors, an inclinometer, an occupant operated joystick, toggle switches, lighted push button switches, electric motor drives, 36-volt DC batteries, electric control cables, electric power cables, relays, and a system controller 104. The system controller includes a computer with I/O devices for reading I$^2$C and SPI and analog signals and outputting PWM or analog DC signals for motor controls and relay signals for other functions. The inclinometer provides the pitch angle 940 (CHR_ATT) of a notional frame horizontal plane 901 to horizontal 900. See FIG. 13C. Pitch targets (PTC_TG) depend on control algorithms with low pitch (PTC_LO) comprising the frame pitch angle (CHR_ATT) 940 lower than the pitch target (PTC_TG) by 3°, with high pitch (PTC_HI) comprising the frame pitch angle higher than the pitch target (PTC_TG) by 3° and level pitch (PTC_LVL)) comprising the frame pitch angle (CHR_ATT) 940 in the range between the PTC_LO and PTC_HI.

The control system provides semi-autonomous operation with three operating modes: LEVEL, STAIR, and SLOPE. The mode request and active variables are QLL, QPL, MLL, MSL, and MPL; where the first letter Q is requested, M is active, the middle letter L is LEVEL, S is STAIR, P is SLOPE, and the end letter L is logic. Each mode has phases of operation. Each operation axis has specific duties depending on the phase and sensor values related to criteria. The system is controlled by real time condition status. The control system follows the path in the FIG. 10A Operation Flow Chart, beginning with reading the sensors and ending with controlling the axis and returning to read the sensors.

Mode and phase flow paths are shown in FIG. 10B Mode and Phase Flow Chart. The occupant can request either LEVEL or SLOPE mode. If LEVEL mode is requested and current sensor values indicate that the LEVEL mode is appropriate then LEVEL mode is invoked, if not STAIR mode is invoked. The mode switches from LEVEL to STAIR when evaluation of sensor values no longer indicate that LEVEL mode is appropriate. If SLOPE mode is requested from the LEVEL mode, SLOPE mode is invoked. Once the mode is determined, the operational phase is invoked, depending upon criteria defined in the code, such as travel direction, starting up or down steps or stairs. Variables generated from sensor values are summarized in Table 1 Sensor Values. Criteria evaluated from sensor values are summarized in Table 2 Criteria Evaluation. Mode and phase selection criteria are summarized in Table 3 Mode and Phase Selection. Pitch, position, and engagement targets are summarized in Table 4 Targets. Axis duties for each operational phase are summarized in Table 5 Phase Duties. Command values for axis duties are summarized in Table 6 Duty Command Values. Operation is semi-autonomous with the occupant only requesting either LEVEL or SLOPE mode, seat height adjustment, legrest adjustment and pointing the joystick in the speed and desired direction. The control system grants the requested mode only if appropriate and defaults to the appropriate mode if not.

Runner and wheel engagement values are assigned a value from 0 to 25, with 0 being fully disengaged and 25 being fully compressed and supporting. An undeflected runner or 0° deflection is assigned an engagement value of 0. A fully deflected runner or 25° is assigned a value of 25. Engagements of the skid wheels to a front step, the skid wheels to a horizontal surface, and the caster wheel to a horizontal surface are monitored using time of flight laser sensors. Engagement range is selected to be 0.5 inches below the wheel. The engagement distance is the engagement range minus the distance of a horizontal surface below the wheel (WF_HT, KWT_HT, FDW_HT, RDW_HT, CW_HT, and WR_HT). A ToF generated engagement distance value equal to the engagement range is assigned an engagement value of 0. A distance value of 0 inches below the wheel is assigned an engagement value of 25. Engagement of the drive wheels is like the skid and caster wheels except that the vertical position of the drive wheels includes a function of spider geometry and spider angle. See FIG. 2. Spider crowd engagement (CWD_LFT or CWD_RHT) is the deflection angle of the spider cams relative to the spider angle or 0 to 5° with spider cams engaged (SPDR_ENGD) for a positive spider cam engagement.

The control values are evaluated to determine status for selecting modes and phases. A tolerance is needed to avoid reading errors. For example, a runner or engagement value of less than 3 would indicate that the device was disengaged. An engagement value of greater than 22 would indicate that the device was fully compressed or supporting. Tolerances are not included in equations in this application for simplicity. Logic criteria are assigned a value of 0 for false or 1 for true.

Limited wheelchair steering is provided on the steps by control variations from joystick inputs to the left and right drive wheel targets (DR_EN_TG_LH and DR_EN_TG_RH). When advancing (ADV) or descending stairs, a full speed left turn signal (JLA=10) decreases the left turn motor target (DR_EN_TG_LH) by 2°. A smaller left turn target results in less engagement of the spider cam 401 on the right side, which turns the wheelchair to the left by increasing the right drive wheel 606 distance to the step riser 410. Similarly, a full speed right turn signal (JRA=10) results in a right turn. If both JLA and JRA are at full speed, the left and right turns cancel, and the wheelchair descends straight. JLA value larger than JRA value results in a left turn. JRA larger than JLA value results in a right turn. In either case, the spider cams 401 always target step engagement. For ascending steps or backing (BCK), JLA and JRA are reversed to steer in the joystick pointed direction. (DR_EN_TG_LH=+5−0.2*(JLA*ADV+JRA*BCK))

(DR_EN_TG_RH=+5−0.2*(JRA*ADV+JLA*BCK))

Travel speed (DR_JS_ST, DR_CST_STR, DR_CAM_STR, DR_SKD_EN) is reduced or halted by a speed factor (TRVL_OK) as needed to provide other systems time to restore pitch errors or provide the occupant react time to avoid obstacle operational limits.

STAIR mode (MSL) travel requires the seat to be down (SH_DWN) and control logic not sensing approaching operational stair angle or step height limits (MSL_T_OK). The seat height factor (SH_FTR) is 0.0 for seat not down (not SH_DWN) for STAIR and SLOPE mode, 0.5 for seat not down (not SH_DWN) in LEVEL mode or 1.0 in LEVEL mode with seat down (SH_DWN).

SH_FTR=SH_DWN*((MSL+MPL+0.5*MLL)+0.5*MLL

MSL_T_OK includes:
1) stair angle OK for backing to ascend from a lower landing indication (STR_BCK_OK),
2) stair angle OK for advancing to descend an upper landing indication (STR_ADV_OK),
3) step height OK for backing to ascend a forward facing down step indication (FDS_BCK_OK),
4) step height OK for advancing to descend a forward facing down step indication (FDS_ADV_OK),
5) step height OK for advancing to ascend a forward facing up step indication (FUS_ADV_OK), and
6) step height OK for backing to descend a forward facing up step indication (FUS_BCK_OK) or
7) not STAIR mode (MSL).

The MSL_T_OK factor is 0.0 when traveling toward or approaching an operational angle or height limits and is 1.0 (MSL_T_OK=1) when departing or not approaching an operational obstacle limit. An MSL_T_OK=0 and reduces TRVL_OK by 90% when approaching an operational limit. It does not reduce the value when departing the operational limit, so that the wheelchair can reverse direction and abort the ascent or descent.

Stair angle OK for backing for ascending from a lower landing (STR_BCK_OK) criteria, see FIG. 12A, is confirmed by the wheelchair backing (BCK) from a lower landing and the skid system 200 can raise the wheelchair pitch (SKD_CN_R_PTC). The wheelchair backing from a lower landing is indicated by the caster system 300 raised (CST_RSD=CST_ANG>13°) 904. The skid system can raise pitch (SKD_CN_R_PTC) is indicated by the skid system 200 not full down (not SKD_DWN=SKD_ANG<96°) and supporting 903 (not (SKD_DWN and SKD_SUPT)) and the pitch not low (not PTC_LO). The criteria for backing is ignored if the direction is reversed (ADV) or if not in the STAIR mode (not MSL).

(STR_BCK_OK=BCK & CST_RSD & SKD_CN_R_PTC or ADV or not MSL).

Stair angle OK for advancing for descending from an upper landing criteria, see FIG. 12B, (STR_ADV_OK) is confirmed by the wheelchair advancing (ADV) from an upper landing and the skid system 200 can raise the wheelchair pitch (SKD_CN_R_PTC). Advancing from an upper landing is indicated by the caster system 300 not raised 908 (not CST_RSD). The criteria is ignored if the direction is reversed (BCK) or if not in the STAIR mode (not MSL).

(STR_ADV_OK=ADV & not CST_RSD & SKD_CN_R_PTC or BCK or not MSL).

The step height OK for backing for ascending an FDS step (FDS_BCK_OK) criteria, see FIG. 12C, is confirmed by the wheelchair 100 backing (BCK) from a lower landing and the forward down step height (FDS_HT) is less than the forward down step limit (FDS_HI). (DN_STP_OK=FDS_HT<FDS_HI) The FDS measurement (FDS_HT) for both ascending and descending is shown in FIG. 12D. The wheelchair backing to ascend is indicated by the caster raised (CST_RSD) 914. The criteria is ignored if the direction is reversed or if not in the STAIR mode (not MSL).

(FDS_BCK_OK=BCK & CST_RSD & DN_STP_OK or ADV or not MSL.

The step height OK for advancing for descending and FDS step (FDS_ADV_OK) criteria, see FIG. 12D, is confirmed by the wheelchair 100 advancing (ADV) from an upper landing and the FDS height (FDS_HT) is less than the front wheel down step limit (FDS_HI) (DN_STP_OK=FDS_HI<FDS_HT). The wheelchair advancing to descend is indicated by the caster not raised (not CST_RSD) 908. The criteria is ignored if the direction is reversed (BCK) or if not in the STAIR mode (not MSL).

(FDS_ADV_OK=ADV & DN_STP_OK or BCK or not MSL)

The step height OK for advancing to ascend a step (FUS_ADV_OK) criteria, see FIG. 12E, is confirmed by advancing (ADV) and ascending a step height less than the FUS step limit height 920. The FUS step limit height 920 OK for ascending is indicated by a spider angle less than the spider angle limit for forward up step (SPD_FUS_OK). The spider angle OK for forward up step (SPD_FUS_OK) is indicated by the spider angle (SD_ANG) greater than an angle consistent with spider system 400 rotated to lift a skid system full up 921 to a step height corresponding to operational step height limit height 920 for ascending a forward facing up step (FUS). For a 4 inch step per FIG. 12E the SD_ANG is 25°. (SPD_FUS_OK=SD_ANG>25°). The criteria is ignored if the direction is reversed or if not in the STAIR mode (not MSL).

(FUS_ADV_OK=ADV & SPD_FUS_OK or BCK or
not MSL)

Step height OK for backing to descend a forward up step (FUS_BCK_OK) criteria, see FIG. 12F, is confirmed by the wheelchair backing (BCK), the caster engaged (CST_ENGD), and the pitch not high (not PTC_HI). The criteria is ignored if the direction is reversed or if not in the STAIR mode (not MSL)

FUS_BCK_OK=BCK & CST_ENGD & not
PTC_HI or ADV or not MSL

The SLOPE mode (MPL) travel requires the seat to be down (SH_DWN) and control logic not sensing approaching operational slope angle limits (MPL_T_OK). MPL_T_OK includes:
1) down-slope angle OK for backing to ascend indication (DSLP_BCK_OK),
2) down-slope angle OK for advancing to descend indication (DSLP_ADV_OK),
3) up-slope angle OK for advancing criteria to ascend indication (USLP_ADV_OK), and
4) up-slope angle OK for backing to descend indication (USLP_BCK_OK) or
5) not SLOPE mode (MPL).

The MPL_T_OK factor is 0.0 when traveling toward or approaching an operational slope angle limits and 1.0 (MPL_T_OK=1) when not approaching or departing an operational slope angle limits. An MPL_T_OK=0 and reduces TRVL_OK by 90% for approaching an operational limit. It does not reduce the value when departing the operational limit, so that the wheelchair can reverse direction and abort the ascent or descent.

The down-slope angle OK for backing (BCK) for ascending from a lower landing criteria, see FIG. 13A, (DSLP_BCK_OK) is verified by backing (BCK) from a lower landing up a down-slope OK for ascending and descending. A down slope angle OK for ascending and descending is indicated by a skid angle (SKD_ANG) less than a limiting angle (SKD_DN_SL_OK). SKD_DN_SL_OK is a skid system 200 angle less than a skid angle (SD_ANG) consistent with the skid supporting on a limiting down-slope angle 923 with the spider system 400 at a spider angle (SD_ANG) for the rear drive wheel 602 supporting on a level surface (SPDR_LV_SPT=SD_ANG=32°) 925. For a limiting down-slope angle of 20° the SKD_ANG=57°. Thus:

(SKD_DN_SL_OK=SKD_ANG<57°)

Beginning the slope ascent from a lower landing is indicated by the caster system 300 raised by engagement with the slope (CST_RSD=CST_ANG>13). The criteria is ignored when the wheelchair 100 is advancing (ADV) or is not in DOWN-SLOPE mode (not MP2) (DSLP_BCK_OK=BCK & CST_RSD & SKD_DN_SL_OK & SPDR_LV_SPT or ADV or not MP2).

The down-slope angle OK for advancing for descending from an upper landing (DSLP_ADV_OK) criteria, see FIG. 13B, is verified by advancing (ADV) from an upper landing onto a down-slope OK for ascending and descending. Beginning the descent from an upper landing is indicated by the caster not raised (not CST_RSD=CST_ANG<) 13°. The criteria is ignored when the wheelchair is backing (BCK) or not in DOWN-SLOPE mode (not MP2);

(DSLP_ADV_OK=ADV & not CST_RSD &
SKD_DN_SL_OK & SPDR_LV_SPT or BCK
or not MP2).

The up-slope OK for advancing (ADV) to ascend from a lower landing (USLP_ADV_OK) criteria is verified by advancing (ADV) from a lower landing to an up-slope, the caster can lower pitch (CST_CN_L_PTC) and on an up-slope less than a limiting up-slope angle. The up-slope angle OK (M3_SPD_LM_OK) is indicated by a spider angle (SD_ANG) 930 less than a spider angle for the front drive wheels 601 contacting a limiting up-slope 934 connecting the skid wheels 207 with the skid system 200 full up (SKD_UP) to the caster wheel 303 with said caster system 300 full down (CST_DWN) and the seat frame level (PTC_LVL). See FIG. 13C. The spider angle limit for a 15° up slope limiting angle 933 is 41° (SD_ANG=41°) 930. Advancing from a lower landing is indicated by the skid system 200 raised (SKD_RSD=SKD_ANG<9.5°) 931. The caster can lower pitch if either the caster is not full down (not CST_DWN), not supporting (not CST_SUPT) or pitch is not high (not PTC_HI)

(CST_CN_L_PTC=not CST_DWN or not
CWT_SUPT or not PTC_HI).

The USLP_ADV_OK criteria is ignored when the wheelchair is backing (BCK) or not in UP-SLOPE mode (not MP3);

(USLP_ADV_OK=ADV & SKD_RSD &
CST_CN_L_PTC & M3_SPD_LM_OK or BCK
or not MP3).

The up-slope OK for backing for descending from an upper landing (USLP_BCK_OK) criteria, see FIG. 13D, is verified by backing (BCK) from an upper landing down an up-slope, the caster can lower pitch (CST_CN_L_PTC) and on a slope less than the up limit angle 934 with up-slope angle criteria OK (M3_SPD_LM_OK). Backing from an upper landing is indicated by the skid system 200 not raised 938 (not SKD_RSD=SKD_ANG>9.5°) 931. The criteria is ignored when the wheelchair is advancing (ADV) or not in UP-SLOPE mode (not MP3);

(USLP_BCK_OK=BCK & not SKD_RSD &
CST_CN_L_PTC & M3_SPD_LM_OK or
ADV or not MP3).

The speed factor (TRVL_OK) is reduced to 10% by any of the following:
1) not stair and step travel OK (not MSL_T_OK) or
2) not slope travel OK (not MPL_T_OK)

The speed factor (TRVL_OK) is reduced to zero by any of the following
1) the skid system 200 is not engaged or not LEVEL mode (not SKD_ENGD or not MLL),
2) the caster system 300 is not engaged (not CST_ENGD), or
3) the skid system 200 and caster system 300 are both supporting (not SKD_CST_NB_SUPT).

The skid system 200 does not engage in the LEVEL mode because it is not needed for potential balance support. STAIR Mode with skid system 200 engagement (SKD_ENG) is invoked when an FDS or FUS is encountered.

The travel speed factor (TRVL_OK) also includes a pitch factor (PTC_FTR) and a roll factor (ROLL_FTR) for reducing speed when the pitch (CHR_ATT) deviates from the pitch target value (PTC_TG), see FIG. 4A, or the wheelchair rolls (ROLL_ATT) to the left or right side. See FIG. 4B for the seat height speed factor. The PTC_FTR is a function of pitch (CHR_ATT) and a pitch target (PTC_TG) and varies from 1.0 with pitch at target to 0.0 for 6° off target. The roll factor (ROLL_FTR) is a function of wheelchair roll (ROLL_ATT) and varies from 1.0 with no roll and 0.0 with a 6° roll to either side. This provides an opportunity for the system to correct the pitch or provides the occupant a warning and time to react to a lateral tilt. A zero pitch factor value (PTC_FTR) or roll factor value (ROLL_FTR) reduces the travel factor to 0.1 (TRVL_OK=0.1). The seat height factor (SH_FTR) reduces speed to 50% for raised in the LEVEL mode and halts travel motion for raised in the STAIR or SLOPE mode (SH_FTR=SH_DWN*(MSL+ MPL+0.5*MLL)+0.5*MLL).

The control system controls all axis based on algorithm and with minimal inputs from the occupant for semi-autonomous control.

TABLE 1

| T1: Name | Sensor/Signal | Variable Name | Range[1] | Unit |
|---|---|---|---|---|
| Left skid runner reading | Rotary sensor 216 | KGLA_EMT | 0 to 25 | degrees |
| Right skid runner reading | Rotary sensor 216 | KGRA_EMT | 0 to 25 | degrees |
| Left forward step reading 227 | ToF sensor 202 | KLFT_RD | 4 to 12 | inches |
| Right forward step reading 227 | ToF sensor 202 | KRFT_RD | 4 to 12 | inches |
| Skid wheel sensor to step reading 229 | ToF sensor 205 | KWT_RD | 3 to 13 | inches |
| Skid angle (translated to torque tube 211 angle) measured from full up | Rotary sensor 224 | SKD_ANG | 0 to 96 | degrees |
| Left caster runner engagement, measured from extended | Rotary sensor 312 | CSLA_EMT | 0 to 25 | degrees |
| Right rear runner engagement measured from extended | Rotary sensor 312 | CSRA_EMT | 0 to 25 | degrees |
| Caster wheel-to-step reading 329 | ToF sensor 304 | CWT_RD | 9 to 12 | inches |
| Rear step sensor reading 326 | ToF sensor 322 | RSTP_RD | 8 to 20 | inches |
| Caster angle (translated to torque tube A 311) | Rotary sensor 306 | CST_ANG | −17 to 41 | degrees |
| Left spider cam reading | Rotary sensor 407 | SL_ANG_RD | 0 to 360 | degrees |
| Spider shaft reading | Rotary sensor 408 | SD_ANG_RD | 0 to 360 | degrees |
| Right spider cam reading | Rotary sensor 407 | SR_ANG_RD | 0 to 360 | degrees |
| Left front drive wheel sensor to step reading | ToF sensor 411 | LFDW_RD | 5.5 to 15 | Inches |
| Right front drive wheel sensor to step reading | ToF sensor 411 | RFDW_RD | 5.5 to 15 | Inches |
| Rear drive wheel sensor to a step reading | ToF sensor 412 | RDW_RD | 5.5 to 15 | Inches |
| Left turn joystick in control device 106 | Rotary sensor 110 | JLA | −10 to 10 | units |
| Right turn joystick in control device 106 | Rotary sensor 111 | JRA | −10 to 10 | units |
| Left drive speed signal (motor on right side) from electrical motor drive 103 | feedback signal 112 | LD_SPD | unlimited | rev/sec |
| Right drive speed signal (motor on left side) from electrical motor drive 103 | feedback signal 113 | RD_SPD | unlimited | rev/sec |
| Chair pitch attitude from inclinometer in controller 104: feet up positive | Inclinometer pitch signal 114 | CHR_ATT | −20 to 20 | degrees |
| Inclinometer roll Chair roll attitude from inclinometer in controller 104: right up positive | ROLL_ATT signal 115 | | −20 to 20 | degrees |

TABLE 1-continued

Sensor Values

| T1: Name | Sensor/Signal | Variable Name | Range[1] | Unit |
|---|---|---|---|---|
| Legrest: LR_ANG = 0 for full extended | Rotary sensor 714 | LR_ANG | 0 to 52 | degrees |
| Seat height angle: SH_ANG = 0 for full down | Rotary sensor 810 | SH_ANG | 0 to 40.1 | degrees |
| Extend legrest switch in control device 106 | extend switch 116 | EX_LR | 0 or 1 | on/off |
| Retract leg rest switch in control device 106 | retract switch 117 | RT_LR | 0 or 1 | on/off |
| Raise seat switch in control device 106 | raise seat switch 118 | RS_ST | 0 or 1 | on/off |
| Lower seat switch in control device 106 | lower seat switch 119 | LW_ST | 0 or 1 | on/off |
| LEVEL mode request switch in control device 106 | Level switch 120 | QLL | 0 or 1 | on/off |
| Slope mode request switch in control device 106 | Slope switch 121 | QPL | 0 or 1 | on/off |

[1] Zero values at components undeflected and in level mode positions shown in FIG.1C.

TABLE 2

Criteria Evaluation

| T2: Description | Variable | Criteria | Units |
|---|---|---|---|
| Left runner engaged | KGLA_ENGD | KGLA_EMT > 0 | 0/1 |
| Right runner engaged | KGRA_ENGD | KGRA_EMT > 0 | 0/1 |
| Left skid wheel height 228 to forward step surface 226 | KLFT_HT | (KLFT_RD-4.05) * cosine (22°) | 0 to 12 + inches |
| Right skid wheel height 228 to forward step surface 226 | KRFT_HT | (KRFT_RD-4.05) * cosine (22°) | 0 to 12 + inches |
| Skid wheel-to-step height 230 | KWT_HT | (3.73-KWT_RD) * cosine (8.8°) | inches |
| Wheelchair forward step height 231 | WF_HT | the largest of KLFT_HT − KWT_HT & KRFT_HT − KWT_HT | inches |
| Left forward step engagement (for approaching FUS step) | KLFT_EMT | 25 * (W_EN_RG − KLFT_HT)/ W_EN_RG | 0 to 25 |
| Right forward step engagement (for approaching FUS step) | KRFT_EMT | 25 * (W_EN_RG-KRFT HT)/ W_EN_RG | 0 to 25 |
| Forward step engagement (for approaching FUS step) | KFT_EMT | Max of KLFT_EMT or KRFT_EMT) * ADV | 0 to 25 |
| Forward step engaged | KFT_ENGD | (KLFT_EMT > 0 or KRFT_EMT > 0) & ADV | 0/1 |
| Skid wheel 207 engagement | KWT_EMT | (.5-KWT_HT) * 25/.5 | 0 to 25 |
| Skid wheel 207 supporting | KWT_SUPT | KWT_EMT = 25 | 0/1 |
| Skid wheel 207 engaged | KWT_ENGD | KWT_EMT > 0 | 0/1 |
| Skid runners 204 engaged | SKD_RN_ENGD | KGLA_ENGD or KGRA_ENGD | 0/1 |
| Skid runners 204 supporting | SKD_RN_SUPT | KGLA_EMT = 25 or KGRA_EMT = 25 | 0/1 |
| Skid system 200 engaged | SKD_ENGD | SKD_RN_ENGD or KFT_ENGD or KWT_ENGD | 0/1 |
| Skid system 200 supporting | SKD_SUPT | SKD_RN_SUPT or KWT_SUPT | 0/1 |
| Skid runner 204 engagement | SKD_RN_EMT | Max of KGLA_EMT and KGRA_EMT | 0 to 25 |
| Skid system 200 engagement | SKD_EMT | Max of SKD_RN_EMT, KFT_EMT, and KWT_EMT | 0 to 25 |

TABLE 2-continued

Criteria Evaluation

| T2: Description | Variable | Criteria | Units |
|---|---|---|---|
| Skid system 200 full up | SKD_UP | SKD_ANG = 0° | 0/1 |
| Skid wheel 207 raised 1.5" or more above horizontal | SKD_RSD | SKD_ANG < 9.5° | 0/1 |
| Skid wheel 207 1" below horizontal | SKD_LOW | SKD_ANG > 22.1° | 0/1 |
| Left or right skid wheel 207 approaching FUS | SKD_APR_FUS | (WF_HT > 1) & ADV | 0/1 |
| Left or right skid wheel 207 approaching FDS | SKD_APR_FDS | (WF_HT < −1) & ADV | 0/1 |
| Skid system 200 above down-slope limit | SKD_DN_SL_OK | (SKD_ANG < 57°) & SPDR_LV_SPT | 0/1 |
| Skid system 200 full down | SKD_DWN | SKD_ANG = 96° | 0/1 |
| Skid lift OK for PHS_5 | SKD_LFT_5_OK | SKD_LOW & PHS_5 & BCK & SKD_RN_ENGD | 0/1 |
| Skid system 200 can raise pitch | SKD_CN_R_PTC | not SKD_DWN & SKD_SUPT & not PTC_LO | |
| Caster runner 319 engagement | CST_RN_EMT | Max of CSLA_EMT & CSRA_EMT engagement | 0 to 25 |
| Caster runners 319 engaged | CST_RN_ENGD | CSLA_EMT > 0 or CSRA_EMT > 0 | 0/1 |
| Caster runners 319 supporting | CST_RN_SUPT | CSLA_EMT = 25 or CSRA_EMT = 25 | 0/1 |
| Caster wheel-to-step height 330 | CWT_HT | (CWT_RD − 8.8) * cosine (5.0°) | inches |
| Caster wheel 303 engagement | CWT_EMT | (.5 − CWT_HT) * 25/.5 | 0 to 25 |
| Caster wheel 303 engaged | CWT_ENGD | CWT_EMT > 0 | 0/1 |
| Caster wheel 303 supporting | CWT_SUPT | CWT_EMT = 25 | 0/1 |
| Caster system 300 engaged | CST_ENGD | CST_RN_ENGD or CWT_ENGD | 0/1 |
| Caster system 300 supporting | CST_SUPT | CST_RN_SUPT or CWT_SUPT | 0/1 |
| Caster system 300 engagement | CST_EMT | Max of CST_RN_EMT * not PHS_9A or CWT_EMT | 0 to 25 |
| Caster system 300 full up | CST_UP | CST_ANG = 41° | 0/1 |
| Caster system 300 at horizontal | CST_HORZ | CST_ANG = 2° | 0/1 |
| Caster raised 904, 915 | CST_RSD | CST_ANG > 13° | 0/1 |
| Caster full down 937 | CST_DWN | CST_ANG = −17° | 0/1 |
| Caster system 300 can lower MP3 pitch | CST_CN_L_PTC | not CST_DWN or not CWT_SUPT or not PTC_HI | 0/1 |
| Wheelchair rear step height 327, 328, 332 | WR_HT | (12.7 − RSTP_RD) * cosine (31°) + CWT_HT | 8 to −3 |
| Rear low step: caster at .5 to 4" FDS step 428 | RE_LO_STP | .5 < WR_HT < 4 | 0/1 |
| Rear high step: caster at FDS > 4" FDS step 410 | RE_HI_STP | WR_HT ≥ 4 | 0/1 |
| Caster wheel 303 at FUS < −.5" and backing | CST_APR_FUS | (WR_HT < −.5) & BCK | 0/1 |
| Left spider cam angle (trimmed to zero at aft horizontal) | SL_ANG | SL_ANG_RD/3 + $C_t$ | 0-120 degrees |
| Spider shaft angle (trimmed to zero at aft horizontal) | SD_ANG | SD_ANG_RD/3 + $C_t$ | 0-120 degrees |
| Right spider cam angle (trimmed to zero at aft horizontal) | SR_ANG | SD_ANG_RD/3 + $C_t$ | 0-120 degrees |
| Left spider crowd engagement angle (120 added if needed for positive value) | CWD_LFT[2] | SD_ANG − SL_ANG + 120 * (SL_ANG > SD_ANG) | 0-5 Degrees |
| Right spider crowd engagement angle (120 added if needed for positive value) | CWD_RHT[3] | SD_ANG − SL_ANG + 120 * (SL_ANG > SD_ANG) | 0-5 Degrees |
| Spider crowd engagement-minimum | CWD_MIN | Least of CWD_LFT CWD_RHT | Degrees |

TABLE 2-continued

Criteria Evaluation

| T2: Description | Variable | Criteria | Units |
|---|---|---|---|
| Spider crowd cams engaged | SPDR_ENGD | CWD_LFT > 0 or CWD_RHT > 0 | 0/1 |
| Spider angle range for 4-wheel drive | SPDR_4WD | 20° < SD_ANG < 60° | 0/1 |
| Spider system 400 on step | SPDR_ON_STP | 24° < SD_ANG < 36° | 0/1 |
| Spider system 400 position for level surface support 925 | SPDR_LV_SPT | SD_ANG = 32° | 0/1 |
| Drive travel from spider rotation | TRVL_SPDR | $\Delta$ SD_ANG * 4 * $\pi$/180° | Inches |
| step height limit for FDS steps | FDS_HI | 8.4[4] | inches |
| Advancing to high down step from an upper landing | FDS_ADV_P5 | SPDR_ON_STP & ADV & (FDS_HT > 4) * not CST_RN_ENGD | 0/1 |
| Average front drive wheel height above surface | FDW_RD | (LFDW_RD + RFDW_RD)/2 | inches |
| Front drive wheel height sensor above surface | FDW_HT | FDW_RD −1.7 −6.0 * sine (180°-SD_ANG) − 4.0 | FDW |
| Wheel engagement range | W_EN_RG | .5 | inches |
| Front engagement distance | FDW_ED | W_EN_RG − RDW_HT | inches |
| Front drive wheel engagement | FDW_EMT | 25 * FDW_ED/W_EN_RG | 0 to 25 |
| Front drive wheel engaged | FDW_ENGD | FDW_EMT > 0 | 0/1 |
| Front drive wheel supporting | FDW_SUPT | FDW_EMT = 25 | 0/1 |
| Rear drive wheel height sensor above surface | RDW_HT | RDW_RD − 1.7 − 6.0 * sine (SD_ANG) − 4.0 | inches |
| Rear drive wheel engagement distance | RDW_ED | W_EN_RG − RDW_HT | inches |
| Rear drive wheel engagement | RDW_EMT | 25 * RDW_ED/W_EN_RG | 0 to 25 |
| Rear drive wheels supporting | RDW_SUPT | RDW_EMT = 25 | 0/1 |
| Spider front drive wheels on FUS | SPDR_ON_FUS | (SD_ANG > 33°) & FDW_SUPT | 0/1 |
| Spider rear drive wheels on FDS | SPDR_ON_FDS | SD_ANG < 20° and RDW_SUPT | 0/1 |
| Seat height stroke | SH_STK | 13.44 * sine (SH_ANG + 9.65°) | inches |
| Seat height full up | SH_UP | SH_STK = 8 | 0/1 |
| Seat height full down | SH_DWN | SH_STK = 0 | 0/1 |
| Forward down step (FDS) height | FDS_HT | FDW_RD −13.0 * sine (CHR_ATT) − RDW_RD | 0 to 10 in |
| FDS step height OK for climbing | DN_STP_OK | FDS_HT < FDS_HI | 0/1 |
| Pitch speed factor, See FIG. 4A | PTC_FTR | For (−6° > CHR_ATT-PCT_TG < 6°) factor is 1 − .0278 * (CHR_ATT-PTC_TG) ^ 2 Else = 0 | |
| Chair side roll speed factor, See FIG. 4B | ROLL_FTR | For (−6° < ROLL_ATT < 6°) factor is 1 − .0278 * (ROLL_ATT) ^ 2 Else = 0 | 0 to 1 |
| Spider angle OK for advancing up FUS | SPD_FUS_OK | (SD_ANG < 25.0°) | 0 to 1 |
| Stair angle OK for backing for ascending from a lower landing | SRT_BCK_OK | BCK & CST_RSD & SKD_CN_R_PTC or ADV or not MSL | 0/1 |
| Stair angle OK for Advancing for descending from an upper landing | STR_ADV_OK | ADV & not CST_RSD & SKD_CN_R_PTC or BCK or not MSL | 0/1 |
| Step height OK for backing to ascend an FDS step | FDS_BCK_OK | BCK & CST_RSD & DN_STP_OK or ADV or not MSL | |
| Step height OK for advancing to descend an FDS step | FDS_ADV_OK | ADV & not CST_RSD & DN_STP_OK or BCK or not MSL | 0/1 |
| Advancing to ascend FUS OK | FUS_ADV_OK | ADV & SPD_FUS_OK or BCK or not MSL | 0/1 |

TABLE 2-continued

Criteria Evaluation

| T2: Description | Variable | Criteria | Units |
|---|---|---|---|
| backing to descend to FUS OK | FUS_BCK_OK | BCK & CST_ENGD & not PTC_HI or ADV or not MSL | 0/1 |
| Stair and step travel OK | MSL_T_OK | STR_BCK_OK & STR_ADV_OK & FDS_BCK_OK & FDS_ADV_OK & FUS_ADV_OK & FUS_BCK_OK or not MSL | 0/1 |
| slope angle limiting angle criteria for UP-SLOPE mode | M3_SPD_LM_OK | (SD_ANG < 41°) * PTC_LVL | 0/1 |
| down-slope angle OK for backing to ascend from a lower landing | DSLP_BCK_OK | BCK & CST_RSD & SKD_DN_SL_OK & SPDR_LV_SPT or ADV or not MP2 | 0/1 |
| down-slope angle OK for advancing from an upper landing | DSLP_ADV_OK | ADV & not CST_RSD & SKD_DN_SL_OK or BCK or not MP2 | 0/1 |
| up-slope angle OK for advancing from lower landing | USLP_ADV_OK | ADV & SKD_RSD & CST_CN_L_PTC & M3_SPD_LM_OK or BCK or not MP3 | 0/1 |
| up-slope angle OK for backing from upper landing | USLP_BCK_OK | BCK & not SKD_RSD & CST_CN_L_PTC & M3_SPD_LM_OK or ADV or not MP3 | 0/1 |
| Slope travel OK | MPL_T_OK | DSLP_BCK_OK & DSLP_ADV_OK & USLP_ADV_OK & USLP_BCK_OK or not MPL | 0/1 |
| Seat height speed factor | SH_FTR | SH_DWN * (MSL + MPL + .5 * MLL) + .5 * MLL | 0.0 to 1.0 |
| Skid and caster not both supporting | SKD_CST_NB_SUPT | not both (CST_SUPT & SKD_SUPT) | 0/1 |
| Drive speed factor | TRVL_OK | (.1 + .9 * PTC_FTR * ROLL_FTR * MSL_T_OK * MPL_T_OK) * (SKD_ENGD or MLL) * CST_ENGD * SKD_CST_NB_SUPT * SH_FTR | 0.0 to 1.0 |
| Spider speed factor | SPDR_OK | (SPDR_ENGD or SPDR_4WD OR CST_RN_ENGD) & ((SKD_ENGD & not PTC_HI) or (CST_ENGD & not PTC_LO) & SKD_CST_NB_SUPT) else .3 | .3/1 |
| JLA joystick forward | JAL | JLA > 0 | 0/1 |
| JLA joystick aft | JBL | JLA < 0 | 0/1 |
| JRA joystick forward | JCL | JRA > 0 | 0/1 |
| JRA joystick aft | JDL | JRA < 0 | 0/1 |
| Joystick non-directional deflection magnitude | JLE | ABS(JLA)/2 + ABS(JRA)/2 | 0 to 10 |
| Joystick deflected | JEL | JAL or JBL or JCL or JDL | 0/1 |
| Advancing (descending steps) | ADV | (JAL or JCL) and not JBL and not JDL | 0/1 |
| Backing (ascending steps) | BCK | (JBL or JDL) and not JAL and not JCL | 0/1 |
| Pivoting | PVT | (JAL & JDL) or (JBL & JCL) | 0/1 |
| LD_TRVL Left drive travel (motor on right side) from electrical motor drive 103 | LD_TRVL | 4 * 40/58 * 24/72 * LD_SPD * ΔT | inches |
| Right drive travel (motor on left side from electrical motor drive 103 | RD_TRVL | 4 * 40/58 * 24/72 * RD_SPD * ΔT | inches |
| Drive travel average used in PHS_6, PHS_7B, PHS_7D, PHS_8 | DR_TRVL | Δ (LD_TRVL + RD_TRVL)/ 2 + TRVL_SPDR | inches |

TABLE 2-continued

Criteria Evaluation

| T2: Description | Variable | Criteria | Units |
|---|---|---|---|
| Range for spider system 400 pitch control | PTC_S_RG | PTC_TG − 5° < CHR_ATT < PTC_TG + 5° | |
| Pitch low | PTC_LO | CHR_ATT < PTC_TG − 3° | 0/1 |
| Pitch high | PTC_HI | CHR_ATT > PTC_TG + 3° | 0/1 |
| Pitch level | PTC_LVL | CHR_ATT ≥ PTC_TG − 3 & CHR_ATT ≤ PTC_TG + 3° | |
| Pitch below target | PTC_B_TG | CHR_ATT < PTC_TG | 0/1 |
| Legrest full forward | LR_FWD | LR_ANG = 0° | 0/1 |
| Legrest full aft | LR+AFT | LR_ANG = 52° | 0/1 |
| Legrest raised for FUS | LR_LFT | LR_FWD & KFT_ENGD | 0/1 |

[2]120 added as required for positive value
[3]120 added as required for positive value
[4]See FIG. 5 for derivation

TABLE 3

Mode and Phase Selection

| T3 Mode/Phase | Invoke from | Description | Selection Criteria |
|---|---|---|---|
| MLL | START or MSL or MP1 | LEVEL mode | QLL and (SPDR_4WD or MP1) |
| MSL | MLL | STAIR mode | MLL and (SPDR_ENGD or not SPDR_4WD or SKD_APR_FUS or SKD_APR_FDS or CST_APR_FUS or CST_RN_ENGD) |
| MPL | MLL | SLOPE mode | QPL from MLL |
| MP1 | MPL | SMALL ANGLE SLOPE mode with spider pitch control | Invoked from MPL when on low angle slopes (not MP2 or MP3) ends when MLL, MP2 or MP3 invoked |
| MP2 | MP1 | DOWN SLOPE mode with skid pitch control by skid system 200 support and RDW 602 | Invoke from MP1 If (SPDR_ENGD and not CWT_SUPT) or (SD_ANG < 26° and not CWT_SUPT) Ends when SKD_ANG < 27° |
| MP3 | MP1 | UP-SLOPE mode with caster pitch control with support by caster system 300 and FDW 601 | Invoke from MP1 with (SD_ANG > 39°) & PTC_HI or MP1 with SKD_UP & KWT_SUPT & PTC_HI Ends when PTC_LO or not CWT_SUPT |
| PHS_1 | MLL | LEVEL TRAVEL phase | Invoked by MLL and ended by invoking MSL or MPL |
| PHS_2 | PHS_5 | FWD STEP APPROACH phase, for approaching FUS step with skid system raised after invoking MSL | Invoked by LR_LFT & SKD_APR_FUS ends when (SD_ANG > 35°) |
| PHS_3 | PHS_5 | 4-WHEEL BACKING phase for backing up a low FDS step with caster runners engaged | Invoked from PHS_5 with BCK, CST_RN_ENGD, and RE_LO_STP. Ends when rear drive wheels 602 are on an FDS (SPDR_ON_FDS) or SPDR_ENGD. |
| PHS_4 | PHS_8 | CASTER LIFT/ADV FOR FUS ASCEND phase | Invoked from PHS_8 when PHS_8 ends. Ends when CWT_ENGD and CST_HORZ |
| PHS_5 | ALL | 4-WHEEL DRIVE phase with spider pitch control, skid engage, and caster engage | Invoked when other MSL phases are not active and SPDR_4WD Ends when another phase is invoked or not SPDR_4WD |
| PHS_6 | PHS_5 | FDW & CST SUPT with spider rotation to target angle or spider cam engaging target when backing down an FUS step. | Invoked from PHS_5, BCK, SPDR_ENGD & not RDW_SUPT & not SKD_LOW. Ends when DR_TRVL < −3.0. |

TABLE 3-continued

Mode and Phase Selection

| T3 Mode/Phase | Invoke from | Description | Selection Criteria |
|---|---|---|---|
| PHS_7B | PHS_5 or PHS_9 | SPIDER ASCEND LANDING phase for rotating spider system 400 to lift FDW 601. Occurs backing up FDS 410 step with spider lower drive wheels 606 nearing the level position. | Invoked from PHS_5 or PHS_9 when BCK, SKD_SUPT & SPDR_ON_FDS & not CST_RN_ENGD; Ends when FDW_ENGD or when CST_RN_ENGD |
| PHS_7D | PHS_5 | SPIDER DESCEND LANDING phase for rotating spider verses travel to a cam engageable angle | Invoked when FDS_ADV_P5 Ends when SD_ANG < 23° |
| PHS_8 | PHS_5 | SPIDER FUS ASCEND PHASE for rotating spider verses travel to lift RDW and avoid runner bottoming to step when advancing and spider cam is engaged | Invoked from PHS_5 when ADV & SPDR_ENGD & SPDR_ON_FUS ends at SPDR_ON_STP & RDW_SUPT |
| PHS_9 | MSL | SPIDER CLIMB phase for rotating spider system 400 for ascending or descending, crowd steer or caster steer with either skid system 200 or caster system 300 supporting | Invoked in MSL with no other mode active and not SPDR_4WD. Ends when PHS_5, PHS_7B, PHS_7D or PHS_9A are invoked |
| PHS_9A | PHS_5 | SPIDER TIP ROTATION phase to ensure cam engagement for an initial step. | Invoked from PHS_5 and RE_HI_STP, CST_RN_ENGD & BCK Ends when SD_ANG > SPD_HI_STP |

TABLE 4

Targets

| T4 Description | Variable | Target | Units |
|---|---|---|---|
| Pitch target | PTC_TG | +0 | degrees |
| Pitch target | PTC_TG | +MP3 * 3 | degrees |
| Pitch target | PTC_TG | +PHS_2 * 3 | degrees |
| Pitch target | PTC_TG | +PHS_6 * 4 | degrees |
| Pitch target | PTC_TG | +PHS_9 * .24 * SKD_RN_EMT * not CST_RN_SUPT −PHS_9 * .24 * CST_RN_EMT * not SKD_RN_SUPT | degrees |
| Skid engage target | SKD_EN_TG | +12 | degrees |
| SKD_PN_TG Skid position target | | +0 | degrees |
| Spider position target | SPD_PN_TG | +PHS_1 * 28 | degrees |
| Spider position target | SPD_PN_TG | +PHS_6 * 37 | degrees |
| Spider position target for ascending to a step landing | SPD_PN_TG | +PHS_7B * (34 − 8.5 * DR_TRVL − 1.1 * DR_TRVL ^ 2) | degrees |
| Spider position target for descending from a step landing | SPD_PN_TG | +PHS_7D * (34 + 5.5 * DR_TRVL − 1.5 * DR_TRVL ^ 2) | degrees |
| Spider position target | SPD_PN_TG | +PHS_8 * (+28 − 4.4 * DR_TRVL + .6 * DR_TRVL ^ 2 | degrees |
| Spider position target | SPD_PN_TG | +MP2 * 32 | degrees |
| Spider angle for engaging high step | SPD_PN_HI | 60 | degrees |
| Spider engage target for SPD_EN_CAM | SPD_EN_TG | 3 | degrees |
| Spider engage target, for DR_CAM_STR_LH | DR_EN_TG_LH | +5 − .2 * (JLA *ADV + JRA * BCK) | degrees |

TABLE 4-continued

| | | Targets | |
|---|---|---|---|
| T4 Description | Variable | Target | Units |
| Spider engage target, for DR_CAM_STR_RH | DR_EN_TG_RH | +5 − .2 * (JRA *ADV + JLA * BCK))degrees | |
| Caster engage target for caster wheel and runners | CST_EN_TG | +12 | degrees |
| Caster engage target for caster steering | DR_CST_EN_TG | +16 | degree |
| Caster position target | CST_PN_TG | +CST_HORZ * PHS_4 | degrees |

TABLE 5

| | | Phase Duties | | | |
|---|---|---|---|---|---|
| T5 Phase | Duty Type | Skid | Spider | Caster | Drive |
| PHS_1 | Level travel | SKD PN to SKD_PN_TG | SPD_PN | CST_PC to PTC_TG | DR_JS_ST |
| PHS_2 | Forward Step Approach | If SKD_UP & PTC_HI then SKD_PN else SKD_ENG | If SKD_UP then SPD_EN_SKD else SPD_PC | CST_ENG | DR_JS_ST |
| PHS_3 | Backing up a low FDS step | SKD_ENG | SPD_PC | CST_ENG | DR_JS_ST |
| PHS_4 | Caster lift to FUS step level | SKD_ENG | SPD_PC | CST_PN to CST_PN_TG | if CST_ANG = CST_PN_TG then DR_JS_ST |
| PHS_5 | 4-wheel drive | If PTC_LO then SKD_PC else SKD_ENG | If PTC_S_RG then SPD_PC | If PTC_HI then CST_PC else CST_ENG | DR_JS_ST |
| PHS_5 | 4-wheel drive backing with SKD_LFT_5_OK | if PTC_LO then SKD_PC else SKD_PN to SKD_UP | if SKD_UP then SPD_EN_SKD or else SPD_PC | CST_ENG | DR_SKD_EN |
| PHS_6 | back off FUS step with FDW 602 and caster system 300 support | SKD_ENG | if SPDR_ENGD then SPD_EN_CAM to SPD_EN_TG else SPD_PN to SPD_PN_TG | CST_PC to PTC_TG | DR_JS_ST |
| PHS_7B | spider ascend to landing | SKD_PC to PTC_TG | SPD_PN to SPD_PN_TG | CST_ENG | DR_JS_ST |
| PHS_7D | spider descend from landing | SKD_PC to PTC_TG | SPD_PN to SPD_PN_TG | CST_ENG | DR_JS_ST |
| PHS_8 | spider forward ascend FUS step | SKD_ENG | if SPDR_ENGD then SPD_EN_CAM to SPD_EN_TG or else SPD_PN to SPD_PN_TG | CST_PC to PTC_TG | DR_JS_ST |
| PHS_9 | spider climb | if SKD SUPT then SKD_PC or else SKD_ENG | SPD_RO | If CST_SUPT CST_PC or Else CST_ENG | If not CST_RN_ENGD or SPDR_ENGD then DR_CAM_STR else DR_CST_STR |
| PHS_9A | first FDS step ascend | SKD_PC | SPD_RO | CST_ENG to CWT_EMT[5] | DR_CST_STR |

TABLE 5-continued

Phase Duties

T5

| Phase | Duty Type | Skid | Spider | Caster | Drive |
|---|---|---|---|---|---|
| MP1 | small angle slope | if PTC_LO then SKD_PC else SKD_ENG | if PTC_S_RG then SPD_PC | If PTC_HI then CST_PC Else CST_ENG | DR_JS_ST |
| MP2 | down slope | SKD_PC | SPD_PN to SPD_PN_TG | CST_ENG | DR_JS_ST |
| MP3 | up slope | If KD_SUPT then SKD_PN to SKD_PN_TG else SKD_ENG | SPD_EN_SKD if (M3_SPD_LM_OK or (SKD_EMT < SKD_EN_TG)) | CST_PC | DR_JS_ST |

[5]CST_RN_EMT excluded to force caster wheel engagement

TABLE 6

Duty Command Values

| T6 Description | Duty | Axis | Command Value |
|---|---|---|---|
| Skid engage | SKD_ENG | skid | +JEL* (SKD_EN_TG − SKD_EMT) |
| Skid position | SKD_PN | skid | +JEL* (SKD_PN_TG − SKD_ANG) |
| Skid pitch control | SKD_PC | skid | +JEL* (PTC_TG − CHR_ATT) |
| Caster engage | CST_ENG | caster | +JEL * (CST_EMT − CST_EN_TG) |
| Caster position | CST_PN | caster | +JEL * (CST_PN_TG − CST_ANG) |
| Caster pitch control | CST_PC | caster | +JEL * (PTC_TG − CHR_ATT) |
| Spider rotate | SPD_RO | spider | +JLE * (BCK − ADV) * SPDR_OK |
| Spider pitch control | SPD_PC | spider | +JEL * (CHR_ATT − PTC_TG) * SPDR_OK)). |
| Spider position control | SPD_PN | spider | +JEL* (SPD_PN_TG − SD_ANG) * SPDR_OK |
| Spider engage spider cams | SPD_EN_CAM | spider | +JEL * (CWD_MIN − SPD_EN_TG) |
| Spider control skid engagement | SPD_EN_SKD | spider | +JEL * (SKD_EN_TG − SKD_EMT) * SPDR_OK |
| Joystick steer, LH (right side motor) | DR_JS_ST_LH | LH drive | +(JLA * (ADV + PVT) + JRA * BCK) * TRVL_OK |
| Joystick steer, RH (left side motor) | DR_JS_ST_RH | RH drive | +(JRA* (ADV + PVT) + JLA * BCK) TRVL_OK) |
| Cam steer. LH | DR_CAM_STR_LH | LH drive | +JLE * (CWD_RHT − DR_EN_TG_RH) * TRVL_OK) |
| Cam steer, RH | DR_CAM_STR_RH | RH drive | +JLE * (CWD_LFT − DR_EN_TG_LH) * TRVL_OK) |
| Caster steer, LH | DR_CST_STR_LH | LH drive | +JLE * (CSRA_EMT − DR_CST_EN_TG) * TRVL_OK) |
| Caster steer, RH | DR_CST_STR_RH | RH drive | +JLE * (CSLA_EMT − DR_CST_EN_TG) * TRVL_OK) |
| Skid engage, LH | DR_SKD_EN_LH | LH drive | +JRA * (SKD_EN_TG − KGRA_EMT) * TRVL_OK) |
| Skid engage, RH | DR_SKD_EN_RH | RH drive | +JLA * (SKD_EN_TG − KGLA_EMT) * TRVL_OK) |
| Extend legrest | LR_OP | legrest | +RT_LR − EX_LR |
| Raise seat | ST_OP | seat | +RS_ST − LW_ST |

DRAWING DESCRIPTIONS

FIG. 1A is a perspective view of the enhanced mobility wheelchair 100 in accordance with this invention, with the wheelchair 100 being configured for level travel, with the skid system 200 full up, and with the front drive wheels 601 and the caster system 300 supporting.

FIG. 1D is a perspective view of the enhanced mobility wheelchair 100 in accordance with this invention, with the seatback 105 folded down and control device 106 removed.

Figure 2:
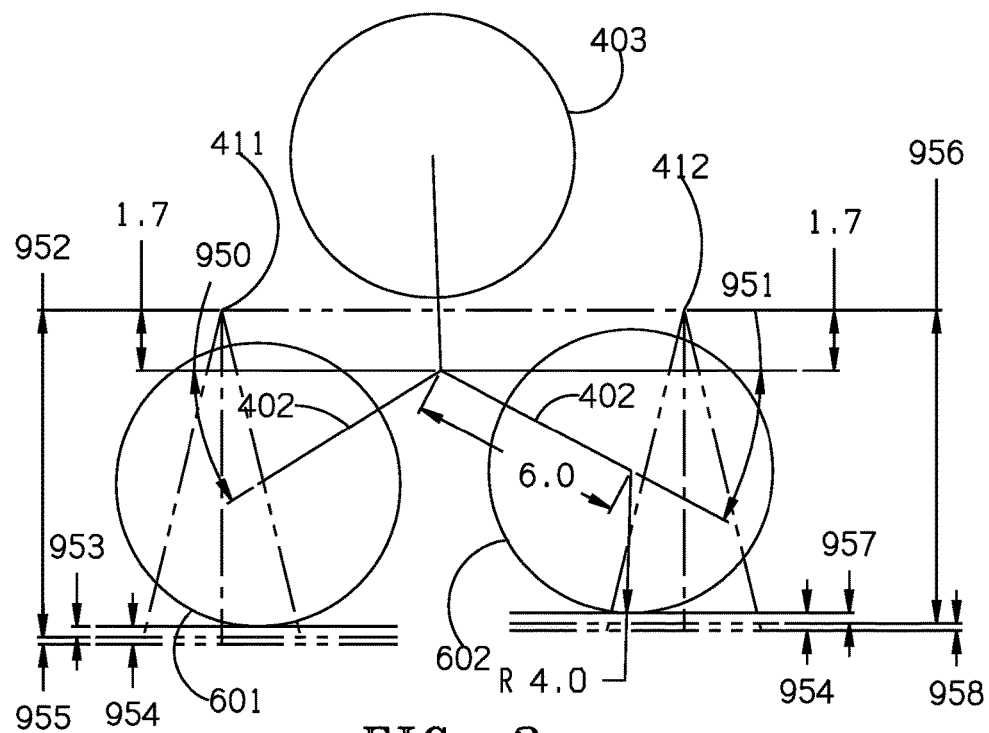

FIG. 2 is a schematic of drive wheel engagement geometry.

Figure 3A:
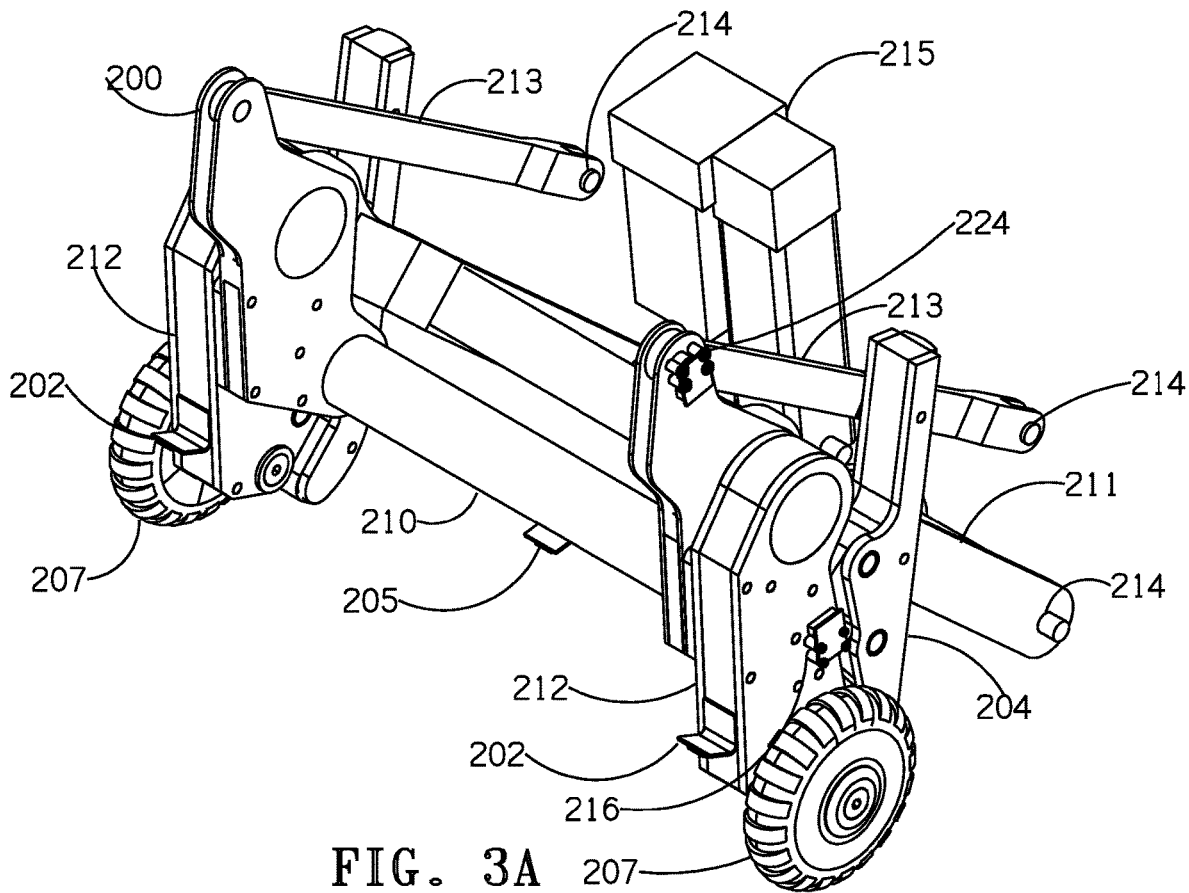

FIG. 3A is a perspective drawing of the skid system 200 with the adjacent hardware omitted for clarity.

Figure 3B:
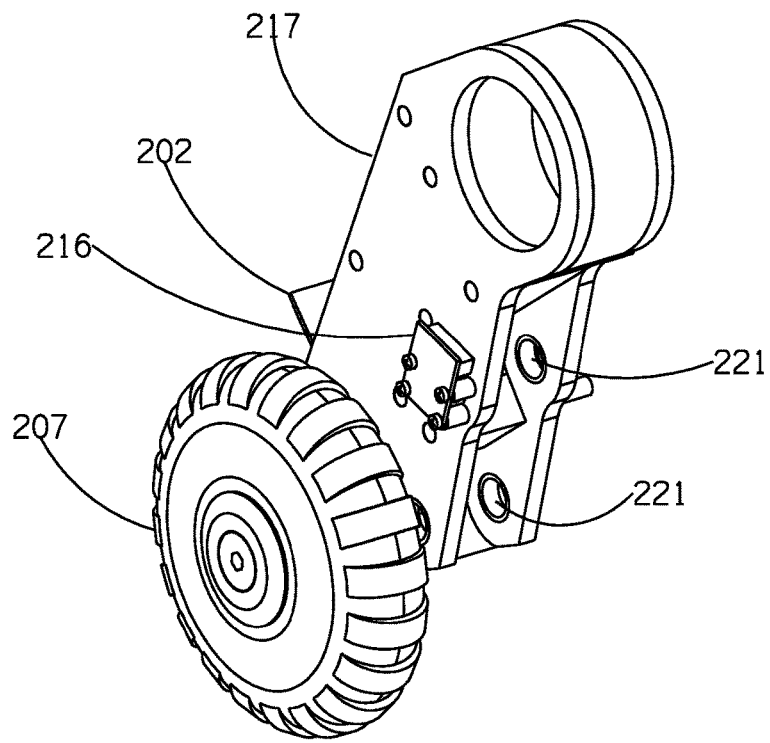

FIG. 3B is a perspective view of the skid wheel 207 and the skid wheel and runner mount 217 for the left-hand runner deflection sensing device 206.

Figure 3C:
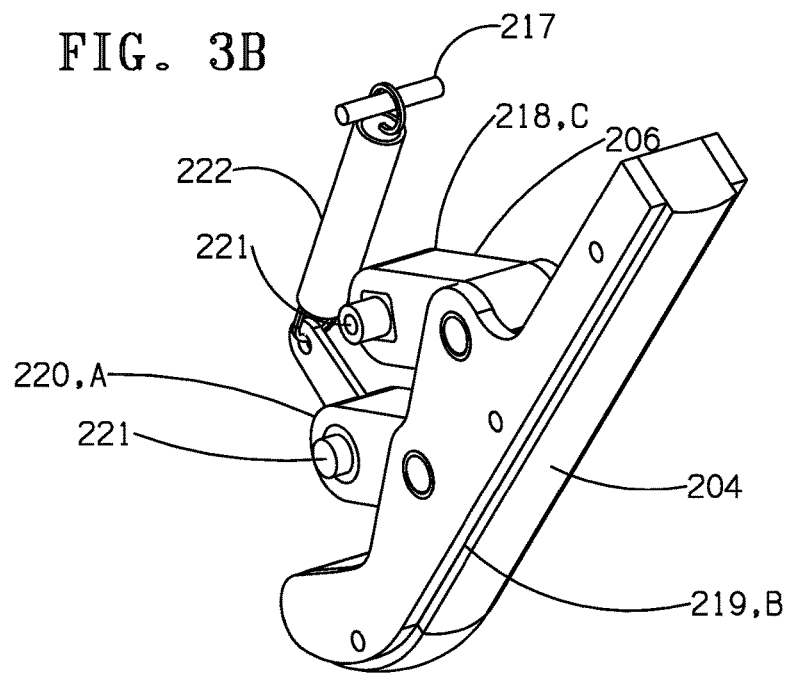

FIG. 3C is a perspective view of the runner deflection sensing device 206 which includes skid runner 204.

Figure 1A:
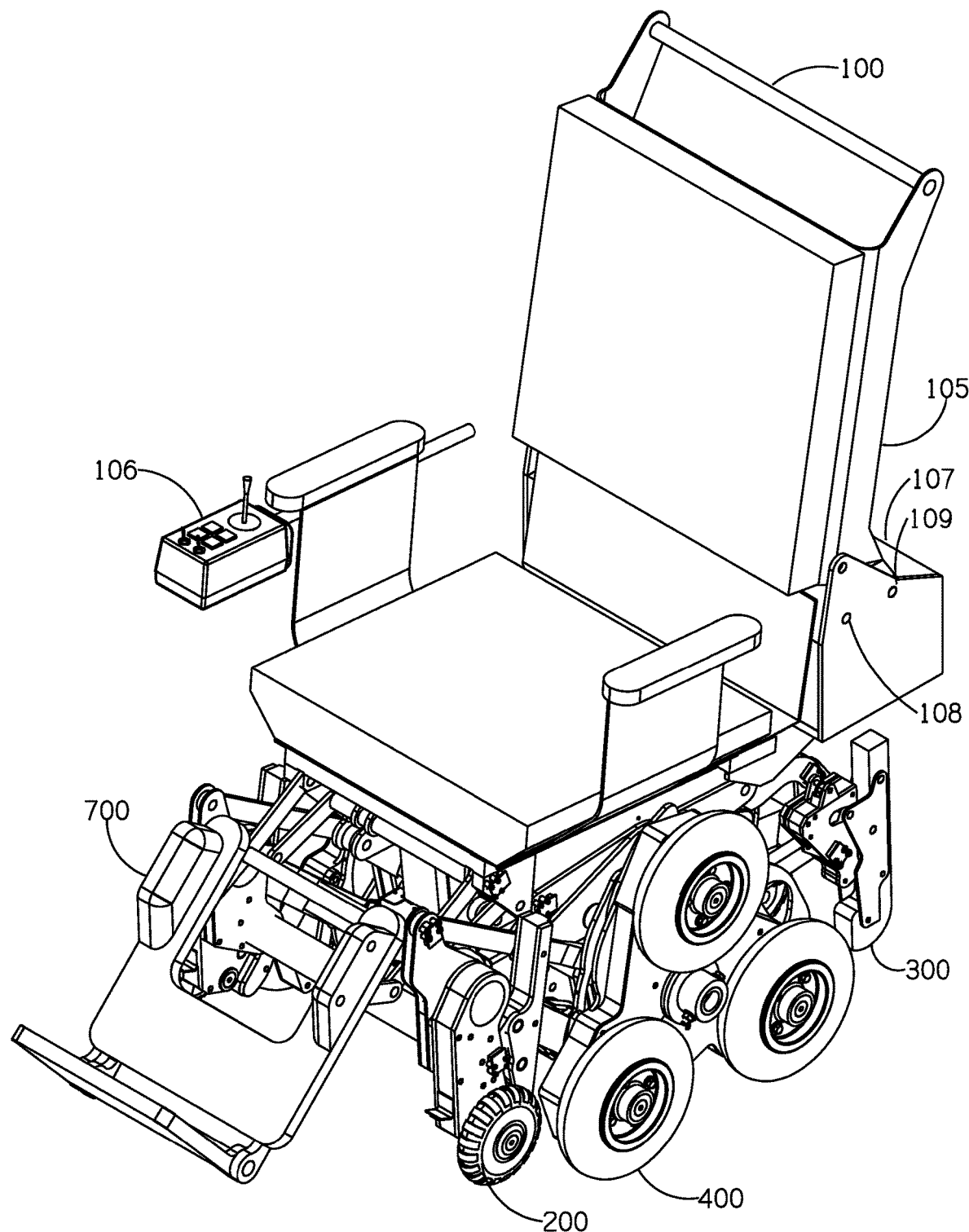
FIG. 1B is a rear perspective view of the enhanced mobility wheelchair 100 in accordance with this invention, with the enhanced mobility wheelchair 100 being configured the same as FIG. 1A.
FIG. 1C is a side view of the enhanced mobility wheelchair 100 in accordance with this invention, with the enhanced mobility wheelchair 100 being configured the same as FIG. 1A.

FIG. 3D is a top view of a portion of the skid system 200 of the enhanced mobility wheelchair 100 as illustrated in FIG. 1A and particularly showing the skid wheel 207 and skid runner 204. SECT. A and SECT. B cuts made through the deflection sensing device 206.

FIG. 3E is SECT. A showing the runner deflection sensing device 206 for detecting FDS 203 steps and horizontal surfaces 101 and ToF step sensor 202 with forward step sensor path 208 for detecting steps forward of the skid system 200. Runner deflection sensing device 206 is shown in the undeflected position.

Figure 3F:
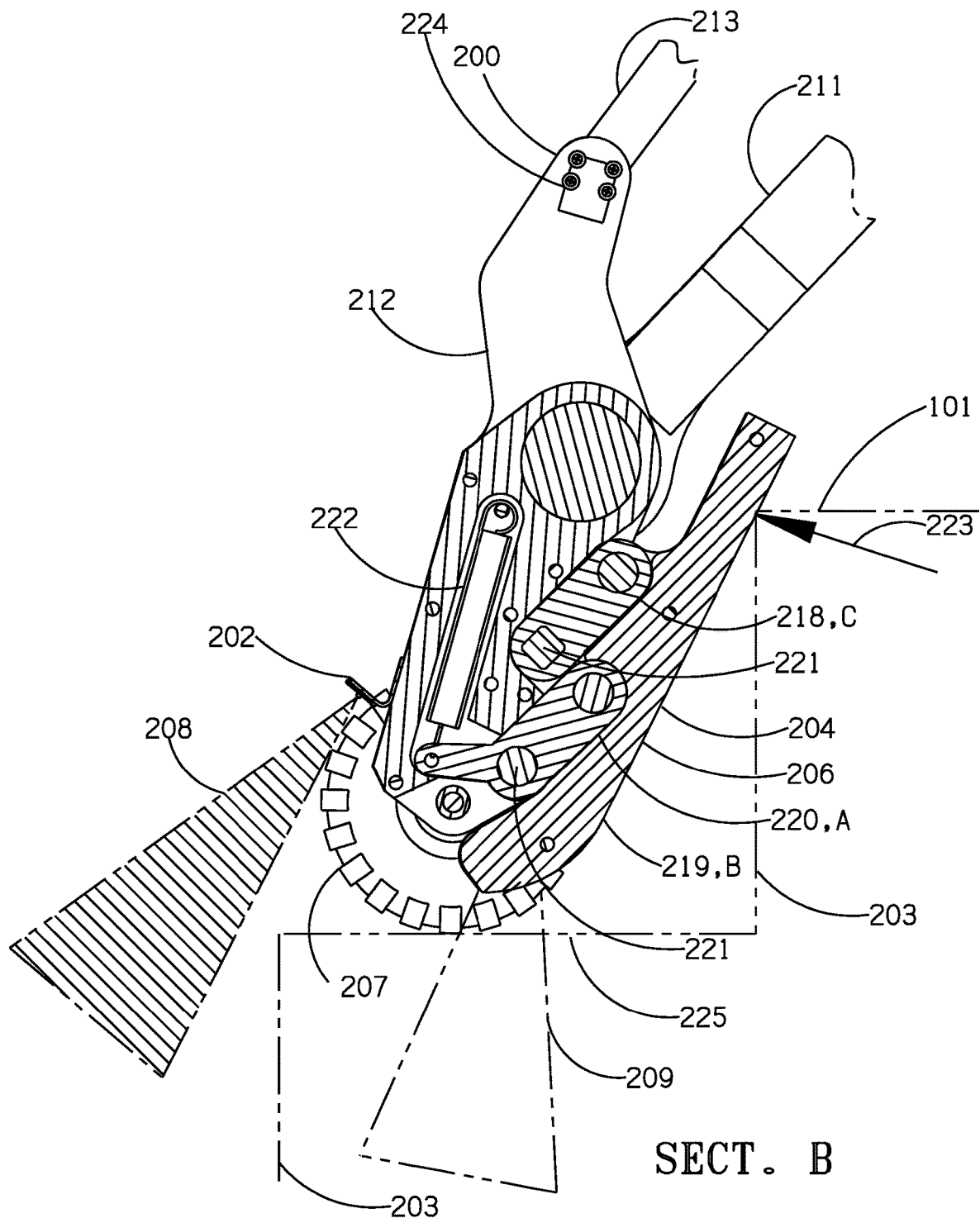

FIG. 3F is SECT. B showing the skid runner deflection sensing device 206 deflected by an FDS 203 step and showing the ToF skid wheel-to-step height path 209 detecting a horizontal tread surface 225.

Figure 4A:
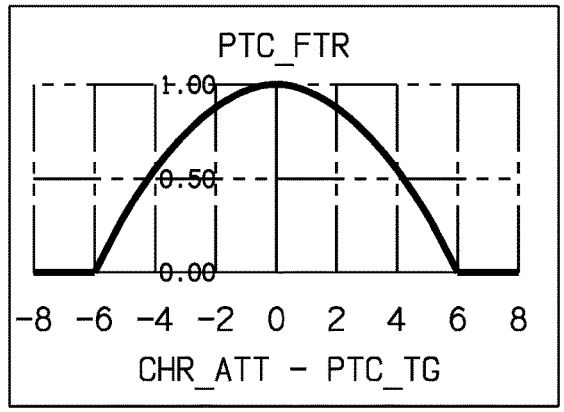

FIG. 4A is a graph of the pitch speed factor PTC_FTR for drive speed reduction as a function of pitch deviation from a pitch target (CHR_ATT−PTC_TG).

Figure 4B:
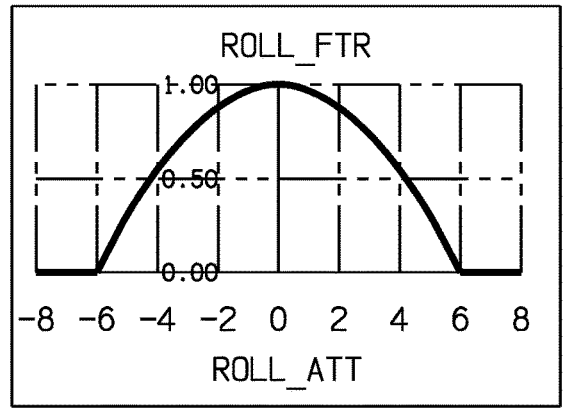

FIG. 4B is a graph of the roll speed factor ROLL_FTR for drive speed reduction as a function of lateral or roll pitch deviation (ROLL_ATT) from horizontal.

Figure 5A:
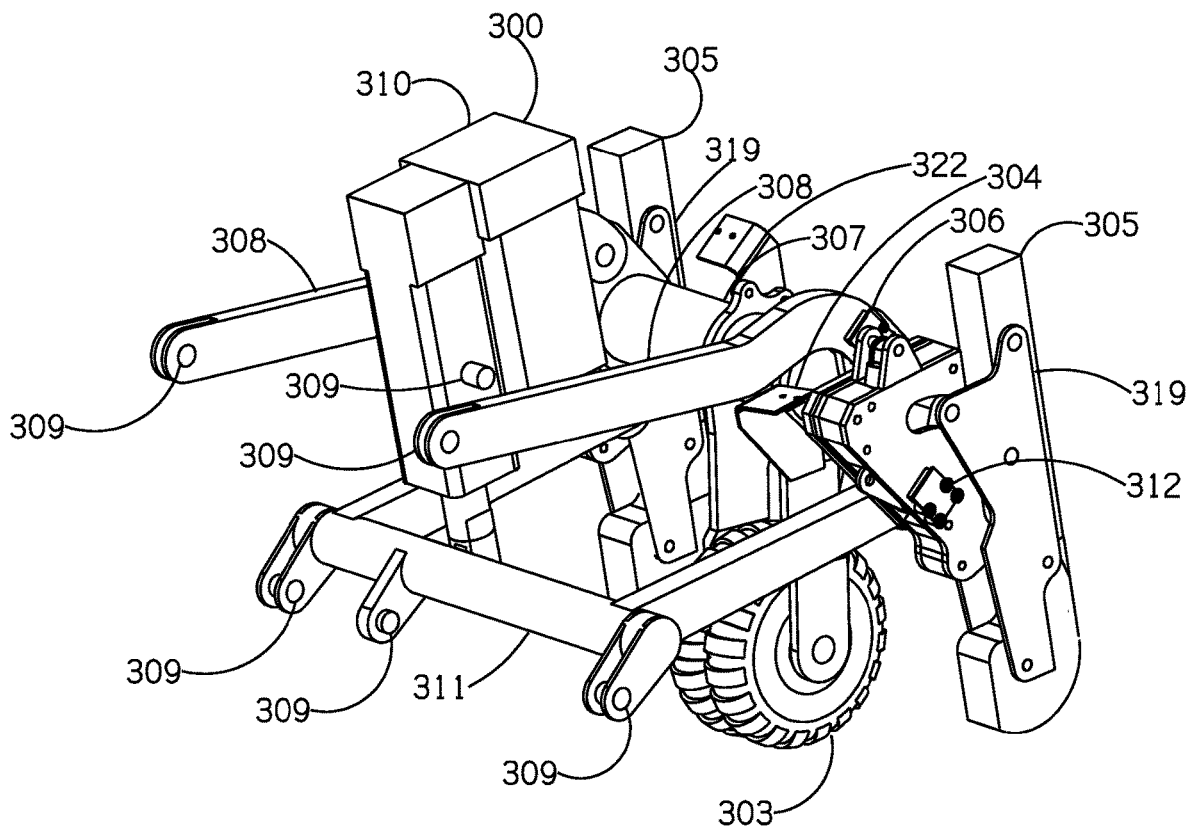

FIG. 5A is a perspective drawing of the caster system 300 with the caster runner deflection sensing devices 305 for detecting FDS 302 steps.

Figure 5B:
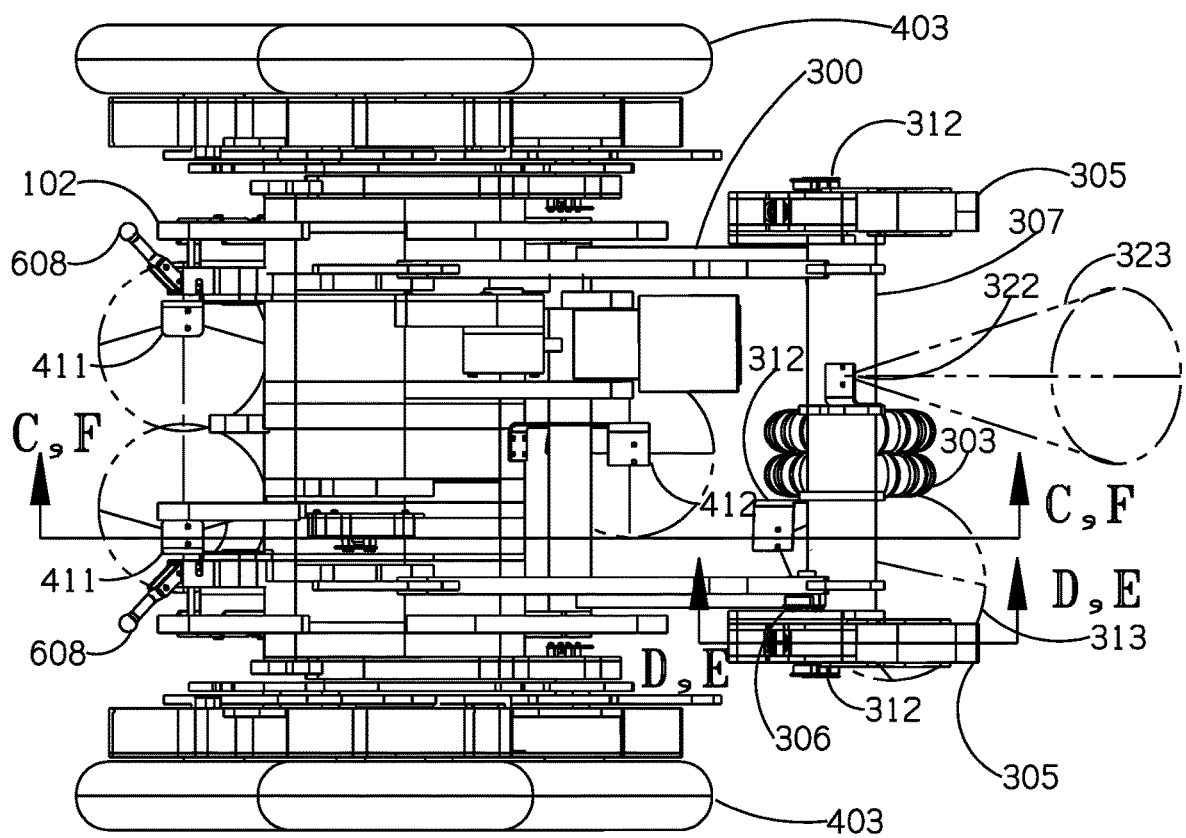

FIG. 5B is a top view of the caster system 300 from FIG. 5A with SECT. C and SECT. F cuts through the gearbox 102 and caster wheel 303 step sensor path 313 and with SECT. D and SECT. E cuts through caster runner deflection sensing devices 305.

Figure 5C:
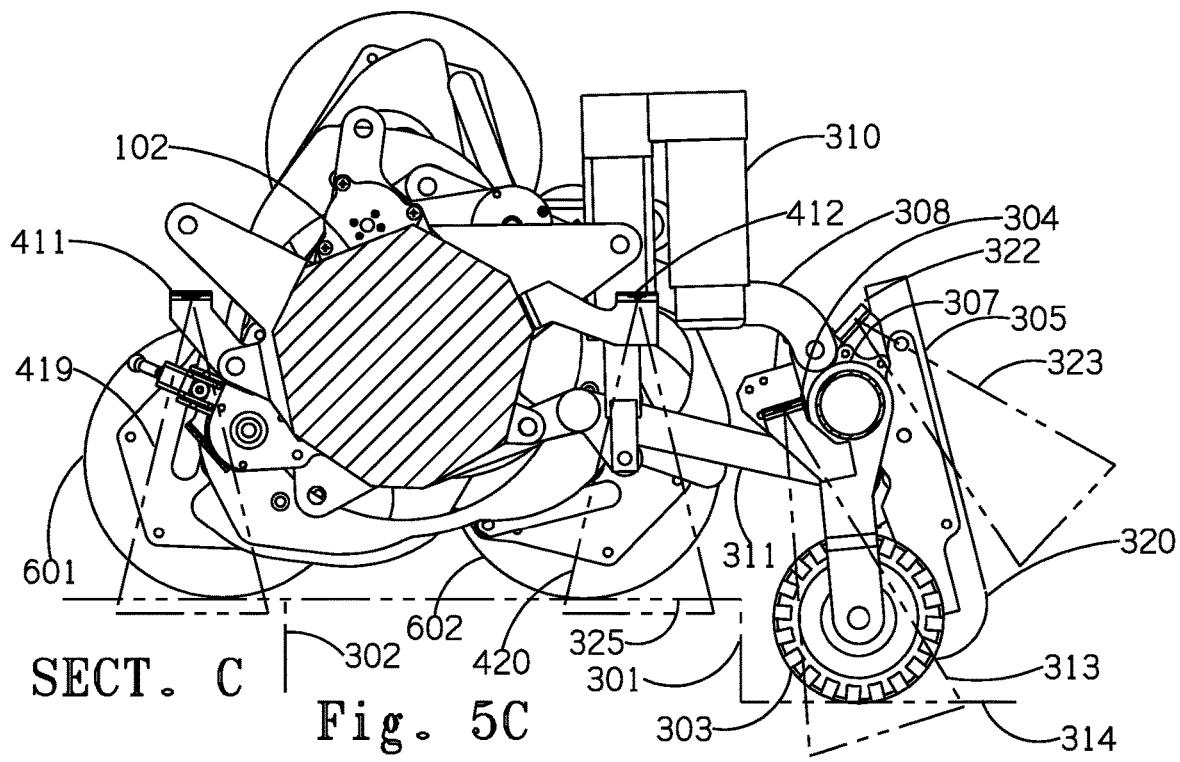

FIG. 5C is SECT. C of the gearbox 102 and caster system 300 and particularly showing the front drive wheel 601 ToF step sensor 411, the rear drive wheel 602 ToF step sensor 412, and the caster wheel 303 down a 3-inch step with a caster wheel ToF step sensor 304.

Figure 5D:
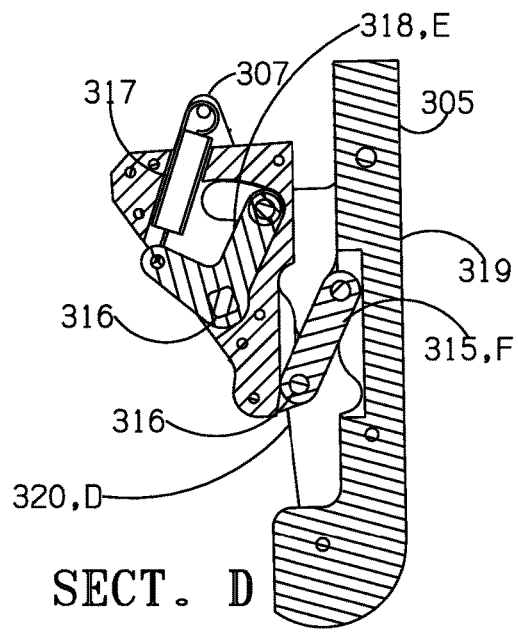

FIG. 5D is SECT. D of the caster runner deflection sensing device 305 from FIG. 5A in the free position.

Figure 5E:
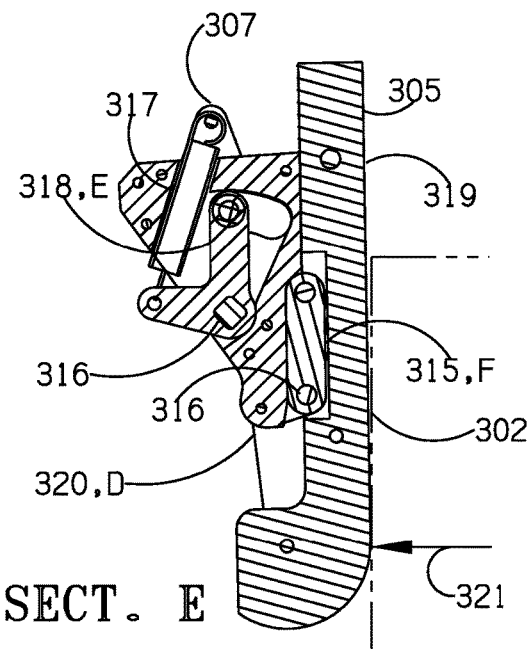

FIG. 5E is SECT. E of the caster runner deflection sensing device 305 from FIG. 5A with caster runner 319 being deflected by an FDS 302 step.

Figure 5F:
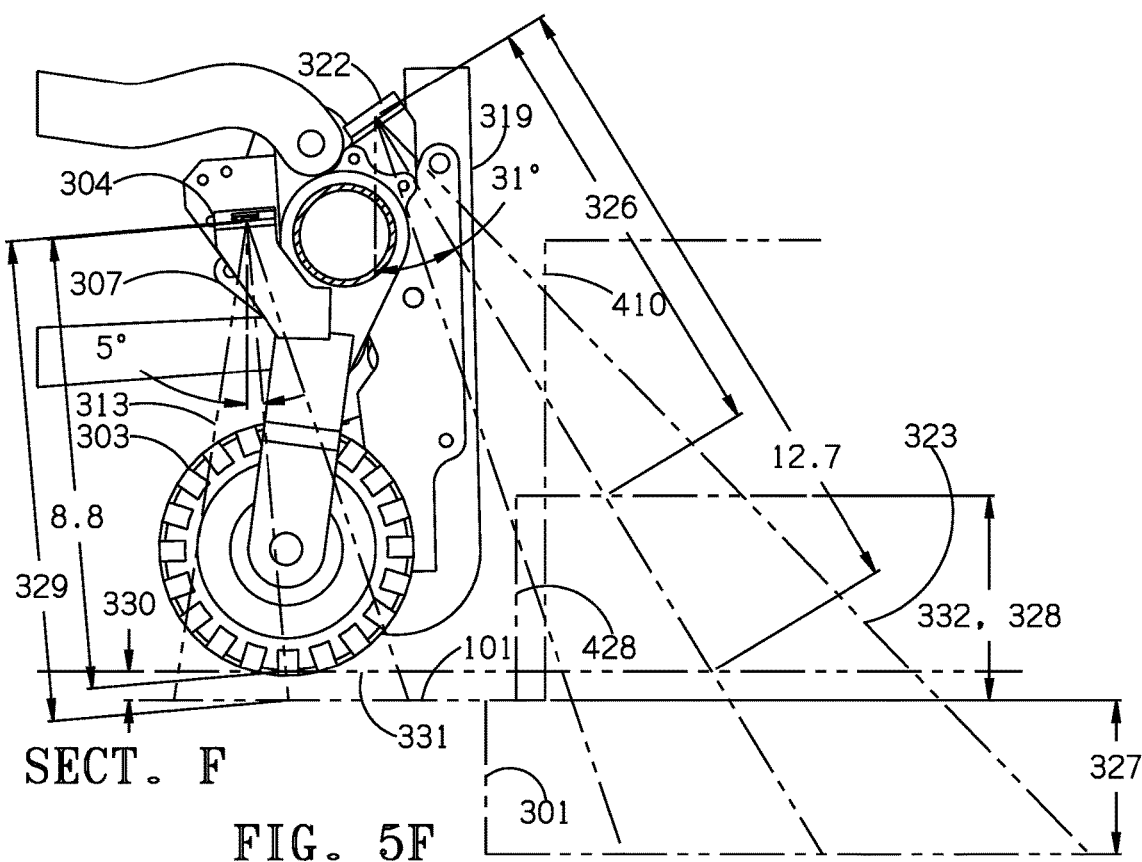

FIG. 5F is SECT. F showing the caster wheel step height sensor path 313, rear step height sensor path 323, forward facing up step, FUS 301, rear low FDS step 428 and rear high FDS step 410.

Figure 6A:
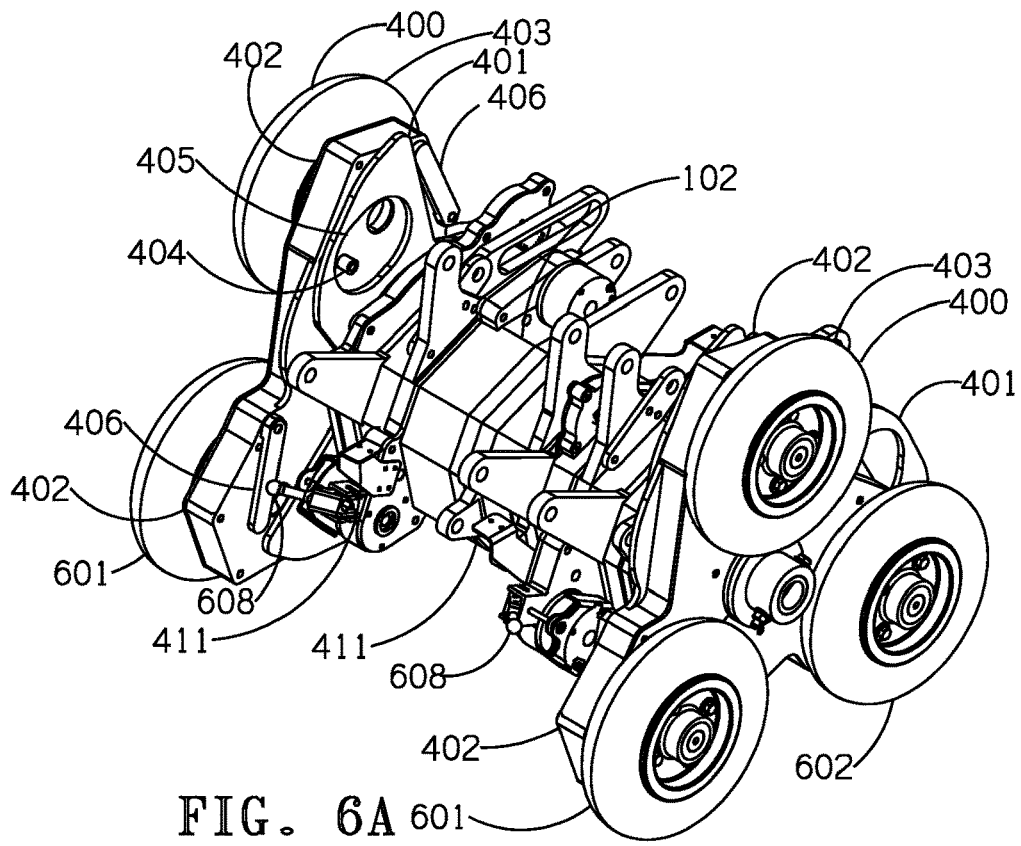

FIG. 6A is a perspective view of the gearbox 102 with spider system 400 and spider cams 401.

Figure 6B:
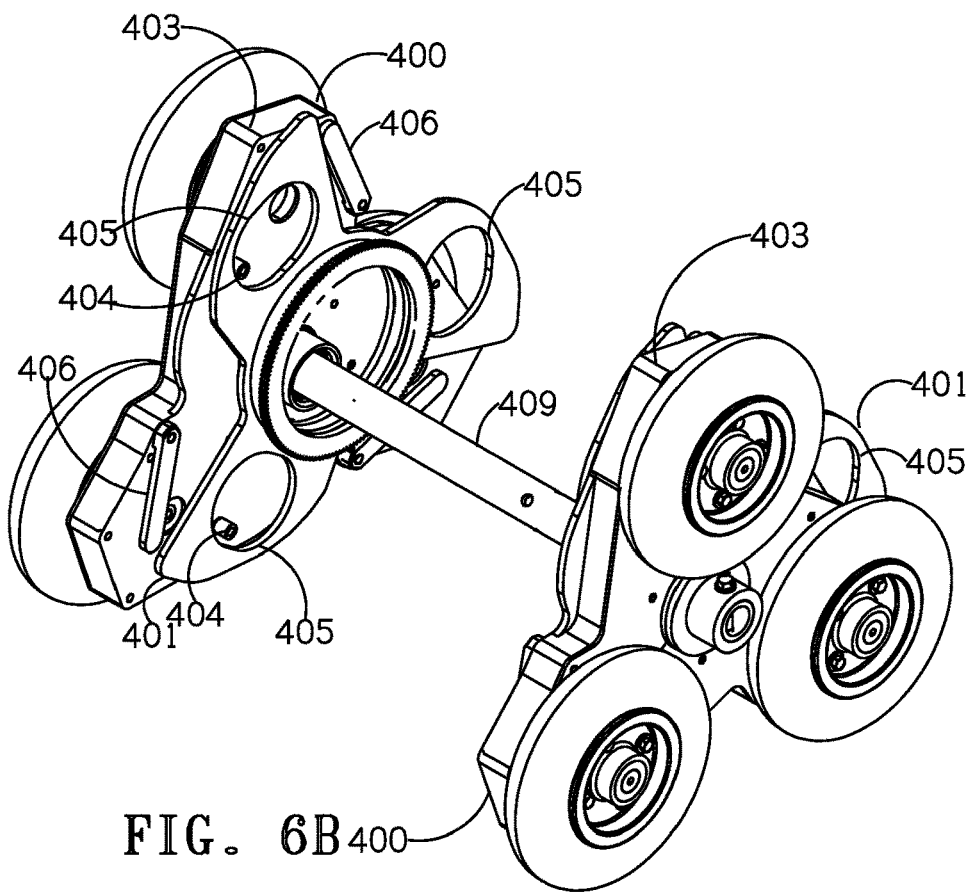

FIG. 6B is a perspective view of the spider system 400 and spider cams 401 with the gearbox 102 removed and showing the spider cam posts 404 and spider internal cams 405.

Figure 6C:
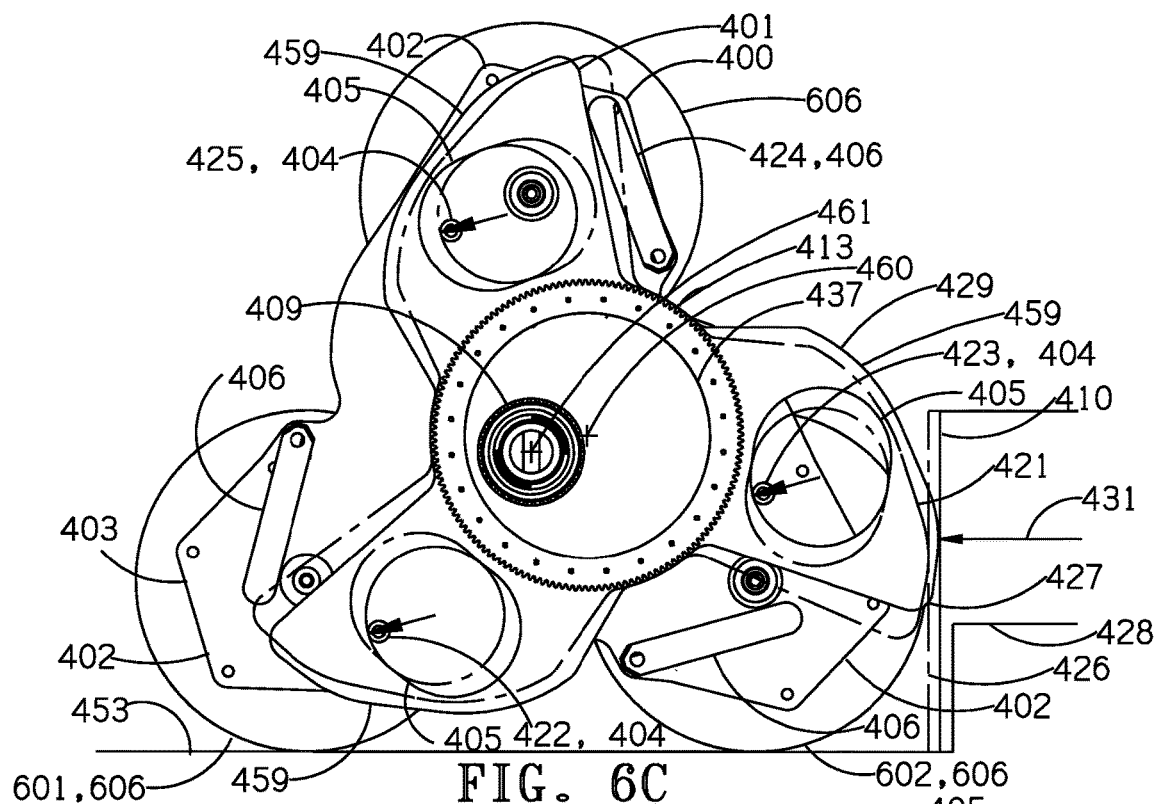

FIG. 6C is a side view showing the spider system 400 and spider cam 401 in the level position and approaching an FDS 410 step on the occupant's right side and looking from the wheelchair 100 center and outboard.

Figure 6D:
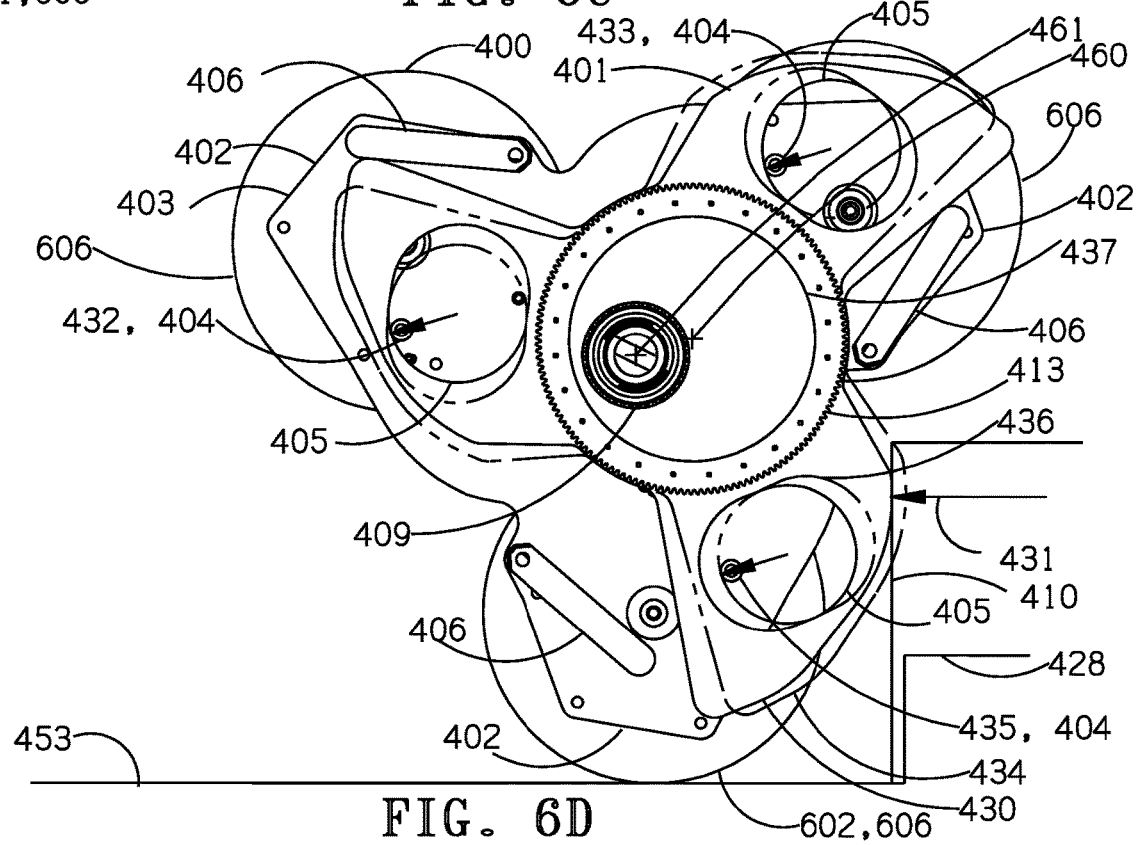

FIG. 6D is a side view same as FIG. 6C except the spider system is rotated during climbing and shows the spider cam 401 engaging an FDS 410 step.

Figure 6E:
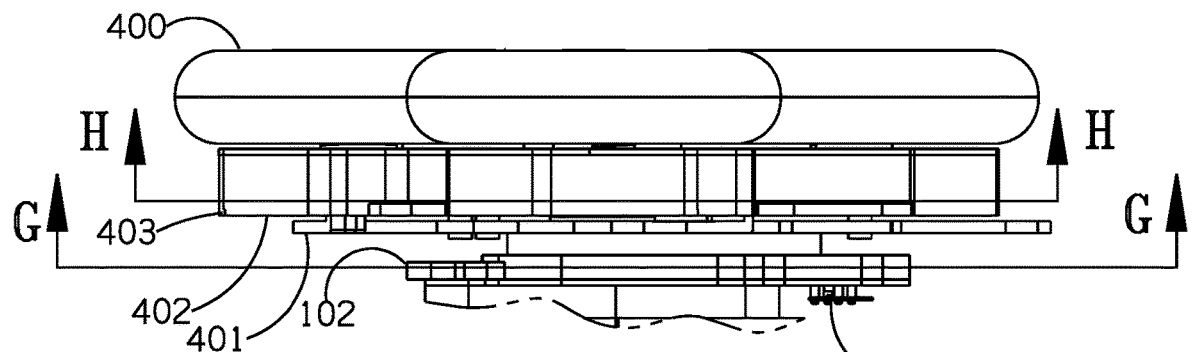

FIG. 6E is a top view of the right spider 403 in spider system 400 with a portion of the gearbox 102. SECT. G cut is made through gearbox 102 which includes spider cam gear 413 and cam angle sensing gear 414. SECT. H cut is made through the spider spoke 402 and cam preloading spring 417.

Figure 6F:
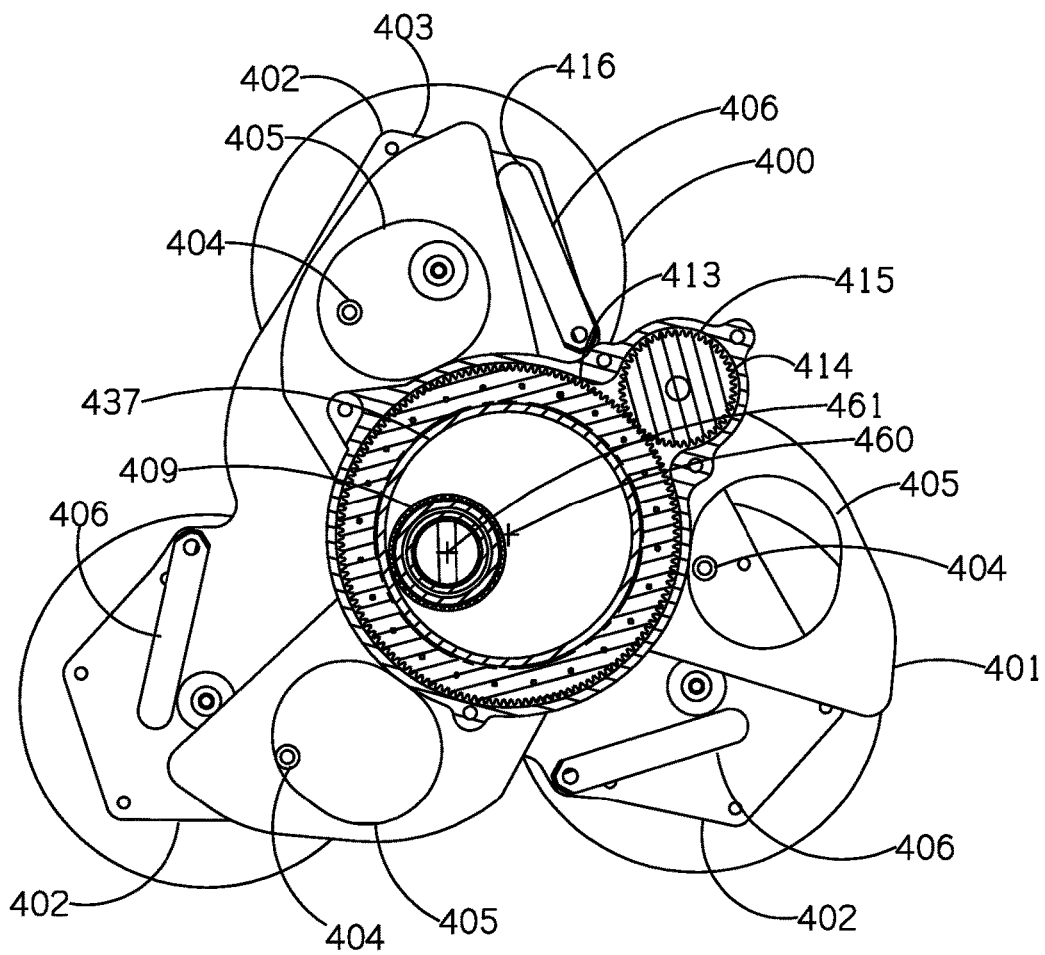

FIG. 6F is SECT. G of spider cam angle sensing system 415 showing spider cam gear 413 and cam angle sensing gear 414.

FIG. 6G is a perspective view of spider cam angle sensing system 415.

FIG. 6H is SECT. H of spider cam preloading system 416 showing the cam loading springs 417 for biasing the spider cam 401.

Figure 6I:
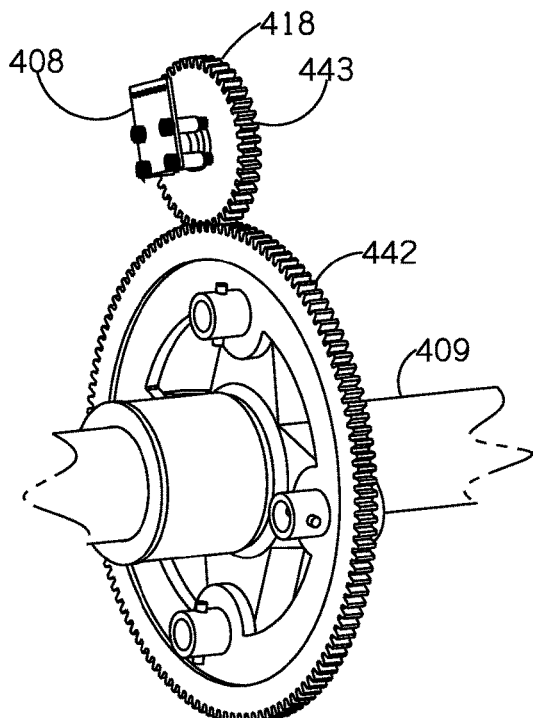

FIG. 6I is a perspective view showing the spider angle sensor gearing 418.

Figure 7A:
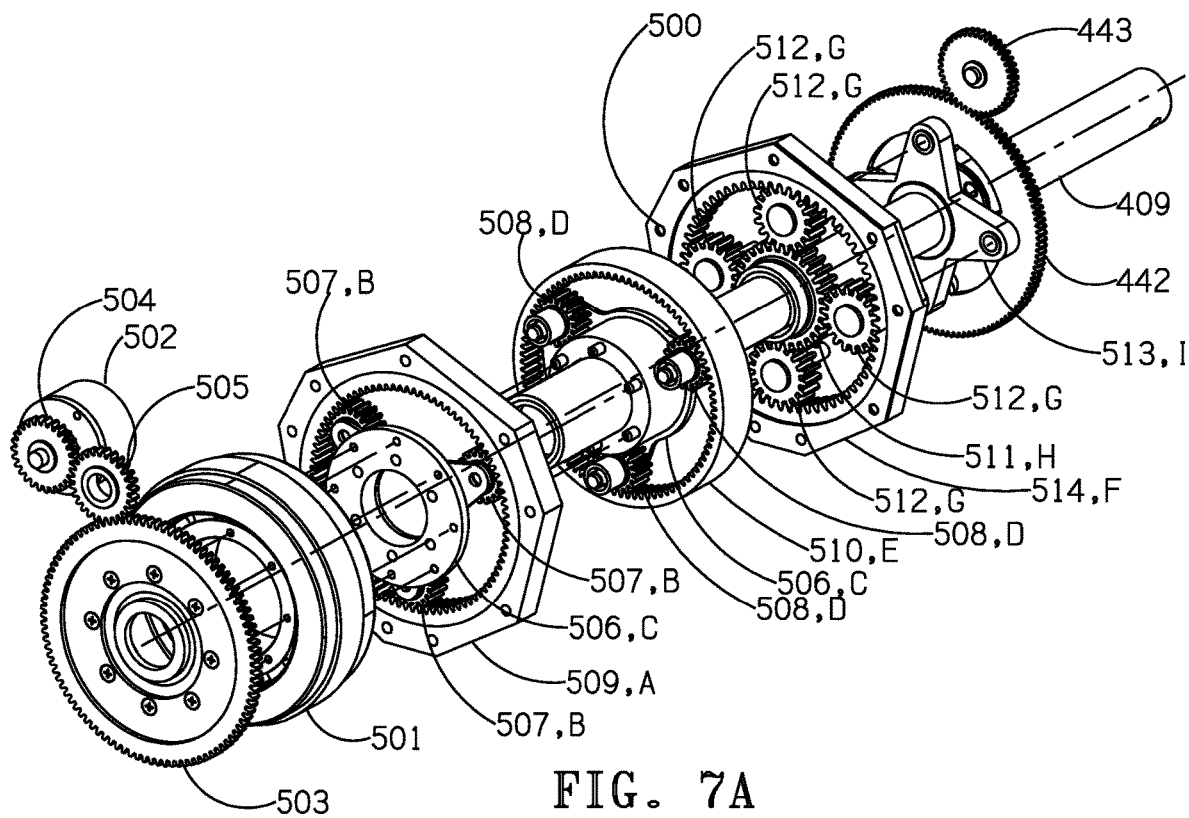

FIG. 7A is an exploded view of the spider drive system 500.

Figure 7B:
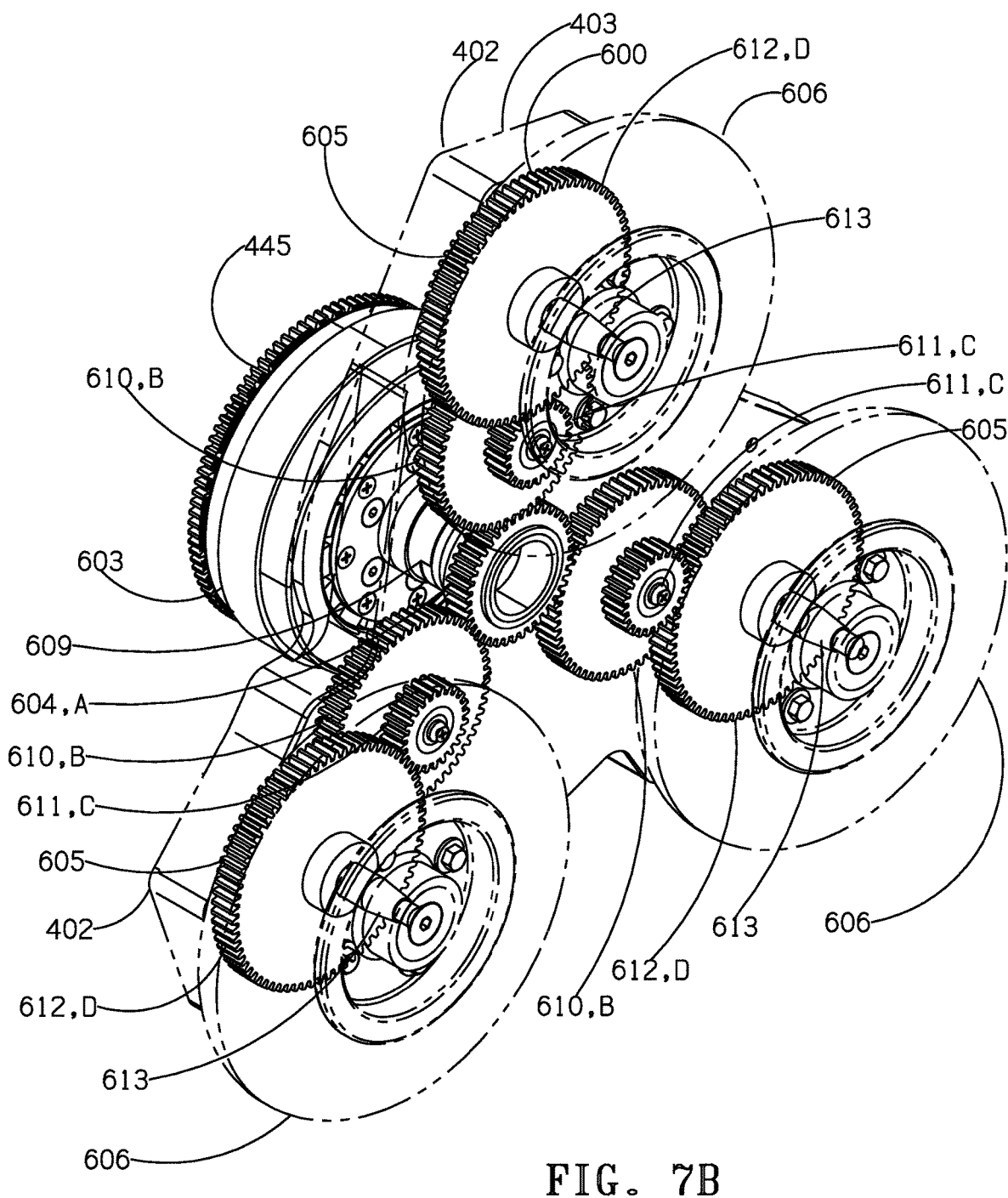

FIG. 7B is an isometric view of the left-hand drive system 600.

Figure 7C:
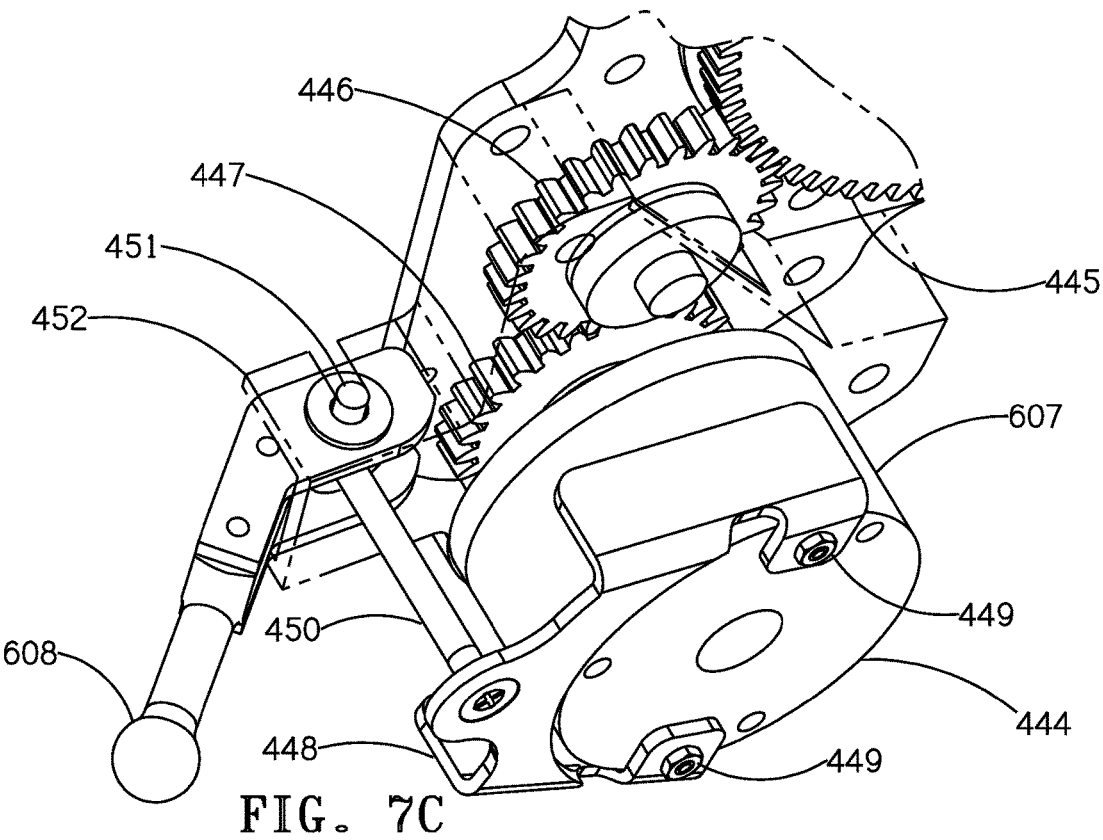

FIG. 7C is a perspective view of the left-hand drive wheel brake system 444 with the manual release handle 608 in the operate position.

Figure 7D:
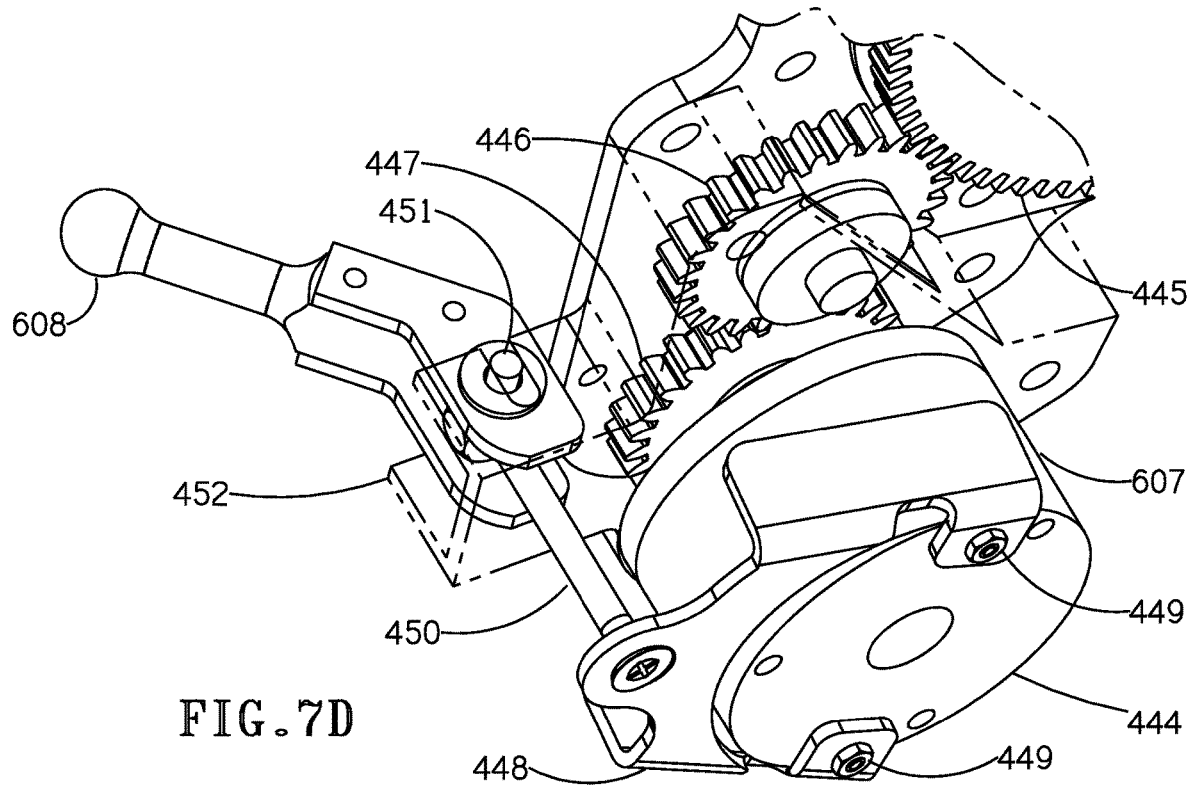

FIG. 7D is a perspective view of the left-hand drive wheel brake system 444 with the manual release handle 608 in the released position for freewheeling.

Figure 8A:
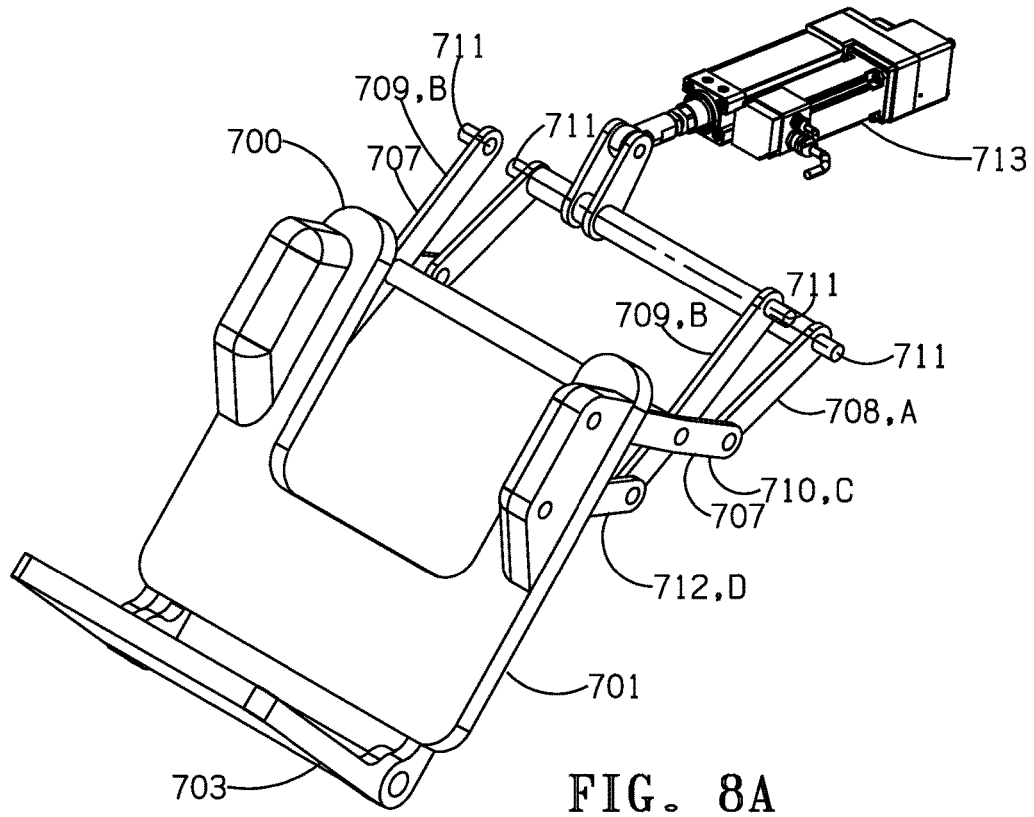

FIG. 8A is a perspective view showing the legrest system 700 with gearbox 102 and spiders 403 omitted for clarity.

Figure 8B:
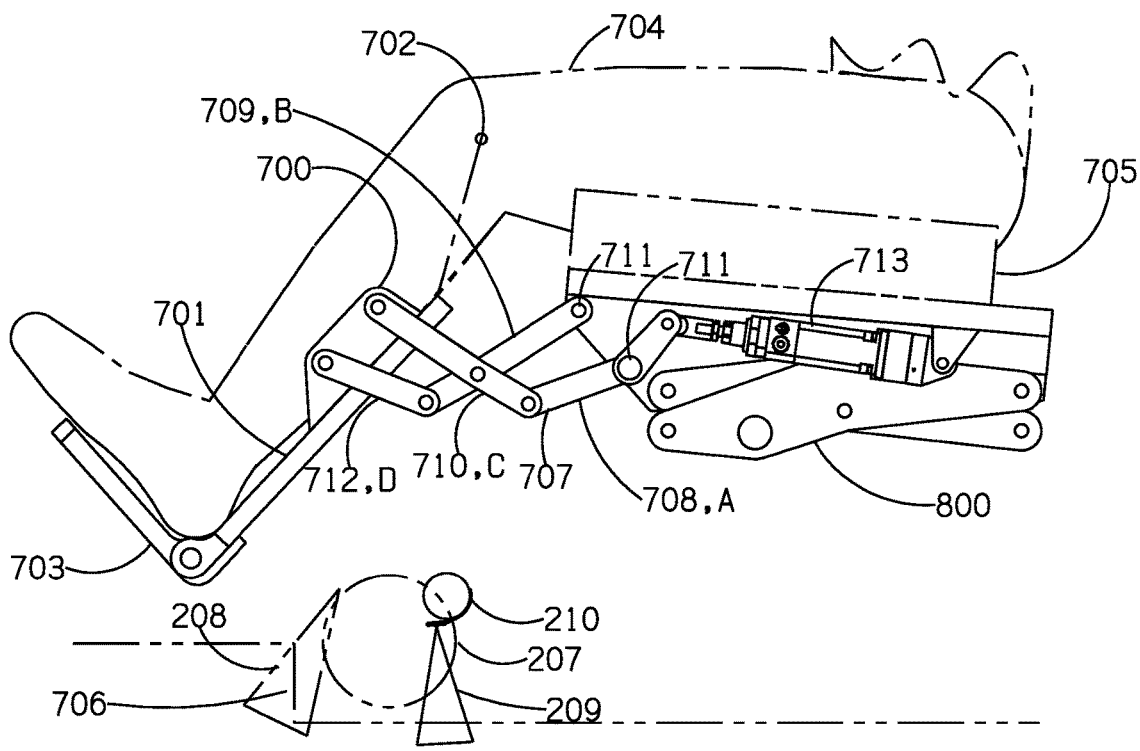

FIG. 8B is a side view of the legrest system 700 with seated occupant legs 704, seat 705, and skid wheel 207.

Figure 8C:
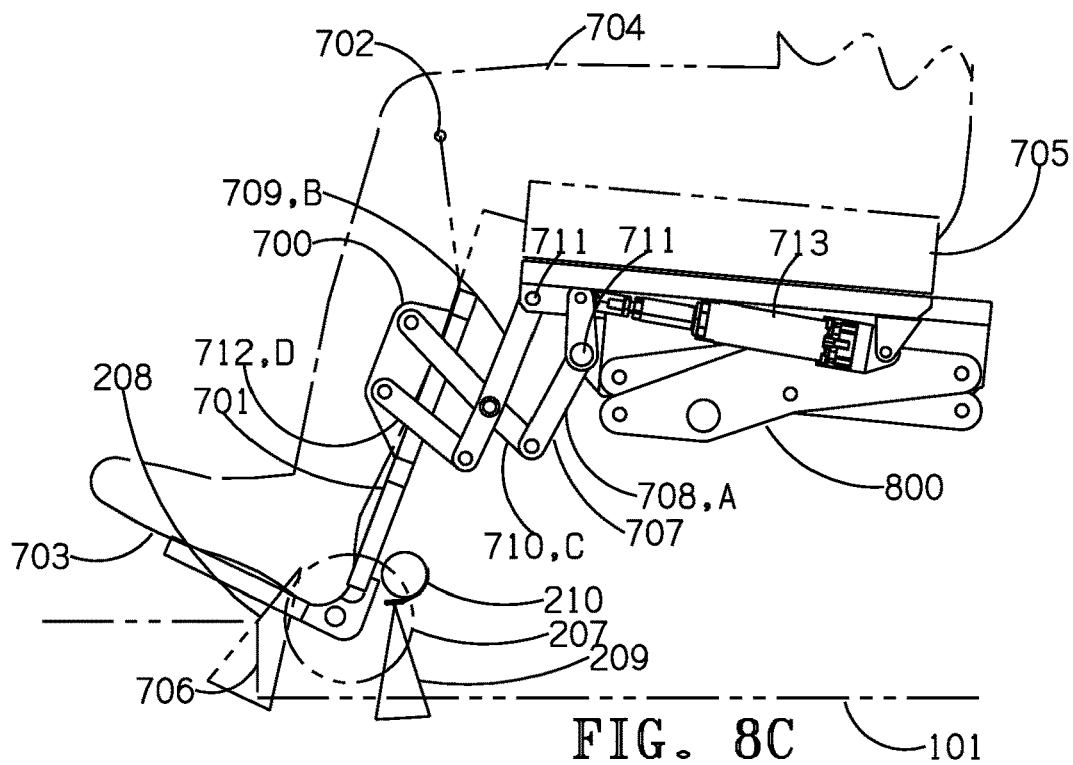

FIG. 8C is a side view of the legrest system 700 with the seat 705 low and legrest 701 aft and clearing skid crossbar 210 and showing the need for raising the legrest 700 for forward climbing FUS 706 steps.

Figure 8D:
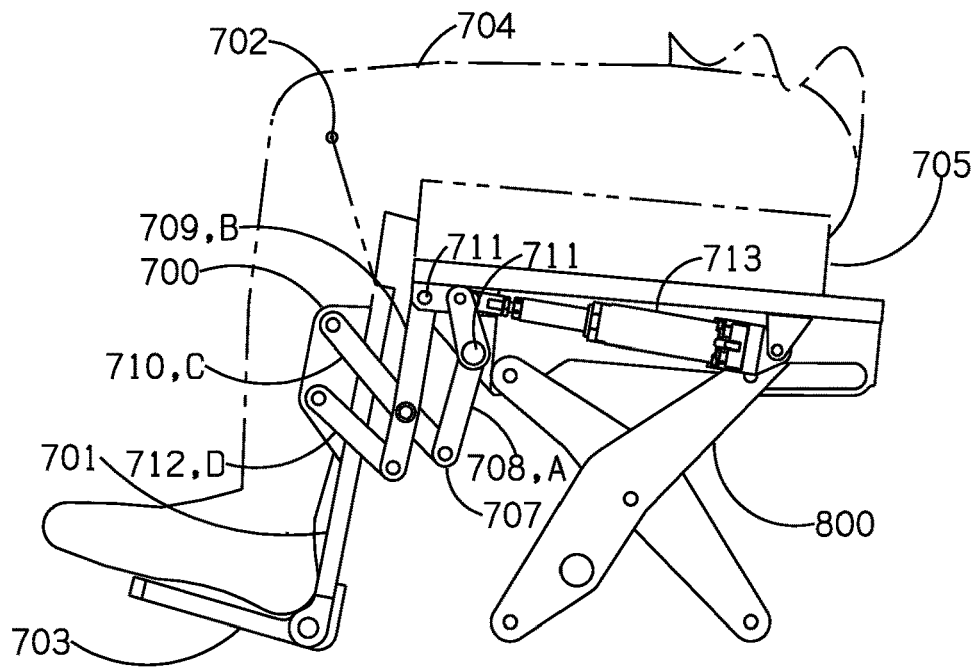
Figure 8D:
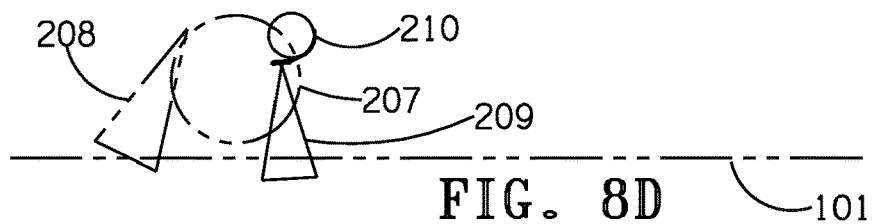

FIG. 8D is a side view of the legrest system 700 with the seat 705 fully elevated and the legrest 701 moved fully aft.

Figure 9:
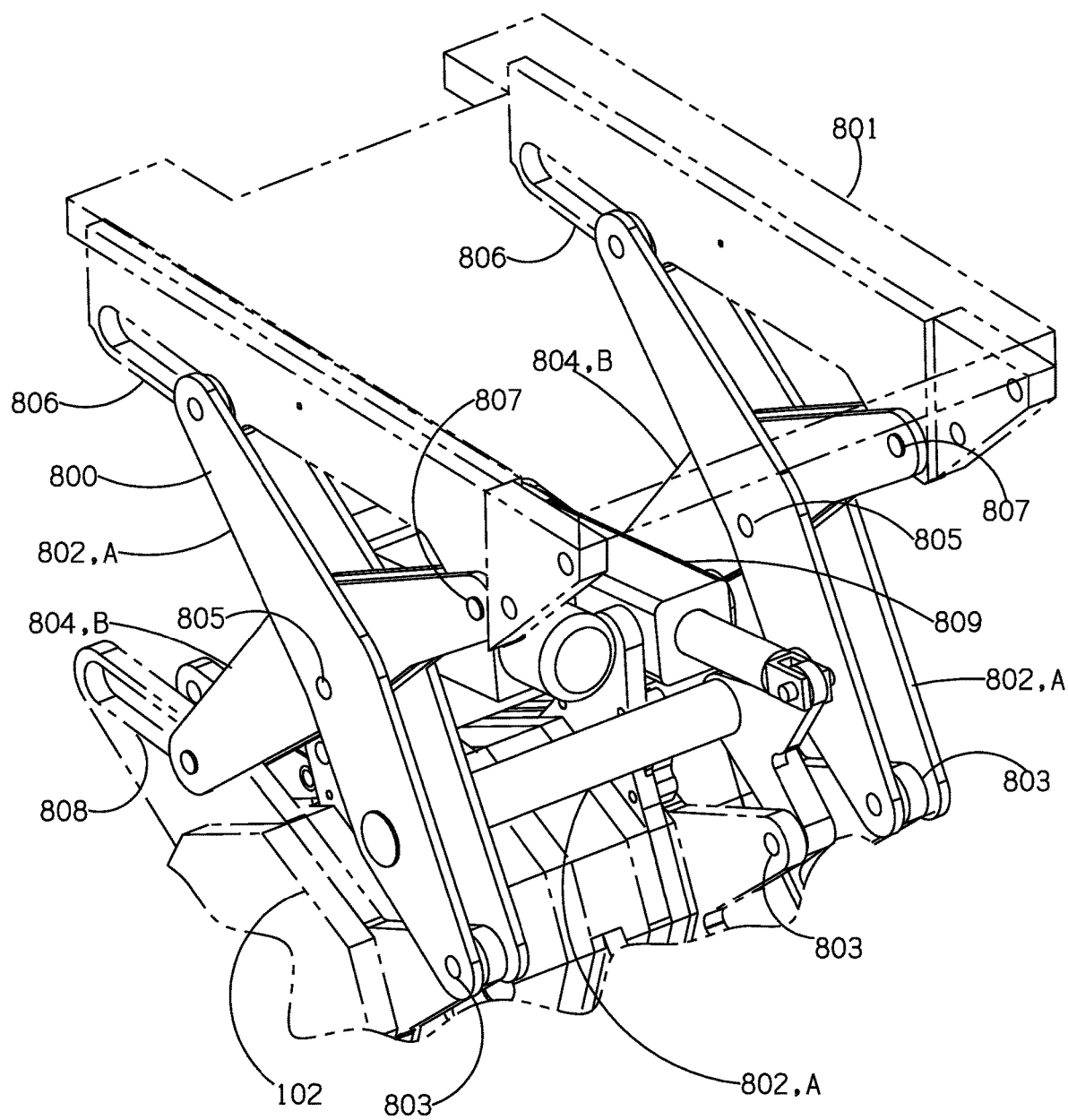

FIG. 9 is an isometric view of the seat height adjustment system 800 in the elevated position (SH_UP).

Figure 10A:
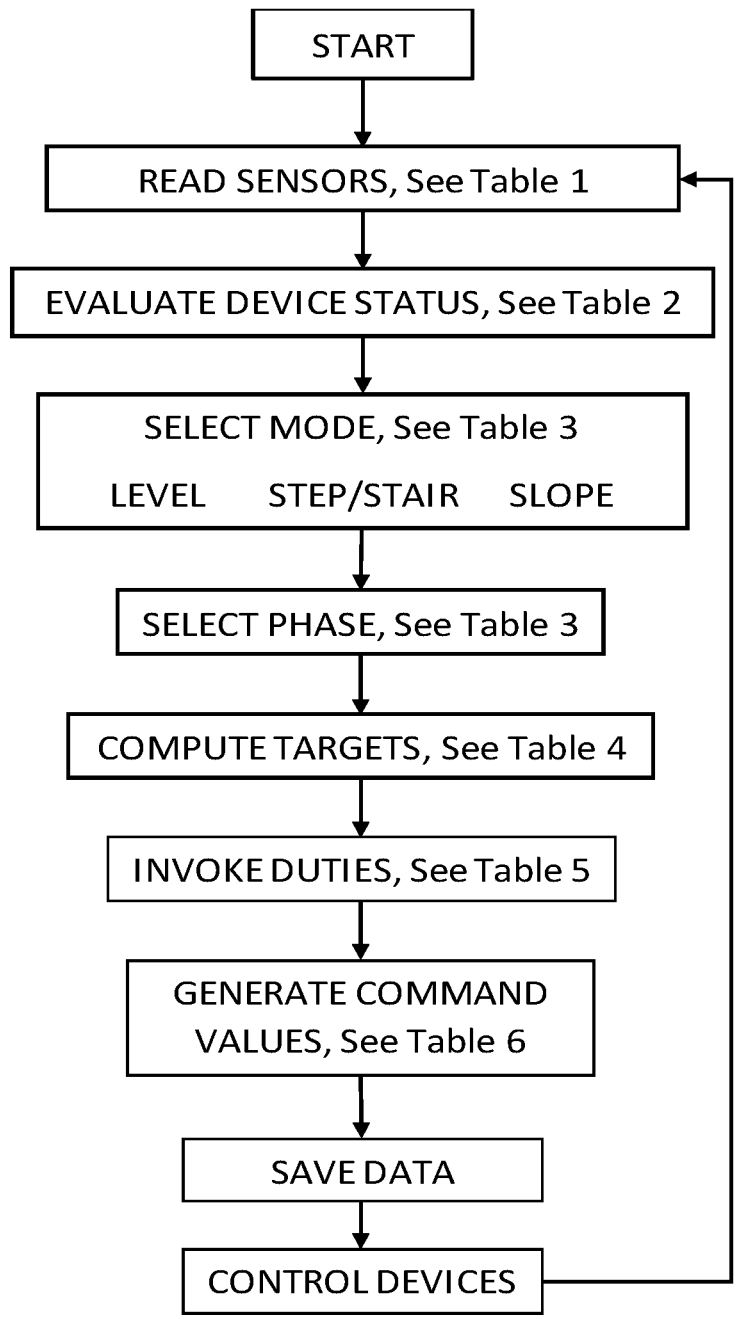

FIG. 10A is a flow diagram of the control system.

Figure 10B:
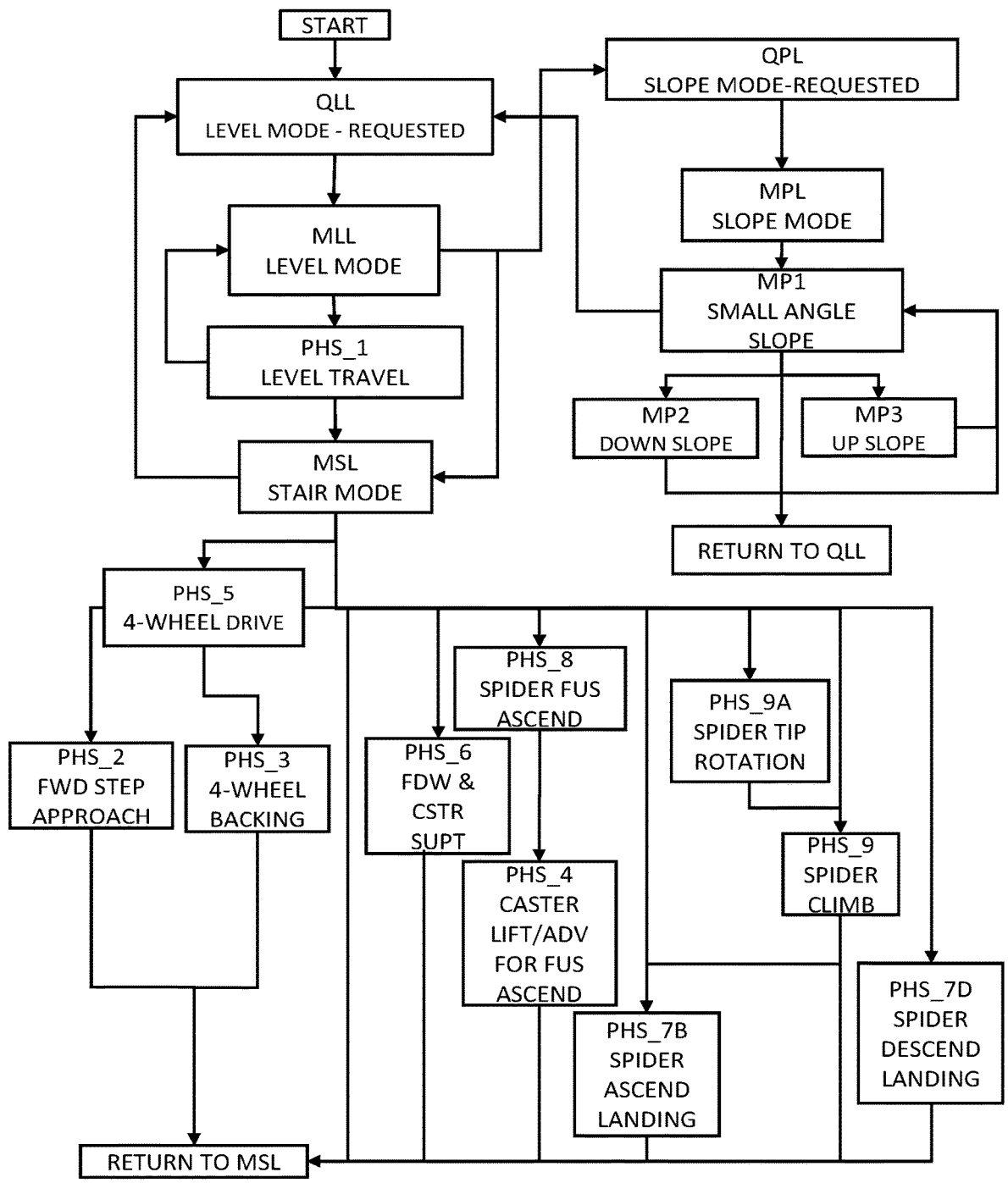

FIG. 10B is a flow diagram of the mode and phase selection system.

FIG. 11 is a side view of the wheelchair with seat and legrest removed and in the PHS_8 position.

FIG. 12A is a schematic illustrating the stair angle OK for backing for ascending from a lower landing (STR_BCK_OK) criteria FIG. 12B is a schematic illustrating the stair angle OK criteria for advancing for descending from an upper landing (STR_ADV_OK).

Figure 12C:
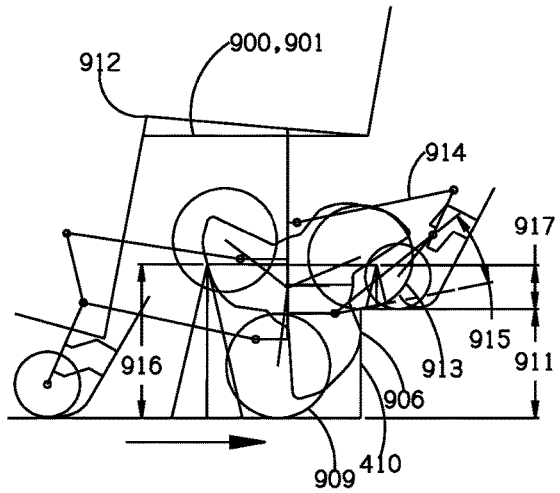

FIG. 12C is a schematic illustrating the step height OK criteria for backing to ascend a step (FDS_BCK_OK).

Figure 12D:
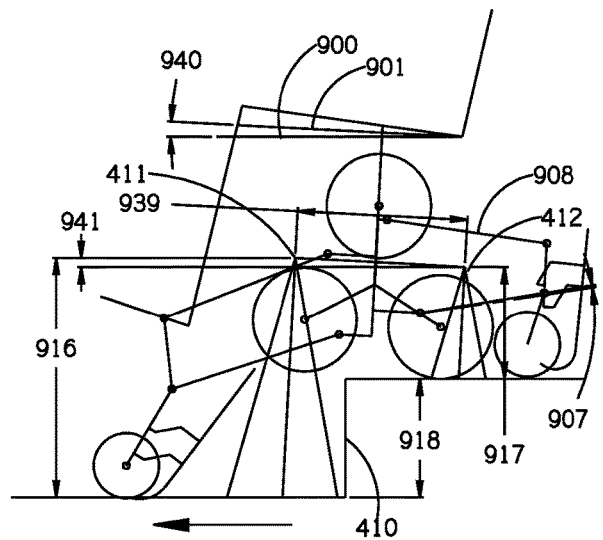

FIG. 12D is a schematic illustrating the step height OK criteria for advancing to descend an FDS step (FDS_ADV_OK).

Figure 12E:
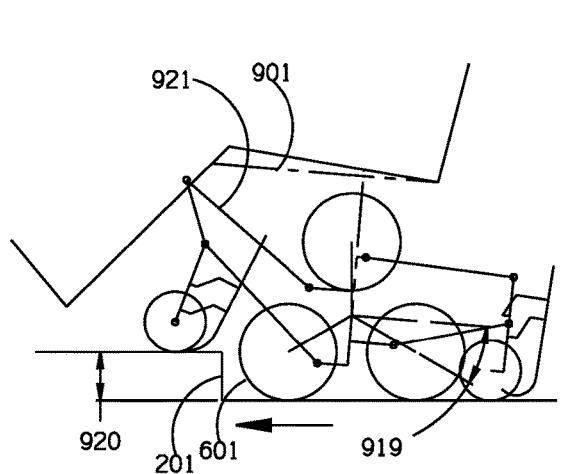

FIG. 12E is a schematic illustrating the step height OK criteria for advancing to ascend an FUS step (FUS_ADV_OK).

Figure 12F:
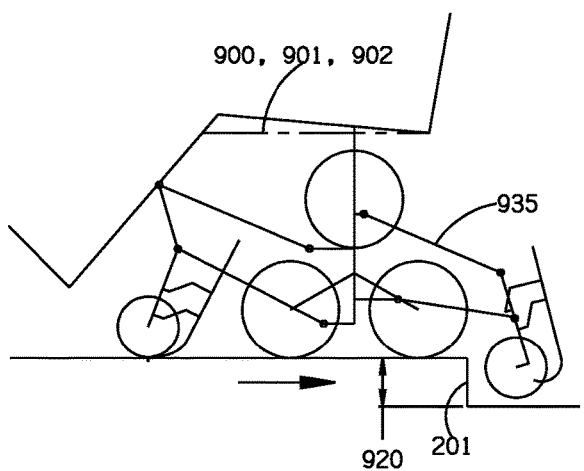

FIG. 12F is a schematic illustrating the step height OK criteria for backing to descend an FUS step (FUS_BCK_OK).

Figure 13A:
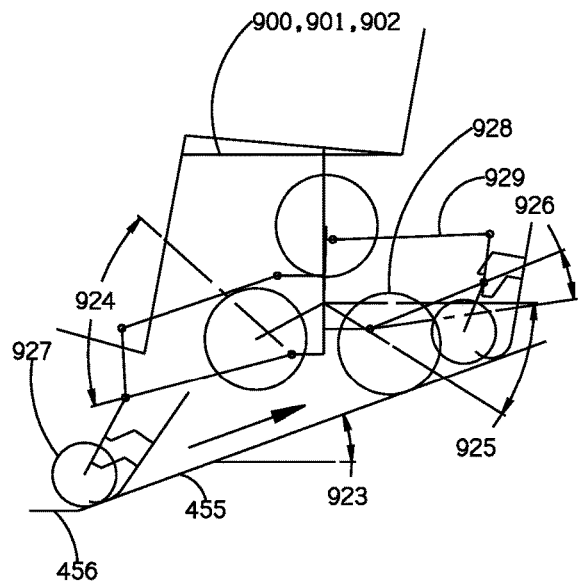

FIG. 13A is a schematic illustrating the down-slope angle OK for backing to ascend from a lower landing criteria (DSLP_BCK_OK).

Figure 13B:
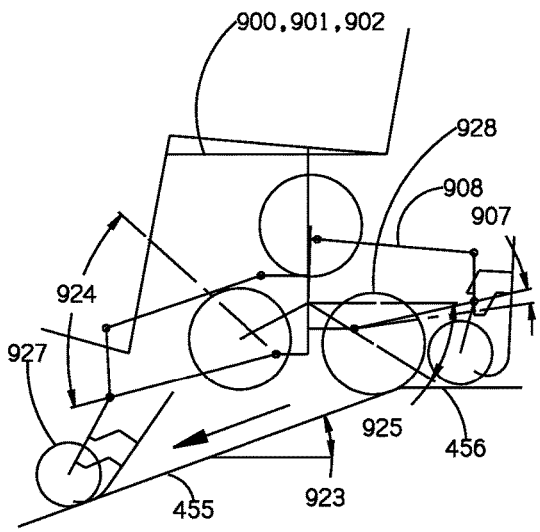

FIG. 13B is a schematic illustrating down-slope angle OK for advancing to descend from an upper landing criteria (DSLP_ADV_OK).

Figure 13C:
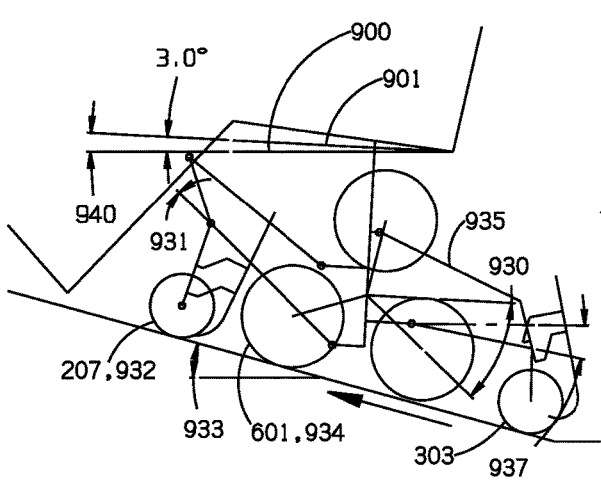

FIG. 13C is a schematic illustrating the up-slope angle OK for advancing to ascend from a lower landing criteria (USLP_ADV_OK).

Figure 13D:
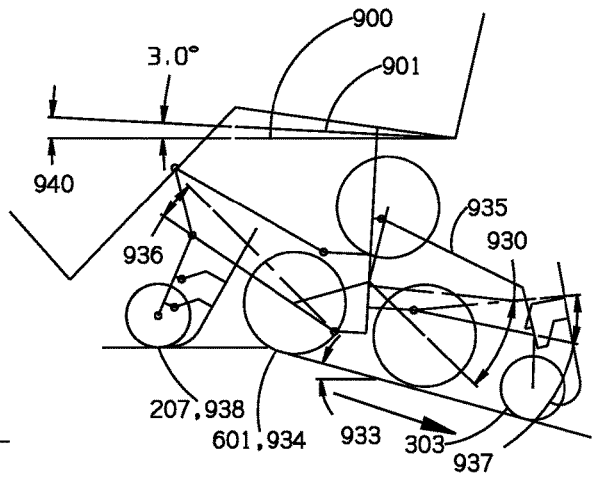

FIG. 13D is a schematic illustrating the up-slope angle OK for backing to descend from an upper landing criteria (USLP_BCK_OK).

Figure 14A:
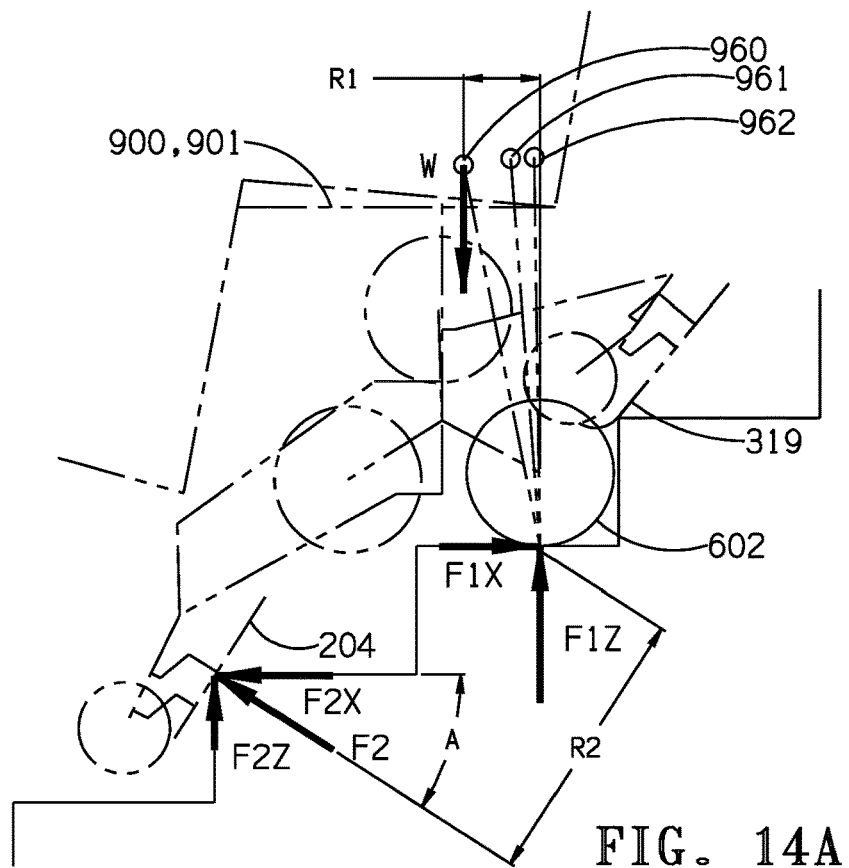

FIG. 14A is a side view showing a wheelchair schematic on stairs in PHS_9 and geometry for notional calculation of surface friction required for stability with a 7° forward center of gravity shift criteria and skid system 200 balance support.

Figure 14B:
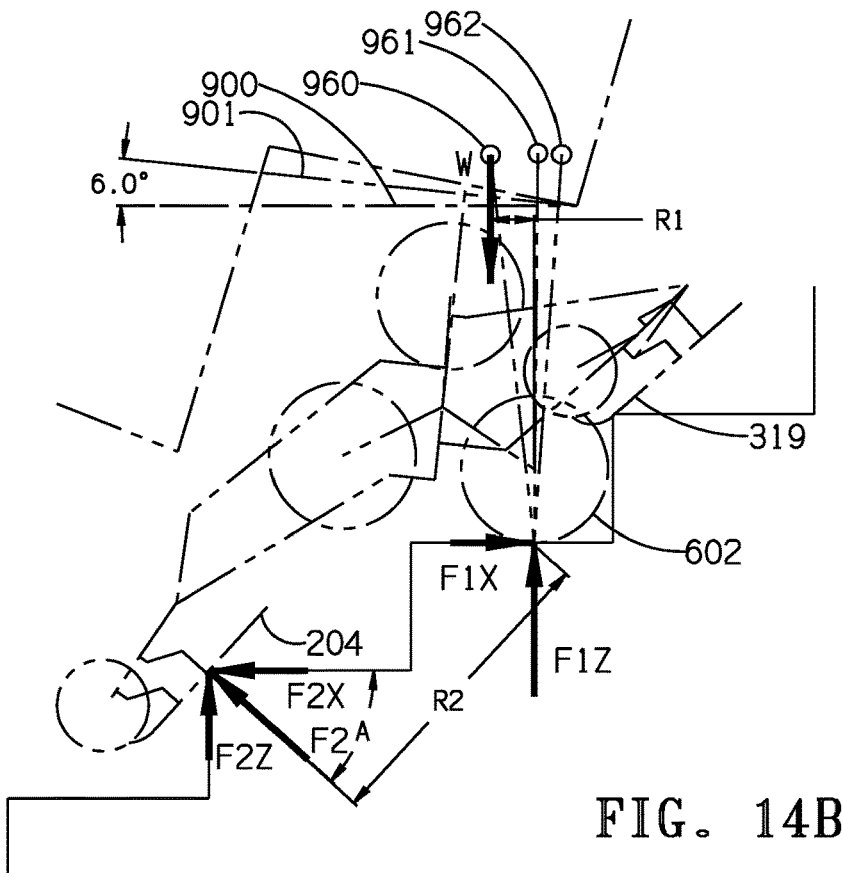

FIG. 14B is a side view showing the wheelchair schematic from FIG. 14A and the geometry for calculating improvement provided by a 6° pitch increase.

Figure 14C:
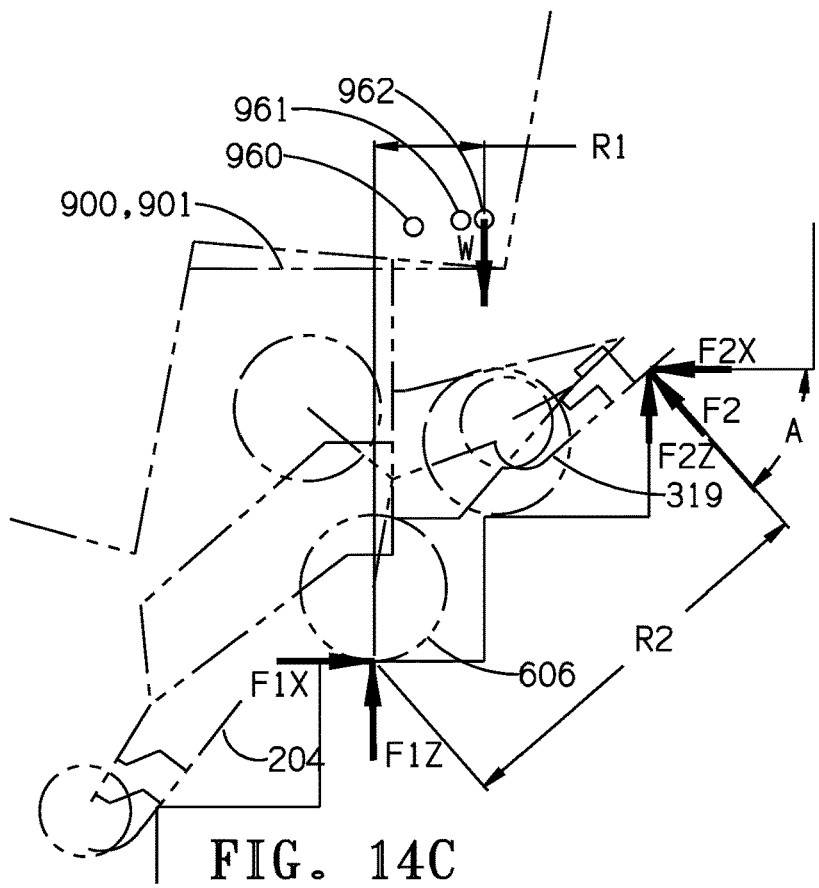

FIG. 14C is a side view showing a wheelchair schematic on stairs in PHS_9 and geometry for a notional calculation of surface friction required for stability with a 3.5° aft center of gravity shift criteria and caster system 300 balance support.

Figure 14D:
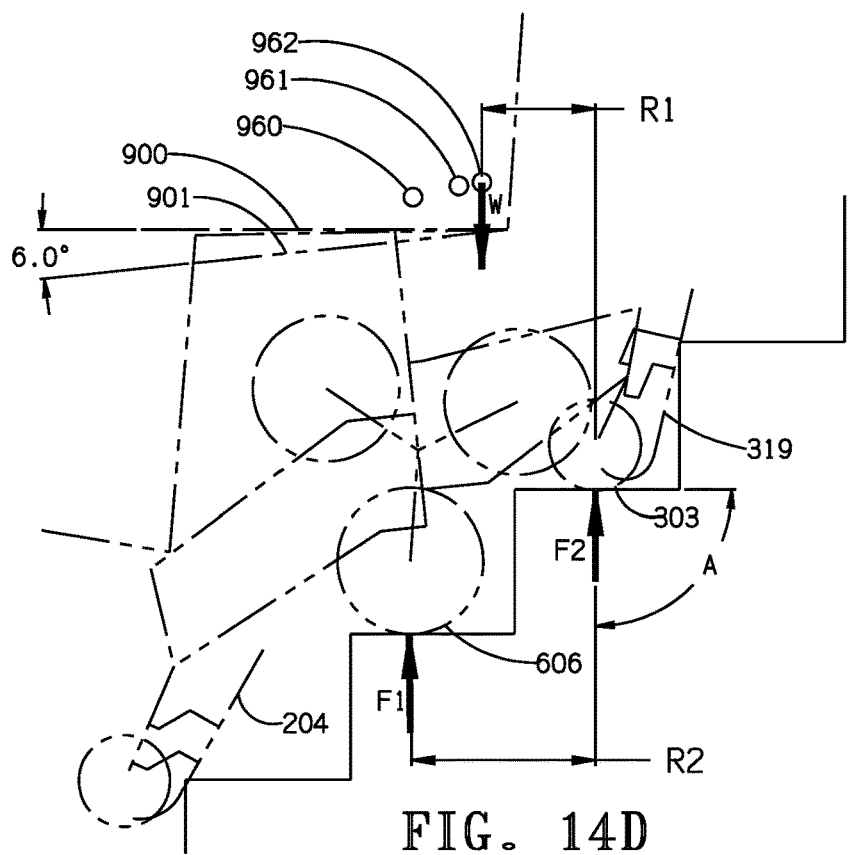

FIG. 14D is a side view showing the wheelchair schematic from FIG. 14C and the geometry for calculating the improvement provided by a 6° pitch decrease.

Figure 15A:
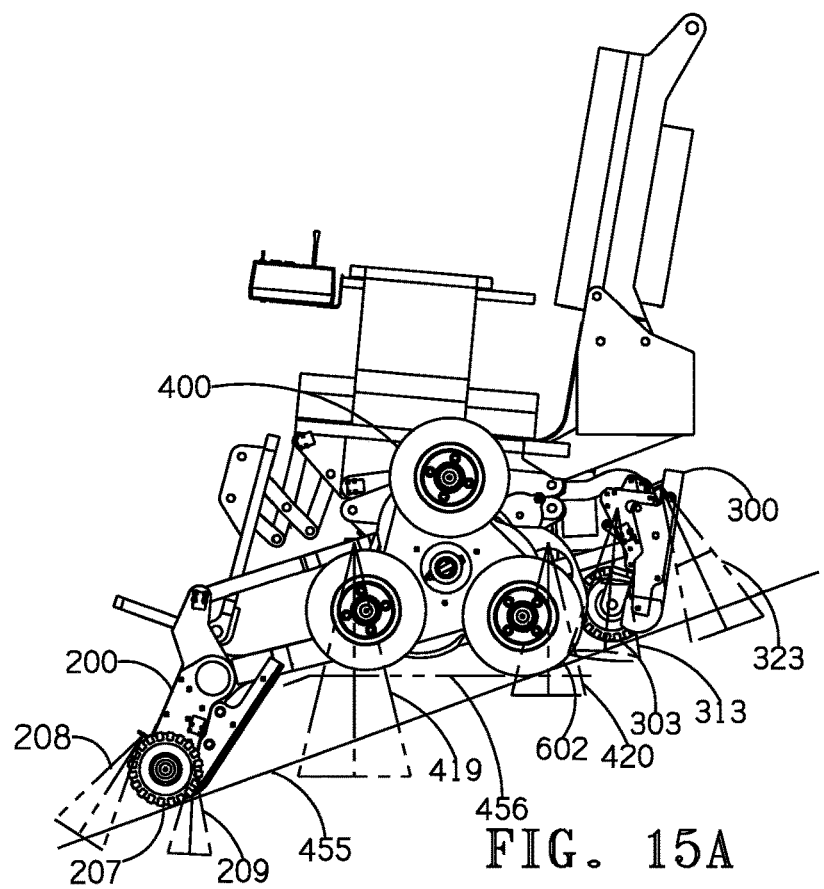

FIG. 15A is a side view showing the wheelchair 100 in the down-slope mode (MP2).

Figure 15B:
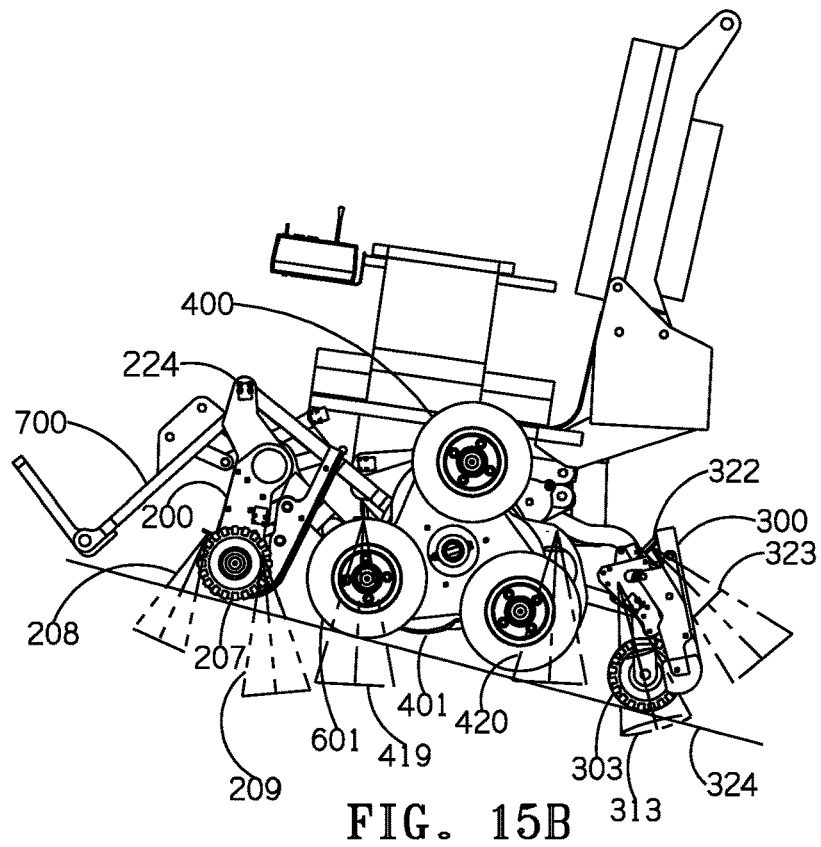

FIG. 15B is a side view showing the wheelchair 100 in the UP-SLOPE mode (MP3).

DETAILED DESCRIPTION

FIG. 1A is a front perspective view of an enhanced mobility wheelchair 100 in accordance with this invention, with the wheelchair 100 being configured for level travel. The skid system 200, caster system 300, spider system 400 and seatback 105 are shown in the PHS_1, LEVEL TRAVEL, position. The legrest system 700 is shown in the extended position. Control device 106, and motor drive/battery box 107 are shown.

Figure 1B:
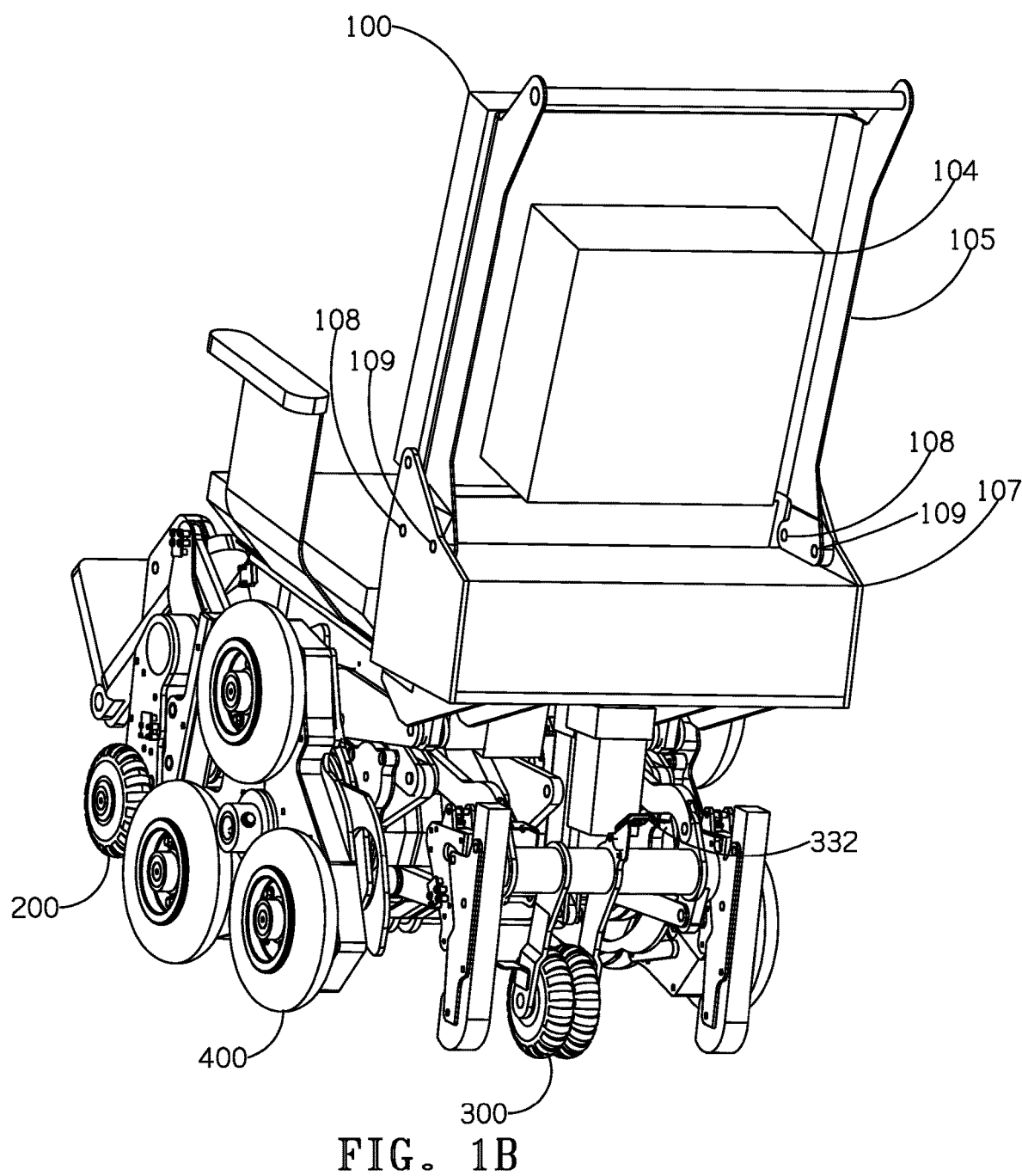

FIG. 1B is a rear perspective view of an enhanced mobility wheelchair 100 from FIG. 1A in accordance with this invention, with the wheelchair 100 being configured for level travel.

Figure 1C:
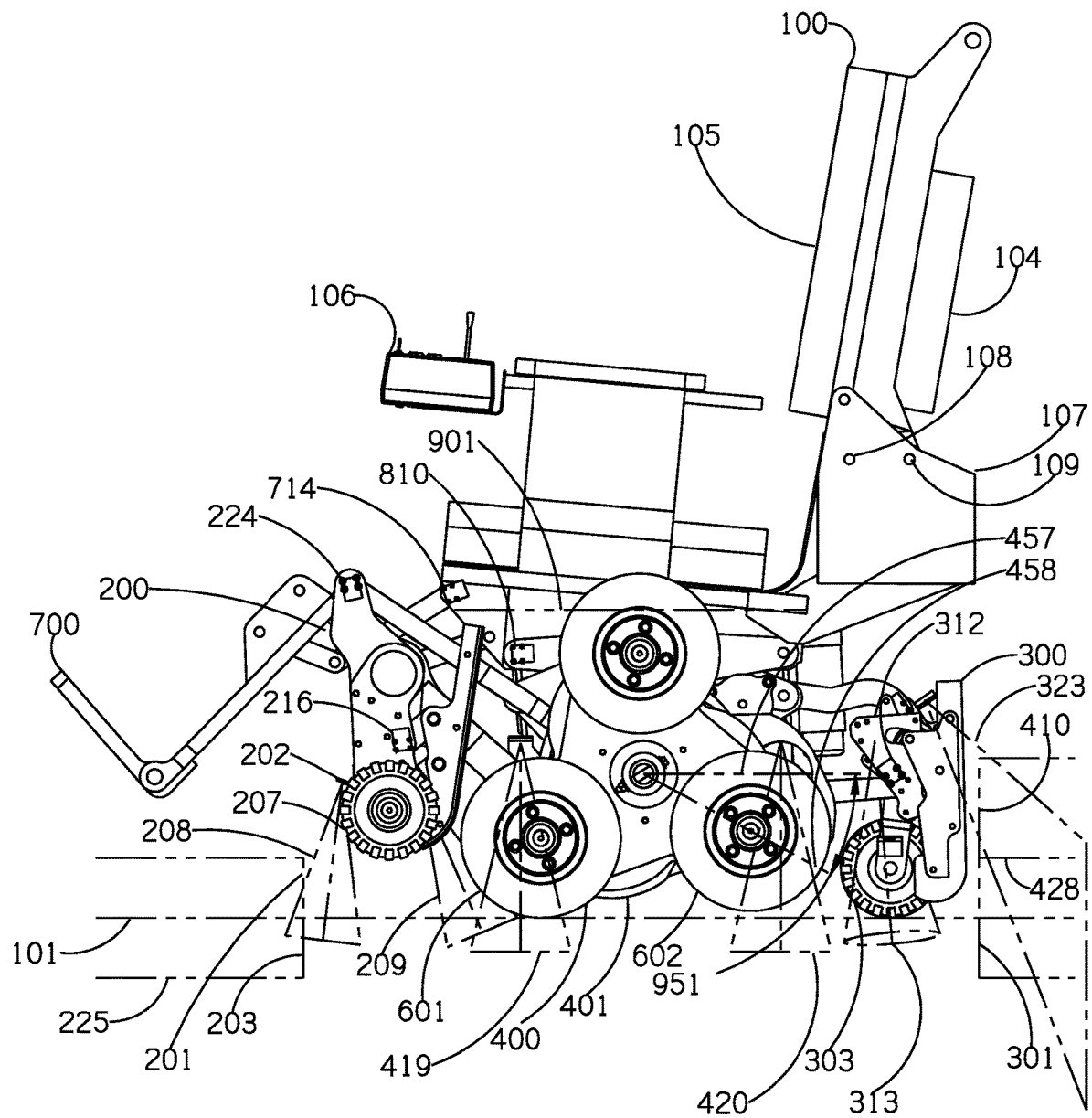

FIG. 1C is a side view of an enhanced mobility wheelchair 100 from FIG. 1A in accordance with this invention, with the wheelchair 100 being configured for level travel. The caster wheel 303 is supporting with the spider 403 rotated to lift the rear drive wheels 602 off the horizontal surface 101. The centrally located caster wheel 303 shown is a multi-directional wheel, although it could be a castering wheel and could be a pair rather than a single wheel. A single multi-direction wheel is preferred for a compact installation with reduced vehicle width. This enables turning without scrubbing the rear drive wheels 602. The skid wheel 207 is in the up position and is not needed for balance support in PHS_1. Pitch is measured by the inclinometer relative to a notional frame horizontal plane 457.

FIG. 1D is a perspective view of the wheelchair 100 from FIG. 1A with the seatback 105 folded. The seatback 105 is hinged about hinge pins 108. The seatback 105 is released by removing seatback latch pins 109 and repositioning them to hold the seatback 105 in the down position. The control device 106 is shown removed, which is customary for air transport to avoid damage.

FIG. 2 is a schematic of drive wheel engagement geometry. The front drive wheel height 953 (FDW_HT) to a surface under the drive wheel is the front drive wheel sensor 411 reading (FDW_RD) 952 minus the vertical height from the sensor 411 to the underside of the front drive wheel 601. The vertical height from the sensor is 1.7 inches plus the spider spoke length (6.0 inches) times the sine of the front spider spoke angle (180°−SD_ANG) 950 plus the drive wheel radius (4.0 inches).

(FDW_HT=FDW_RD−1.7−6.0*sine(180°−SD_ANG)−4.0).

The front drive wheel 601 is considered engaged if the drive wheel is within a wheel engagement range (W_EN_RG) 954 of a lower surface. The front drive wheel engagement distance (FDW_ED) 955 is the wheel engagement range (W_EN_RG) 954 minus the surface height (FDW_HT) 953. The front drive wheel engagement value (FDW_EMT) is 25*(FDW_ED/W_EN_RG) for full engagement equal 25 and for no engagement equal to 0.

The rear drive wheel height 957 (RDW_HT) to a surface under the drive wheel is the rear drive wheel sensor 412 reading (RDW_RD) 956 minus the vertical height from the sensor 412 to the underside of the rear drive wheel 602. The vertical height from the sensor is 1.7 inches plus the spider spoke length (6.0 inches) times the sine of the rear spider spoke angle (SD_ANG) 951 plus the drive wheel radius (4.0 inches).

(RDW_HT=RDW_RD−1.7−6.0*sine(SD_ANG)−4.0).

The rear drive wheel 602 is considered engaged if the drive wheel is within a wheel engagement range (W_EN_RG) 954 of a lower surface. The rear drive wheel engagement distance (RDW_ED) 958 is the wheel engagement range (W_EN_RG) minus the surface height (RDW_HT) 957. The rear drive wheel engagement value (RDW_EMT) is 25*(RDW_ED/W_EN_RG) for full engagement equal 25 and for no engagement equal to 0.

FIG. 3A is a perspective view of the skid system 200 for the enhanced mobility wheelchair illustrated in FIG. 1A with the gearbox 102 and other adjacent hardware omitted for clarity. The skid system 200 includes a four-bar mechanism which consists of a skid torque tube 211, a skid system device mount or bogie 212, stabilizing links 213, and gearbox rotary attach points 214. Skid actuator 215 is connected to the skid torque tube 211 and gearbox 102. A forward step height ToF sensor 202 and a runner rotary sensor 216 are mounted on the left and the right side of the skid system bogie 212. Skid wheel-to-step height sensor 205 is mounted on the skid crossbar 210 to monitor a virtual engagement (KWT_EMT) of the skid wheel 207 to a horizontal surface 101. Skid system position sensing means includes a skid position rotary sensor 224 mounted on the skid crossbar 210 and senses rotation of a stabilizing link 213. Skid angle (SKD_ANG) is the rotation angle or skid torque tube 211 relative to the gearbox 102 and is computed from skid position rotary sensor 224 angles and skid geometry for convenience.

FIG. 3B is a perspective view of the skid wheel and runner mount 217 for runner deflection sensing device 206 and skid wheel 207. Mounts 217 are rigidly attached to the left and right sides of skid system bogie 212. The runner rotary position sensor 216 is attached to the mount 217 on the rotation axis of the skid runner link C 218 to monitor skid runner 204 engagement. The skid runner rotary position sensor 216 measures the rotation of skid runner link C 218 to monitor skid runner engagement (KGLA_EMT or KGRA_EMT). Skid runner engagement is 0 (KGLA_EMT=0 and KGRA_EMT=0) for the undeflected runner deflection sensing device 206 shown in FIG. 3E and 25 (KGLA_EMT=25 or KGRA_EMT=25) for the fully deflected position shown in FIG. 3F. The skid system bogie 212 and the runner deflection sensing device 206 are removed for clarity.

FIG. 3C is a perspective view of the runner deflection device 206. The runner deflection devices 206 include a four-bar linkage consisting of a skid runner bogie B 219, skid runner bellcrank A 220, skid runner link C 218, and rotary attach points 221 to mount 217. An extension spring 222 is connected to a skid runner bellcrank A 220 and the mount 217. Skid runners 204 are attached to skid runner bogie B 219. The runner deflection device 206 is attached to the mount 217 at rotary attach points 221.

FIG. 3D is a top elevation view of a portion of the skid system 200 from FIG. 3A with SECT. A and SECT. B cuts through the runner deflection sensing device 206.

FIG. 3E is SECT. A cut of the skid system 200. FIG. 3E shows the runner deflection sensing device 206 in the undeflected position with (KGLA_EMT=0 and KGRA_EMT=0). The figure shows the height differences the forward step height ToF sensor 202 will read for an FUS step 201, a horizontal surface 101, and an FDS 203 step. The forward step height sensing means includes the forward step ToF sensors 202 attached to skid crossbar 210 for skid wheels 207 and aimed down and forward of the wheelchair 100 with sensor readings 227 (KLFT_RD or KRFT_RD). The forward step height 228 (KLFT_HT or KRFT_HT) is the vertical height from a horizontal surface 226 to the skid wheel 207 underside and is computed from installation geometry and forward step height sensor readings 227.

(KLFT_HT=(KLFT_RD−4.05)*cosine(22°))

(KRFT_HT=(KRFT_RD−4.05)*cosine(22°)).

Forward step engagement value is 25 times the engagement range (W_EN_RG) minus the forward step height divided by the engagement range.

(KLFT_EMT=25*(W_EN_RG−KLFT_HT)/ W_EN_RG)

(KRFT_EMT=25*(W_EN_RG−KRFT_HT)/ W_EN_RG)

Forward step engagement (KLFT_EMT or KRFT_EMT) is a value from 0 to 25 with a value of 25 for the forward step height 228 equal to 0 (KLFT_HT=0 or KRFT_HT=0) and forward step engagement is 25 for the step height equal 0 (KLFT_HT=0 or KRFT_HT=0).

The skid wheel height sensing means includes the skid wheel-to-step height sensor 205 attached centrally to skid crossbar 210, located adjacent to the skid wheels 207 and aimed down with sensor reading 229 (KWT_RD). The skid wheel step height 230 (KWT_HT) is the vertical distance to a horizontal surface 101 from skid wheels 207 and is computed from installation geometry and sensor reading 229 (KWT_RD).

(KWT_HT=(KWT_RD−3.77)*cosine(8°)).

Skid wheel engagement value is 25 times the engagement range (W_EN_RG) minus the skid wheel step height divided by the engagement range.

(KWT_EMT=25*(W_EN_RG−KWT_HT)/ W_EN_RG)

(KWT_EMT=25*(W_EN_RG−KWT_HT)/ W_EN_RG)

Skid wheel engagement (KWT_EMT) is a value from 0 to 25 with a value of 0 for skid wheel step height 230 (KWT_HT) equal the wheel engagement range (W_EN_RG). Skid wheel engagement is equal to 25 for the skid wheel step height 230 (KWT_HT) equal 0. A 25 skid engagement value is considered compressed or supporting. A Skid wheel engagement value greater than 0 is considered engaged.

A wheelchair forward step height (WF_HT) 231 is the skid wheel-to-step height 230 (KWT_HT) minus the largest forward step height relative to the skid wheel (KLFT_HT or KRFT_HT) 228.

(WF_HT=KLFT_HT−KWT_HT) or (WF_HT=KRFT_HT−KWT_HT).

A positive WT_HT indicates an FUS 201 and a negative WT_HT indicates an FDS 203. The skid system 200 advancing to a down step (SKD_APR_FDS) is indicated by a less than −1.0 inch forward down step (FDS 203) and advancing.

(SKD_APR_FDS=(WF_HT<−1) & ADV)

Skid system 200 approaching a forward up step indication (SKD_APR_FUS) comprises advancing to wheelchair forward up step 201 as indicated by a greater than 1.0 inch forward up step height (WF_HT) 231 and advancing (ADV).

(SKD_APR_FUS=(WF_HT>1) & ADV)

FIG. 3F shows the components from FIG. 3D with the runner deflection sensing device 206 in the deflected position. The runner deflection sensing device 206 is deflected by an FDS step force 223 from an FDS 203 step edge with (KGLA_EMT=25 and/or KGRA_EMT=25). The FIG. 3F also shows the skid wheel 207 supporting (KWT_SUPT) as indicated by the skid wheel-to-step height sensor 205 and skid wheel-to-step height path 209

FIG. 4A is a graph of the pitch speed factor (PTC_FTR) for drive speed reduction as a function of pitch deviation from a pitch target (CHR_ATT−PTC_TG). Wheelchair pitch (CHR_ATT) is measured by an inclinometer relative to a notional frame horizontal 457, shown in FIG. 3C. Leg rest up is a positive CHR_ATT value. The pitch speed factor (PTC_FTR) slows the wheelchair travel speed gradually when the wheelchair is unable to meet the pitch target for any reason, providing time for pitch adjusting means to catch up or providing the wheelchair occupant a warning that the wheelchair may be approaching an operational limit. The factor is zero for chair attitude minus pitch target less than −6° or more than 6°. Between −6° and 6° the factor varies between 0 and 1 by the equation 1−0.0278*(CHR_ATT−PTC_TG)^2.

(For (−6°>CHR_ATT−PTC_TG<6°): PTC_FTR=1−0.0278*(CHR_ATT−PTC_TG)^2.

FIG. 4B is a graph of the roll speed factor (ROLL_FTR) for drive speed reduction as a function of lateral or roll pitch (ROLL_ATT) deviation from the horizontal. roll pitch (ROLL_ATT) is measured by an inclinometer relative to a frame lateral horizontal. The roll speed factor (ROLL_FTR) slows the wheelchair travel speed gradually when the wheelchair rolls laterally to warn the wheelchair occupant that the wheelchair may be approaching an operational limit. The factor is zero for chair roll (ROLL_ATT) less than −6° to the left or more than 6° to the right. Between −6° and 6° the factor varies between 0 and 1 by the equation 1−0.0278*ROLL_ATT^2.

(For (−6°>ROLL_ATT<6°): ROLL_FTR=1−0.0278*ROLL_ATT^2).

FIG. 5A is a perspective view of the caster system 300. The caster system 300 includes a four-bar mechanism which consists of a caster torque tube A 311, a caster system bogie B 307, stabilizing links C 308 and gearbox rotary attach points 309. The caster actuator 310 is connected to the caster torque tube A 311 and gearbox rotary attach points 309. Caster runner deflection sensing devices 305 and runner position sensors 312 are mounted on the left and the right side of the caster system bogie B 307. Caster system 300 position sensing means includes a caster position rotary sensor 306 mounted on the caster system bogie B 307 and senses rotation of a stabilizing link C 308 relative to caster system bogie B 307. Caster angle (CST_ANG) is the rotation angle of caster torque tube A 311 relative to the gearbox 102 and is computed from caster position rotary sensor 306 angles and caster system 300 geometry for convenience.

FIG. 5B is a top elevation view of the gearbox 102 and caster system 300 for the components shown in FIG. 5A. SECT. C and SECT. F cuts are made through the gearbox 102, caster 300, and caster step height sensor path 313 which are shown in FIG. 5C and FIG. 5F. SECT. D and SECT. E cuts are made through one of the two runner deflection sensing devices 305 and are shown in FIG. 5D and FIG. 5E. A runner deflection sensing device 305 is mounted on the left and right sides of the caster system 300.

FIG. 5C is SECT. C through the gearbox 102 and caster system 300 showing the caster wheel height sensor 304, sensor path 313, FDW front drive wheel to step height sensor 411, FDW step height sensor path 419, RDW rear drive wheel step height sensor 412, and RDW step height sensor path 420. Caster wheel height sensor 304 is mounted to the caster system bogie B 307 beside the caster wheel 303 and senses the distance to a horizontal surface 314 to determine caster wheel 303 engagement (CWT_EMT). The RDW step height sensor 412 is mounted to the gearbox 102 and beside the rear drive wheels 602 and is used to determine rear drive wheel 602 engagement (RDW_EMT). The FDW step height sensors 411 are mounted to the gearbox 102 and beside the front drive wheel 601 and are used to determine front drive wheel 601 engagements (FDW_EMT).

FIG. 5D is SECT. D showing the caster runner deflection device 305 from FIG. 5B in the free position. Caster runner position sensor 312 measures rotation of the runner bellcrank B to monitor caster runner engagement (CSLA_EMT or CSRA_EMT). The caster runner engagement is 0 for the undeflected position (CSLA_EMT=0 and CSRA_EMT=0).

The caster runner deflection device 305 includes a four-bar linkage consisting of a caster runner bogie D 320, runner bellcrank E 318, runner link F 315, and rotary attach points 316 to the caster system bogie B 307. An extension spring 317 is connected to a runner bellcrank E 318 and the caster system bogie B 307. Caster rear runner 319 is attached to the caster runner bogie D 320.

FIG. 5E is the caster runner deflection device 305 from FIG. 5D deflected by FDS step force 321 from an FDS 302 step. The caster runner engagement is 25 for the deflected position (CSLA_EMT=25 and/or CSRA_EMT=25).

FIG. 5F illustrates the caster wheel height sensing means including the caster wheel-to-step ToF sensor 304 mounted to the caster system bogie B 307 and pointed down with caster wheel-to-step reading (CWT_RD) 329. FIG. 5F also illustrates the rear step height sensing means including the rear step height sensor 322 attached to caster system bogie B 307 and aimed down and aft of the wheelchair 100 with rear step sensor reading 326 (RSTP_RD). Caster wheel height (CWT_HT) 330 is the vertical distance to surface below caster wheel 331 computed from caster wheel-to-step ToF sensor 304 located adjacent to the caster wheel 303 and installation geometry.

(CWT_HT=(CWT_RD−8.8)*cosine(5.0°))

The wheelchair rear step height 332 (WR_HT) is the height of a step behind the wheelchair and is computed from installation geometry and rear step reading 326 (RSTP_RD) plus caster wheel height (CWT_HT).

(WR_HT=(12.7−RSTP_RD)*cosine(31°)+CWT_HT)

Forward down step for an FDS 410 WR_HT 328 is a positive value. Rear step height for an FUS 301 WR_HT 327 is a negative value. See FIG. 5F. Caster backing to approach an FUS step (CST_APR_FUS) is indicated by a rear step (FUS) height less than −0.5 inches (WR_HT<−0.5) and backing (BCK).

(CST_APR_FUS=(WR_HT<−0.5) & BCK).

A rear low step 428 (RE_LO_STP) is indicated by an FDS height between 0.5 and 4 inches (RE_LO_STP=0.5<WR_HT<4). A rear high step 410 (RE_HI_STP) is indicated by an FDS 410 height equal or greater than 4 inches (RE_HI_STP=WR_HT≥4).

FIG. 6A is a perspective drawing of gearbox 102 with the spider system 400 and spider cams 401 for the wheelchair 100 shown in FIG. 1A.

FIG. 6B is a perspective drawing of the spider system 400 and spider cams 401 with the gearbox 102 removed for clarity. FIG. 6B shows the spider cam posts 404 attached to the spider 403 and the spider internal cams 405. The spider cam posts 404 limit the stroke of the spider cam 401 relative to spider 403. No adjustment is required, and thus the possibility of mis-adjustment is avoided.

FIG. 6C is a side view showing the spider system 400 and engagement spider cam 401 in the level position and on the occupant's right side and looking from the wheelchair center and outboard. The spider cam 401 includes one step engaging surface 459 for the number of drive wheels 606 with the spider cam rotary axis 460 parallel to the spider central axis 461 and located aft of the spider central axis. See FIG. 6C and FIG. 6D. The spider cam 401 rotates relative to the spider spokes 402 when contacting a step 410. Spider cam 401, shown solid, is in the undeflected position with spider crowd engagement=0. (CWD_LFT=0 and CWD_RHT=0). Spider cam 421, shown phantom, is the 5° deflected position (CWD_LFT=5 and/or CWD_RHT=5). Spider cams are engaged for a positive spider crowd engagement (CWD_LFT>0 and/or CWD_RHT>0). Posts 422, 423 contact internal cams 405 in spider 401 to limit the spider cam 401 to rotate in unison with the spider 403 when preloaded by cam-engaging arm 424. Post 425 limits the spider cam 421 rotation when deflected by contact with FDS step 426 riser.

The spider cam tip 427 is truncated to permit the spider system 400 to back over a rear low height steps 428 without spider cam 401 engagement for PHS_3. To ensure spider cam 401 engagement for steps which are slightly higher than a rear low height step 428, the spider system 400 is rotated in the PHS_9A to the position shown in FIG. 6D. This also ensures that the undeflected spider cam's 429 limited control ability shown in FIG. 6C is improved at the spider system 400 position shown in FIG. 6D. In the spider system 400 position in FIG. 6C, the rear drive wheel 602 radius is close to the undeflected spider cam 429 and to the FDS 410 step riser and thus has limited deflection available for sensing a FDS 410 step riser resulting in reduced ability for sensing FDS 410 step engagement, especially for spider cam steering (DR_CAM_STR).

FIG. 6D is a side view same as FIG. 6C except the spider system 400 and spider cam 401 are rotated for climbing. Spider cam 430, shown solid, is deflected while the spider cam 434 shown in phantom is undeflected. Spider cam 430 is deflected by cam loading force 431 from the FDS 410 step riser and limited by spider cam posts 432, 433 in internal cams 405. The undeflected spider cam 434 is limited by spider cam post 435 in an internal cam 436 when preloaded by an arm 406. The rear drive wheel 602 clearance to FDS 410 step riser is large and thus the spider cam 401 is well suited for sensing engagement to FDS 410 step riser and for spider cam steering (DR_CAM_STR).

FIG. 6E is a top view of the right spider system 400 with a portion of the gearbox 102. SECT. G cut is made through the spider cam gear 413 and cam angle sensing gear 414, see FIG. 6F. A cam angle rotary sensor 407 is mounted to the gearbox 102 on the rotation axis of the cam angle sensing gear 414. SECT. H cut is made through the spider 403, showing spider cam biasing components including cam loading spring 417, see FIG. 6H.

FIG. 6F is SECT. G from FIG. 6E. Spider cam 401 is attached to a spider cam gear 413 which rotates around a large diameter hub 437 with a center of rotation 460 which is offset from spider central axis 461. A cam angle sensing gear 414 engages the spider cam gear 413. The pitch diameter of the cam angle sensing gear 414 is the pitch diameter of the spider cam gear 413 divided by the number of spider spokes 402, three in this case. The rotation of the cam angle sensing gear 414 is monitored by the cam angle rotary sensor 407. The spider cam rotation angle (SL_ANG or SR_ANG) is measured clockwise from a frame aft horizontal line 457. See FIG. 1C. The spider cam rotation angle, (SL_ANG or SR_ANG) measured clockwise, is the spider cam angle rotary sensor 407 angular reading (SL_ANG_RD or SR_ANG_RD) divided by the number of spokes and trimmed for a spider cam spoke parallel to frame aft horizontal line 457.

SL_ANG=SL_ANG_RD/3+$C_t$

SR_ANG=SR_ANG_RD/3+$C_t$

FIG. 6F illustrates the means to urge or bias the spider cam 401 to match spider system 400 rotation and means to limit spider cam 401 rotation resulting from spider cam 401 contact to FDS 410. The spring-loaded cam-engaging arm 406 biases the spider cam 401 to load an internal cam 405 of spider cam 401 to contact a spider cam post(s) 404. Cam loading springs 417 apply a moment to the cam-engaging arms 406 by loading spring 417 with loading links 441 and spring loading arms 438 as shown in FIG. 6G and FIG. 6H. At any given spider angle only one or two cam-engaging arms 406 will engage the spider cam 401 as shown in FIG. 6C and FIG. 6D. This is done to ensure optimum moment arm for back driving the cam-engaging arms 406 and is done by arm stops 439 shown in FIG. 6H.

FIG. 6G is a perspective view of the spider cam angle sensing means showing the spider cam 401, cam angle sensing components from FIG. 6F and cam biasing components. Cam-engaging arms 406 are indexed to spring loading arm 438 and pivot about loading arm rotary axis 440 on the spider 403. Cam loading spring 417 is connected to the loading arm 438 with the spring loading link 441 and to the spider 403 at the other end.

FIG. 6H is SECT. H from FIG. 6E and shows the spring loading arms 438, arm stops 439, loading arm rotary axis 440, cam loading springs 417 and spring loading links 441 inside the spider 403.

FIG. 6I is a perspective view of the spider rotation angle sensing means illustrating the spider shaft 409, spider shaft angle gear 442, the spider angle sensing gear 443 and spider angle rotary sensor 408. The rotation of the spider angle sensing gear 443 is monitored by the spider angle rotary sensor 408. The spider angle rotary sensor 408 is attached to the gearbox 102 on the rotation axis of the spider angle sensing gear 443. The pitch diameter of the spider angle sensing gear 443 is the pitch diameter of the spider shaft angle gear 442 divided by the number of spider spokes 402 to provide one full spider angle sensing gear 443 rotation for each spider spoke 402.

The spider rotation angle 951 (SD_ANG) is measured clockwise from a frame aft horizontal line 457. See FIG. 1C. The spider spoke angle, SD_ANG measured clockwise, is the rotary sensor 408 angular reading (SD_ANG_RD) divided by the number of spokes and trimmed for a spider spoke 402 parallel to frame aft horizontal line 457. A lower drive wheels horizontal position indication comprises a range of spider rotation angles with drive wheels at substantially the same level relative to a notional frame horizontal plane 457 or SD_ANG greater than 24° and less than 36° for a three spoke spider.

FIG. 7A is an exploded view of the spider drive system 500. The drive system 500 consists of a 90 DC volt direct type motor 501 and two planetary gear stages connected to a spider shaft 409. The shaft 409 rotates both the left- and right-hand spiders 403. A spider motor gear 503 is rigidly attached to the rotor of the spider motor 501 and is geared to the spider motor brake 502 with brake gear 504 and brake idler gear 505. The spider motor brake 502 is spring loaded brake and electrically released in a similar manner to the drive motor brake system 444 except without the manual release. See FIG. 7C and FIG. 7D. The first stage planetary carrier C 506 is attached to the rotor of the motor 501 and includes three gear sets. Note carrier C 506 is shown exploded in FIG. 7A. The gear sets include gear B 507 and gear D 508 rigidly mounted on a shaft. Gear B 507 runs inside fixed internal gear A 509. Gear D 508 runs inside first stage ring gear E 510. Ring gear E 510 rotates about shaft 409 and rigidly connects to sun gear H 511 of the stage 2 planetary and drives four planet gears G 512. The planet gears G 512 are rotably mounted to the second stage carrier I 513. The planet gears G 512 run inside second stage fixed internal gear F 514. The carrier I 513 is rigidly mounted on shaft 409. Spider shaft angle gear 442 is mounted to carrier I 513 and is geared to spider angle sensing gear 443.

FIG. 7B is an isometric view of the left-hand drive system 600. The drive system 600 consists of a 90-volt DC direct drive type drive motor 603 and gearing to drive three drive wheels 606 in the spider 403. The drive motor brake gear 445 is rigidly attached to the rotor of the drive motor 603 and is geared to the drive motor brake 607. See FIG. 7C and FIG. 7D. The drive motor 603 is indexed to central gear A 604 by a dog clutch 609. The dog clutch 609 splits the shaft to the central gear A 604 and enables the shaft to feed through a bearing in the gearbox 102 for assembly. Central gear A 604 mates with three larger gears B 610 in the spider spokes 402. Wheel torque is increased by two stages. A small diameter central gear A 604 rotationally linked to a larger diameter gears B 610 and a second stage of the small diameter gear C 611 rigidly connected to gears B 610 which is rotationally linked to a larger diameter gear D 612 which is rigidly connected the drive wheel axles 613. The drive wheels 606 are rigidly mounted to the axle 613.

FIG. 7C is a perspective view of the left-hand drive wheel brake system 444 in the operate position or not manually released. Drive motor brake gear 445 is rigidly attach to the left drive motor 603 rotor. Drive brake idler gear 446 transfers torque from the gear 445 to the brake gear 447. Gear 447 is on a shaft that transfers torque to the motor brake 607. The brake 607 is a spring loaded and electrically or mechanically released brake like those manufactured by KEB of Barntrup, Germany. Brake release arm 448 is attached the brake 607 by two brake release bolts 449 which released the brake 607 when pulled. The brake release rod 450 pulls on the arm 448 to rotate it and pull on the release bolts 449. The manual release handle 608 is rotary connected to the rod 450. Rotating the handle 90° cams the handle about brake release pivot 451 and cams against the brake attach cover 452 to pull the rod 450 and release the brake 607.

FIG. 7D is a perspective view of the components from FIG. 7C with the manual release handle 608 and drive brake system 444 in the released or freewheel position.

FIG. 8A is a perspective view of the legrest system 700 of the enhanced mobility wheelchair 100 from FIG. 1A. The legrest system 700 consists of a virtual hinge line 702 near the wheelchair occupant's knees, see FIG. 8B. The legrest system 700 consists of a pair of four-bar linkages 707 with common intermediate links. The first four-bar linkage consists of a torque tube link A 708, stabilizing links B 709, intermediate links C 710 and seat frame rotary attach points 711. The second four-bar linkage consists of a continuation of stabilizing link B 709, intermediate links C 710, legrest links D 712 and the legrest 701. A folding footrest 703 is rotary attached to the legrest 701. A legrest actuator 713 applies force to the torque tube link A 708 to operate the legrest system 700. The legrest position sensor 714 is shown in FIG. 1C.

FIG. 8B is a side view of the legrest system 700 from FIG. 8A with seat 705, seated occupant legs 704 and seat height adjustment system 800 in the low position (SH_DWN). The legrest 701 is raised to clear an FUS 706 step. The virtual legrest hinge line 702 is near the occupant's knee joint. Legrest system 700 is shown in the forward position for comfort and climbing an FUS 706 step or up-slope in mode MP3. Forward step sensor sensing path 208 indicates the presence of an FUS step 706. The skid wheel-to-step height path 209 indicates that the skid wheel 207 is engaged (KWT_ENGD).

FIG. 8C is a side view of the legrest system 700 with the seat 705 low (SH_DWN), legrest 701 partially aft and clearing skid crossbar 210 and showing the need for raising the legrest for forward climbing FUS 706 steps.

FIG. 8D is a side view of the legrest system 700 from FIG. 8A with the legrest 701 in the most aft position (LR_AFT) and the seat height adjustment system 800 in the high position (SH_UP). The legrest 701 can move to the most aft position since the legrest 701 are above the cross bar 210.

FIG. 9 is a rear isometric view of the seat height adjustment system 800 with the seat frame 801 in the highest position (SH_UP). The torque tube scissors link A 802 is attached to the gearbox 102 at rotary attach points 803. The torque tube scissors link A 802 is joined to scissors link B 804 at scissors link pivot 805. Rollers on the aft end of the torque tube scissors link A 802 join it to the seat frame 801 in seat frame guide slots 806. The scissors link B 804 attach to the seat frame 801 at rotary attach points 807. Rollers on the aft ends of scissors link B 804 join it to the gearbox 102 in gearbox guide slots 808. The seat height adjustment system 800 is actuated by scissors actuator 809 which is rotationally attached to torque tube scissors link A 802 and gearbox 102.

FIG. 10A is an operational flow chart. The cycle begins with the computer reading signals from the sensors which include numerous ToF distance sensors, rotary sensors, inclinometer, electric drive position counts and switches. See Table 1 for sensor reading variables. The sensor signal values are converted to degrees, inches, on/off (0/1) or other useful control variable values for program control. See Table 2 for evaluation values.

LEVEL, STAIR, or SLOPE mode are selected based on occupant requests and status of current obstacles criteria from Table 2 and coded logic. For each mode, various operation phases are invoked as the wheelchair updates the criteria during obstacle negotiation including current component positions, the engagement to obstacle, occupant inputs and so on per the evaluation criteria and values. See Table 3 and FIG. 10B for mode and phase selection.

Each axis is commanded to seek a position, wheelchair pitch, or device engagement target or speed. See Table 4 for targets.

In each phase, each axis including skid, spider, caster, left drive wheels, and right drive wheels is assigned a unique duty to engage, pitch control, control position, rotate or travel. Legrest and seat height adjustment are adjusted by the occupant as needed. Some axis may move in relation to another axis, such as spider angle rotating to a position as a function of a drive wheel travel variable. Some duties control pitch such as by raising or lowering the skid system or to control position to a predetermine target or to target a given engagement value. See Table 5 for axis duties for each phase.

Each axis is commanded to operate at a speed and direction based on the assigned duty and its target. Command equations compute values. The equations include control values, evaluation criteria, speed reduction criteria or other factors. For example, travel motion may be reduced or halted, if the pitch is too far from the pitch target. See Table 6 for axis direction and speed command values for each duty. Gain value constants are required but omitted in Table 6 for simplicity.

Control values, mode, phase, and control value data is saved to a file for later use for refining the code or understanding the wheelchair operations.

The command values are written to external electric motor drives as analog +/−10 voltage signal or PWM signals, to relays to operate brake releases, relays to operate the legrest or seat height adjustment or LEDs to indicate mode or other status. The cycle repeats until the system is shut down.

FIG. 10B is the Mode and Phase flow chart. At power up no mode is active. To start the occupant presses the LEVEL mode request switch 120 (QLL). After reading the sensor data, evaluating the data, and meeting the criteria, the LEVEL mode is invoked. The criteria for invoking the LEVEL mode (MLL) requires the LEVEL mode request switch to be depressed (QLL) and either the spider system 400 flat (SPDR_4WD) or SMALL ANGLE SLOPE mode MP1 active.

PHS_1, LEVEL TRAVEL, is invoked in the LEVEL mode (MLL) and both remain active until the STAIR mode (MSL) or SLOPE mode (MPL) are invoked. LEVEL mode (MLL) travel is slowed with the seat raised (not SH_DWN).

If MLL is active, the criteria for STAIR mode (MSL) is evaluated and switched to STAIR mode if the criteria meets the STAIR mode (MSL) criteria. The criteria for invoking the STAIR mode is LEVEL mode active and any of the following
1) spider engaged (SPDR_ENGD),
2) lower drive wheels at substantially different heights (not SPDR_4WD),
3) skid wheel approaching an up step (SKD_APR_FUS),
4) skid wheel approaching a down step (SKD_APR_FDS),
5) caster wheel backing to a forward facing up step (CST_APR_FUS) or
6) a caster runner backing against a step (CST_RN_ENGD).

The SLOPE mode (MPL) is requested by pushing the QPL request switch from the LEVEL mode (MLL). SMALL ANGLE SLOPE mode (MP1), is initially invoked in the MPL mode and remains active until the slope decreases and down-slope mode (MP2) is invoked from MP1 either by:
1) the spider advancing from an upper landing to a steep down slope with an abrupt down slope angle change as indicated by the spider system 400 engaged (SPDR_ENGD) and the caster wheel 303 not supporting (not CWT_SUPT) or
2) on a steep down-slope as indicated by a spider angle less than 26° (SD_ANG<26°) with caster wheel 303 not supporting (not CWT_SUPT).

MP2 ends when the skid system 200 is raised to an angle less than 27° (SKD_ANG<27°). See FIG. 13A, FIG. 13B, and FIG. 15A.

MP1 also ends when the slope increases and the UP-SLOPE mode (MP3) is invoked by:
1) the spider angle increasing to 39° (SD_ANG>39°) and pitch high (PTC_HI) or
2) the skid up (SKD_UP) and skid wheel 207 compressed (KWT_SUPT) and pitch high (PTC_HI).

MP3 switches back to MP1 when the caster wheel 303 is not compressed (not CWT_SUPT) or pitch is low (PTC_LO). See FIG. 13C, FIG. 13D, and FIG. 15B. MP1 also ends when QLL is pushed to request the LEVEL mode (MLL).

PHS_5, 4-WHEEL DRIVE, is the default phase in the STAIR mode (MSL) if no other phase is active and the front drive wheel 601 and rear drive wheels 602 are in a limited horizontal range (SPDR_4WD). PHS_5 ends when another phase is invoked, or lower drive wheels are at different levels as indicated by not SPDR_4WD.

PHS_9, SPIDER CLIMB, is invoked if no other phase is active and the spider angle criteria for selecting PHS_5 is not met, not SPDR_4WD. PHS_9 ends when PHS_5, PHS_7B, PHS_7D or PHS_9A are invoked.

PHS_2, FWD STEP APPROACH, is invoked with the legrest raised (LR_LFT) and forward up step indicated by a forward step sensed and advancing as indicated by (SKD_APR_FUS). PHS_2 ends when (SD_ANG>35°)

PHS_6, FDW & CSTR SUPT, is invoked from PHS_5 when backing (BCK) down an FUS 301 step as indicated by the rear drive wheels 602 not supporting (not RDW_SUPT) and the skid system 200 is not low (not SKD_LOW) and the spider cams 401 become engaged (SPDR_ENGD). Drive wheel travel (DR_TRVL) is reset when PHS_6 is invoked. PHS_6 ends when the wheelchair 100 has backed sufficient to disengage spider cams 401 as indicated by backing (BCK) 3 inches (DR_TRVL<−3), and then PHS_5 is re-invoked.

PHS_3, 4-WHEEL BACKING, is invoked from PHS_5 when backing (BCK) on a horizontal surface 101 against a FDS 428 step and the caster runners 319 are deflected (CST_RN_ENGD) and the rear step height ToF sensor 322 detects a rear low step 428 (RE_LO_STP). See FIG. 5F for the rear step height sensor path 323. PHS_3 ends when rear drive wheel 602 is on an FDS 428 step (SPDR_ON_FDS) or the spider cam 401 is engaged (SPDR_ENGD).

PHS_9A, SPIDER TIP ROTATION is invoked from PHS_5 if the ToF sensor 322 detects a high step (RE_HI_STP) 410, caster runners 319 are engaged (CST_RN_ENGD) and backing (BCK). PHS_9A ends when the spider system 400 reaches an upper angle limit (SD_ANG>SPD_HI_STP) and then PHS_9 is invoked.

PHS_7B, SPIDER ASCEND LANDING, is invoked from backing (BCK) in PHS_5 or PHS_9 when skid system 200 is supporting (SKD_SUPT), rear drive wheels 602 are on an FDS 410, 428 step and supporting (SPDR_ON_FDS) and caster runners 319 not engaged (not CST_RN_ENGD). PHS_7B ends when the front drive wheels 601 are on an FDS 410, 428 step, and engaged (FDW_ENGD) or caster runners 319 are engaged (CST_RN_ENGD). Then PHS_5 is invoked.

PHS_7D, SPIDER DESCEND LANDING, is invoked from PHS_5 when front drive wheel 601 departs an FDS step, spider near level (SPDR_ON_STP), and the caster runners 319 are not engaged (not CST_RN_ENGD). (FDS_ADV_P5=SPDR_ON_STP & ADV & (FDS_HT>4) & not CST_RN_ENGD). PHS_7D ends when spider 403 is rotated adequately for spider crowd engagement as indicated by spider angle less than 23° (SD_ANG<23°), and then PHS_9 is invoked.

PHS_8, SPIDER FUS ASCEND, is invoked from PHS_5 when advancing (ADV) up an FUS 301 step, the spider is engaged (SPDR_ENGD) and the front drive wheel 601 is rotated up onto a forward up step landing (SPDR_ON_FUS=(SD_ANG>33°) & FDW_SUPT). See FIG. 11. PHS_8 ends when the spider system 400 has rotated the rear drive wheel 602 to the FUS landing 454 (SPDR_ON_STP) and the rear drive wheels 602 are supporting (RDW_SUPT).

PHS_4, CASTER LIFT/ADV FOR FUS ASCEND, is invoked when PHS_8 ends. PHS_4 ends when the caster is lifted to the level equal to the step landing and the caster wheel is firmly on the FUS step landing 454 as indicated by the caster wheel 303 engaged and the caster system 300 at the level position (CWT_ENGD and CST_HORZ). PHS_5 is re-invoked when PHS_4 ends.

FIG. 11 is a side view of the wheelchair in PHS_8 phase. The seat height adjustment system 800, and leg rest system 700 are removed for clarity. The skid wheels 207 are on the FUS 301 step and engaged (SKD_ENGD). The front drive wheels 601 (FDW) are also on the FUS 301 step and are supporting and the rear drive wheels 602 (RWD) are on the lower landing 314 and supporting. The spider cam 401 and caster wheel 303 are engaged (SPDR_ENGD and CST_ENGD).

FIG. 12A is a wheelchair schematic illustrating criteria for the stair angle OK for backing to ascend from a lower landing (STR_BCK_OK). The criteria is not met in this figure since the pitch is low and the skid system 200 is unable to raise the pitch. See CONTROL SYSTEM AND OPERATIONS for discussion of the STR_BCK_OK criteria. The wheelchair is starting from a lower landing as indicated by a raised caster 904 (CST_RSD=CST_ANG>13). The skid system is full down 905 (SKD_DWN: SKD_ANG=96°) and supporting (SKD_SUPT) 903 with the skid runners supporting (SKD_RN_SUPT) or the skid wheel supporting (KWT_SUPT). FIG. 12A shows the pitch low (PTC_LO=CHR_ATT<PTC_TG−3) with the notional frame horizontal 901 3° below the pitch target 902 of 6° (PTC_TG=6°). Since the skid system 200 is fully extended (SKD_DWN), and skid system 200 is supporting (SKD_SUPT) and the pitch is low (PTC_LO), the criteria for skid system 200 can raise pitch is not met (SKD_CN_R_PTC=not SKD_DWN & not SKD_SUPT & not PTC_LO) to raise the wheelchair 100 to the pitch target 902 (PTC_TG=6°).

Note: for PHS_9 with the skid system 200 supporting, SKD_RN_EMT=25, the caster runner not supporting (not CST_RN_SUPT=1), skid runner supporting (not SKD_RN_SUPT=0) the pitch target is 6°)

PTC_TG=PHS_9*0.24*SKD_RN_EMT*not
CST_RN_SUPT−
PHS_9*0.24*CST_RN_EMT*not
SKD_RN_SUPT=1*0.24*25*1−
1*0.24*12*0=6).

FIG. 12B is a wheelchair schematic illustrating the stair angle OK criteria for advancing to descend a stairs (STR_ADV_OK). The criteria is not met in this figure since the pitch is low and the skid system 200 is unable to raise the pitch. The wheelchair is advancing (ADV) from an upper landing as indicated by a not raised caster 908 (not CST_RSD=CST_ANG<13°) 907. With the same skid and frame geometry as in FIG. 12A, the criteria for skid system 200 can raise pitch is not met (SKD_CN_R_PTC). See CONTROL SYSTEM AND OPERATIONS for discussion of the STR_ADV_OK criteria.

FIG. 12C is a wheelchair 100 schematic illustrating the step height OK for backing to ascend a forward facing down step FDS 410 criteria (FDS_BCK_OK). FDS_HI 911 is defined with the frame level 912, the spider system 400 rotated to a position as shown with the spider cam 401 contacting the step riser 906, a lower drive wheel resting on a lower level 909, and an upper drive wheel resting a higher step with the wheel axis directly above step riser 913. The forward down step height limit (FDS_HI) 911 applies both to ascending and descending an FDS 410 step. See FIG. 12D for the forward down step height (FDS_HT) 918 calculation. The wheelchair 100 is backing (BCK) up a step landing as indicated by the caster system 300 at a caster system angle (CST_ANG) for caster raised 914 (CST_RSD= (CST_ANG>13°)) 915. The forward down step height (FD-W_HT) 918 is OK (DN_STP_OK) if FDS_HT height is less than the forward down step height limit (FDS_HI). (DN_STP_OK=(FDS_HT<FDS_HI)). See CONTROL SYSTEM AND OPERATIONS for discussion of the FDS_BCK_OK criteria.

FIG. 12D is a wheelchair 100 schematic illustrating step height OK for advancing to descend a forward facing down step criteria (FDS_ADV_OK). The wheelchair is advancing (ADV) down a step landing as indicated by the caster system 300 at a caster system angle (CST_ANG) for caster not raised 908 (not CST_RSD=(CST_ANG<13°)) 907. The FDS height (FDS_HT) 918 is equal to the front sensor 411 to step height reading 916 (FDW_RD) minus the rear drive wheel sensor 412 to step height reading 917 (RDW_RD) and minus pitch height effect 941 from the fore and aft distance between the sensors 939, 13 inches, times the sine of the wheelchair pitch (CHR_ATT) 940. The FDS is OK if FDS_HT height 918 is less than forward down step height limit (FDS_HI) 911 (DN_STP_OK=(FDS_HT<FDS_HI)). See CONTROL SYSTEM AND OPERATIONS for discussion of the FDS_ADV_OK criteria.

FIG. 12E is a schematic illustrating the step height OK for advancing (ADV) to ascend a FUS criteria (FUS_AD-V_OK). The figure shows the spider rotation angle (SD_ANG) for skid lifting for FUS 201 spider angle (SD_ANG) ascending limit 919. The spider system 400 has rotated the wheelchair pitch to engage the skid system 200 on a step at the FUS step limit height 920 with the spider at spider angle limit for FUS 919. The FUS step limit height 920 is a predetermined operational limit at or below the drive wheel 601 radius. (SPD_FUS_OK=SD_ANG<25°). The skid system 200 is full up 921. See CONTROL SYSTEM AND OPERATIONS for discussion of the FUS_AD-V_OK criteria.

FIG. 12F is a schematic illustrating the step height OK criteria for backing to descend an FUS 201 step (FUS_B-CK_OK). The wheelchair 100 is shown backing (BCK), the wheelchair not pitch high (not PTC_HI) and the caster engaged (CST_ENGD), although not supporting (not CST_SUPT). See CONTROL SYSTEM AND OPERATIONS for discussion of the FUS_BCK_OK criteria.

FIG. 13A is a wheelchair 100 schematic illustrating the down-slope angle OK for backing to ascend from lower landing criteria (DSLP_BCK_OK). The skid system 200 is above a limiting down-slope angle 923, starting from a lower landing, and backing (BCK) in the down-slope mode (MP2). The wheelchair 100 is indicated to be starting from a lower landing by the caster raised for down-slope 929 with caster angle for caster raised for down slope (CST_RSD=CST_ANG>13°) 926. The skid system 200 is above a lower limit for down-slope 927 (SKD_DN_SL_OK) as indicated by the skid system 200 on a limiting down-slope angle 923 as indicated by a skid angle less than a down-slope skid angle limit 924 of 57° (SKD_ANG<57°) and the rear drive wheel positioned for supporting on a level surface 928 (SPDR_LV_SPT=SD_ANG=32°) 925. See CONTROL SYSTEM AND OPERATIONS for discussion of the DSLP_BCK_OK criteria.

FIG. 13B is a wheelchair 100 schematic illustrating the criteria for down-slope advancing to descend from an upper landing (DSLP_ADV_OK). The criteria includes the skid above a limiting down-slope angle 923, starting from an upper landing, and the wheelchair 100, advancing (ADV) in the DOWN-SLOPE mode (MP2). The skid is above a lower limit for a down-slope angle 927 (SKD_DN_SL_OK) with identical skid, spider, and slope geometry as in FIG. 13A. The wheelchair 100 is indicated to be starting from an upper landing by the caster not raised 908 for down-slope with caster at caster angle for caster not raised 908 (not CST_RSD=(CST_ANG<13°)) 907. See CONTROL SYSTEM AND OPERATIONS for discussion of the DSLP_AD-V_OK criteria.

FIG. 13C is a wheelchair schematic illustrating the up-slope angle OK for advancing to ascend from a lower landing criteria (USLP_ADV_OK). Starting from a lower landing to an up-slope is indicated by the skid raised (SKD_RSD=SKD_ANG<9.5°) 931. The wheelchair 100 is shown on the limiting up-slope angle 933 as indicated by the wheelchair frame at the pitch target (PTC_TG=3°), the skid full up 932, the caster full down 935 and the skid wheels 207 and caster wheel 303 contacting the limiting up-slope. The spider is at the 15° up-slope spider limit angle (M3_SPD_LM_OK=SD_ANG<41°) 930 with the front drive wheels 601 contacting the limiting up-slope. See CONTROL SYSTEM AND OPERATIONS for discussion of the USLP_ADV_OK criteria.

FIG. 13D is a wheelchair 100 schematic illustrating the up-slope angle OK for backing from an upper landing criteria (USLP_BCK_OK). Starting from an upper landing to an up-slope is indicated by the skid not raised (not SKD_RSD=SKD_ANG>9.5°) 936. The wheelchair is shown on the limiting up-slope angle 933, with wheelchair pitch (CHR_ATT) and spider position 934 for front drive wheel contacting limiting up-slope as shown in FIG. 13C. See CONTROL SYSTEM AND OPERATIONS for discussion of the USLP_BCK_OK criteria.

FIG. 14A is a side view showing a wheelchair 100 schematic on stairs in PHS_9 and a notional coefficient of friction required for a stability margin criteria of a 7° forward center of gravity shift 960 and skid system 200 balance support. The 7° margin is based on criteria in ISO 7176 Part 28 "Requirements and test methods for stair-climbing devices". The calculation is based on a wheelchair occupant weight and center of gravity with the 7° forward margin, vertical and horizontal support at the rear drive wheels 602 and balancing support force normal to the skid runner 204. The horizontal component of the balancing force F2X is reacted by the friction component F1X of the rear drive wheel 602 supporting force F1. The required coefficient of friction is the ratio of F1X over F1Z or 0.27. A coefficient of friction of 0.27 is low enough for stability on wood or concrete steps but not for carpeted stairs based on an estimated rubber on carpet COF=0.12, wood COF=0.60, concrete dry COF=0.60, concrete wet COF=0.45.

For forward center of gravity, CG balanced by skid runner
CHR_ATT=0.0°
W=550
R1=4.2
R2=15.4
A=32.6°
F2=550×R1/R2=150.0
F2X=F2×COS(A)=126.4
F2Z=F2×SIN(A)=80.8
F1X=F2X=126.4
F1Z=550−F2Z=469.2
Required coefficient of friction
COF=F1X/F1Z=0.27

FIG. 14B is a side view showing the wheelchair schematic from FIG. 14A and the center of gravity (CG) shift improvement provided by a 6° pitch target (PTC_TG) increase. See Table 4 for a balancing pitch target for PHS_9

(PTC_TG=+PHS_9*0.24*SKD_RN_EMT*not CST_RN_SUPT−
PHS_9*0.24*CST_RN_EMT*not SKD_RN_SUPT).

The 6° pitch increase is provided by the target coded in PHS_9 when the skid runners 204 are supporting. The 6° pitch increase requires a 0.11 COF which is adequate for safe climbing of carpeted stairs with the 7° forward margin.

For 6 degree pitch target increase: for forward center of gravity, CG balanced by skid runner
CHR_ATT=6°
W=550
R1=2.4
R2=17.0
A=42.4°
F2=550×R1/R2=77.6
F2X=F2×COS(A)=57.3
F2Z=F2×SIN(A)=52.4
F1X=F2X=57.3
F1Z=550−F2Z=497.9
Required coefficient of friction
COF=F1X/F1Z=0.11

FIG. 14C is a side view showing a wheelchair schematic on stairs in PHS_9 and a notional calculation of surface friction required for stability with a 3.5° aft center of gravity shift criteria and caster system 300 balance support. The 3.5° margin is one half of the criteria for forward CG shift. CG shift is less critical for aft shift than forward since aft torso movement is limited by the seat back. The calculation is based on a wheelchair occupant weight and center of gravity with the 3.5° aft margin, vertical and horizontal support at the lower drive wheels 606 and balancing support force normal to the caster runner 319. The horizontal component of the balancing force F2X is reacted by the friction component F1X of the lower drive wheel 606 supporting force F1. The required coefficient of friction is the ratio of F1X over F1Z or 0.23. A coefficient of friction of 0.23 is low enough for stability on wood or concrete steps but not for carpeted stairs.

For aft center of gravity, CG balanced by caster runner
CHR_ATT=0.0°
W=550
R1=6.1
R2=21.9
A=48.9°
F2=550×R1/R2=152.8
F2X=F2×COS(A)=100.4
F2Z=F2×SIN(A)=115.1
F1X=F2X=100.4
F1Z=550−F2Z=434.9
Required coefficient of friction
COF=F1X/F1Z=0.23

FIG. 14D is a side view showing the wheelchair schematic from FIG. 14C and the improvement provided by a 6° pitch decrease. The 6° pitch decrease is provided by the pitch target in PHS_9 when the caster runners 319 are supporting. See Table 4 for balancing pitch target for PHS_9 (PTC_TG−0.24*25=−6). In this case the caster wheel 303 provides balance support rather than the caster runner 319. There is zero horizontal force F2X and no surface friction is needed to react. The 6° pitch decrease is adequate for safe climbing of carpeted stairs with the 3.5° aft margin.

For 6 degree pitch target decrease: for aft center of gravity, CG balanced by caster runner
CHR_ATT=−6°
W=550
R1=6.2
R2=10.1
A=90°
F2=550×R1/R2=337.60
F2X=F2×COS(A)=0.0
F2Z=F2×SIN(A)=337.6
F1X=F2X=0.0
F1Z=550−F2Z=212.4
Required coefficient of friction
COF=F1X/F1Z=0.0

FIG. 15A is a side view showing the wheelchair 100 in the DOWN-SLOPE mode (MP2). The wheelchair is shown on a 20° down-slope 455, with the skid wheels 207 and rear drive wheels 602 supporting. The caster system 300 is engaging (CST_ENG). The spider system 400 is positioned for level surface support SPDR_LV_SPT) to a spider angle (SD_ANG=32°) which will allow the front drive wheels 601 to ascend to a horizontal surface 456 at the top of the slope without engaging the spider cam (not SPDR_ENGD).

FIG. 15B is a side view showing the wheelchair 100 in the UP-SLOPE (MP3) mode. The wheelchair is shown on a 15° up-slope 324, with the front drive wheels 601 supporting and spider controlling skid engagement (SPD_EN_SKD). The skid system 200 is position controlled (SKD_PN) to the up position (SKD_PN_TG=0). Skid position is monitored by the skid position rotary sensor 224. The caster wheel 303 is supporting and controlling pitch (CST_PC).

Operation

Skid Step Engagement

One improvement of this invention is means to sense forward facing up step, FUS 201 as well as forward facing down steps, FDS 203 in front of the wheelchair. The skid system 200 shown in FIG. 3A through FIG. 3F is used to sense the presence of FUS 201 steps, FDS 203 steps, and horizontal surfaces 101 and to provide support as required for balance.

In the LEVEL mode (MLL and PHS_1) the skid system 200 position controls (SKD_PN) to the full up position (SKD_PN_TG=0°). Referring to FIG. 3E, the forward step height ToF sensors 202 monitor the engagement to a front step surface 226 in front of and relative to the skid wheels 207. Advancing (ADV) with the skid system 200 in the up position (SKD_UP) and a forward step height greater than 1 inch (WF_HT>1) and advancing (ADV) indicates the skid system 200 is approaching an FUS step 201

(SKD_APR_FUS=(WF_HT>1) & ADV).

A forward step height less than 1 inch (WF_HT<−1) and advancing (ADV) indicates the skid system 200 is approaching an FDS step 203

(SKD_APR_FUS=(WF_HT<−1) & ADV).

When the skid system 200 is approaching an FUS 201 step (SKD_APR_FUS) or FDS 203 (SKD_APR_FDS) a step is indicated and the LEVEL mode (MLL) ends. The STAIR mode (MSL) begins with skid system 200 in engage duty (SKD_ENG) or pitch control duty (SKD_PC). Skid system 200 engage controls targeting the most critical value (SKD_EMT) from either the forward step engagement (KFT_EMT), skid wheel 207 engagement (KWT_EMT) or skid runner engagement (SKD_RN_EMT). If the skid system 200 is in the full up position with the pitch high (SKD_UP & PTC_HI) and reduced engagement is targeted, the spider system 400 is commanded to rotate the spider system 400 and the wheelchair 100 for spider controlling skid engagement (SPD_EN_SKD) to meet the engagement target (SKD_EN_TG). The ToF forward step sensor 202 enables the wheelchair 100 to monitor upcoming surfaces in the LEVEL mode (MLL) or lift the skid wheel 207 in the STAIR mode (MSL) to the level of an FUS step 201 without the need for physical surface contact.

Referring to FIG. 3F, when contact with an FDS 203 step edge applies a force 223 to the skid runner 204, the resulting moment to the runner deflection sensing device 206 rotates the rotary position sensor 216 against a resisting extension spring 222. The sensor 216 rotation is an indication of engagement of the runner deflection sensing device 206 including the skid runner 204. The skid wheel-to-step height sensor 205 monitors the distance to a horizontal surface 101 or tread to determine skid wheel 207 engagement (KWT_EMT).

If the skid system 200 is not needed for balance, the indication of an FUS 201 step, FDS 203 step or horizontal surface 101 may be used to control engagement to surfaces comprising skid engagement control (SKD_ENG) or spider control skid engagement (SPD_EN_SKD), drive steering to align with step (DR_SKD_EN), or initiate other actions such as raising the skid wheel 207 above the FUS 201 step (SKD_ENG with KFT_EMT critical). Maintaining the skid system 200 engaged with the surfaces ensures that the skid system 200 is quickly available for balancing.

Caster Step Engagement

The caster system 300 shown in FIG. 5A through FIG. 5F is used to sense the presence of FUS 301 steps, FDS 302, 410, 428 steps, and horizontal surfaces 314 and to provide balance support as required. One improvement of this invention is a means to sense FUS 301 steps when backing (BCK) in the LEVEL mode (MLL) as indicated by the rear step sensor 322 (CST_APR_FUS). See FIG. 5F. When CST_APR_FUS is indicated or the caster runners 319 become engaged (CST_RN_ENGD) in the LEVEL mode (MLL), the mode switches to STAIR mode (MSL).

The caster system 300 with caster wheel 303 provides support for lifting the rear drive wheels 602 for advancing up an FUS 301 step (ADV and PHS_8). Once the rear drive wheels 602 are raised and are securely over the FUS 301 step the caster system 300 is positioned controlled (CST_PN to CST_PN_TG) to lift the caster wheel 303 to the FUS 301 step level (CST_HORZ), the wheelchair 100 advances (ADV, PHS_4) until the caster wheel 303 is over the FUS 301 step.

The caster wheel 303 is used as needed for balance support. When not needed for balance, caster wheel 303 engagement is controlled by distance sensor 304 to be quickly available for support.

Referring to FIG. 5E, FDS 302 step force 321 applied to caster runner 319 on the caster runner bogie D 320 against a resisting extension spring 317 moves the caster runner bogie D 320 up and forward and rotates the runner bellcrank E 318 and runner position sensor 312. A caster runner deflection sensing device 305 is located on both the left and right side of the caster system 300.

The runner deflection sensing devices 305 are used as needed for balance, caster steering, and controlling the engagement to an FDS 302 step as the wheelchair 100 ascends or descends steps or stairs.

Spider Step Engagement

Spider crowd engagement angles (CWD_LFT and CWD_RHT) to an FDS step 302 edge are computed by subtracting the left spider angle (SL_ANG) from the spider rotation angle (SD_ANG) or by subtracting the right spider angle (SR_ANG) from the spider rotation angle (SD_ANG). Since SD_ANG, SL_ANG and SR_ANG are reset at 120°, it is necessary to add 120° for spider crowd engagement cases that would be negative for valid spider engagement values.

(CWD_LFT=SD_ANG−SL_ANG+120*
(SL_ANG>SD_ANG)

(CWD_RHT=SD_ANG−SR_ANG+120*
(SR_ANG>SD_ANG)

The minimum spider crowd angle (CWD_MIN) is the least of CWD_LFT and CWD_RHT. (CWD_MIN=the least of CWD_LFT and CWD_RHT).

Referring to FIG. 6C through FIG. 6I, one improvement of this invention is a means to indicate spider system 400 engagement to FDS 410 step risers for climbing steps without requiring adjustment. The rotation of the spider cam 401 relative to the spider 403 is shown in FIG. 6C and FIG. 6D. Spider cam posts 404 limit the rotation of the spider cam 401 to rotate in unison with the spider 403 or to limit spider cam 401 to deflect no more than a fixed limited angle from the unison position for example 5°.

The shape of the spider internal cam 405 cut-out is defined by rotating the spider 403 with its three spider cam posts 404 about spider system 400 axis 461 and rotating the spider cam 401 about large diameter hub 437 axis 461 at the same rate. The shape of the internal cam 405 is expanded by deflecting the spider cam 401 by rotating the step engaging surface 459 a set limited angle toward drive wheel 606 and again rotating the spider cam 401 and spider 403 in unison.

The spider cam 401 is spring biased to the undeflected unison position by the spider cam preloading system 416. Referring to FIG. 6C and FIG. 6D, one or more cam-engaging arms 406 are pushed against the back side of a spoke on the spider cam 401 to spring load spider cam 401. The cam-engaging arm 406 is spring loaded by cam loading spring 417 with the force transmitted by spring loading arm 438 and spring loading link 441. See FIG. 6G and FIG. 6H. The rotation of the cam-engaging arm 406 may be limited by arm stop 439, see FIG. 6H, to ensure a shallow angle between the back side of the spider cam 401 and the cam-engaging arm 406 for allowing back driving the arm 406 without jamming.

The spider cam gear 413 is rotationally linked to the cam angle sensing gear 414 with one full gear 414 rotation per spider spoke 402 to avoid adjustment and the possibility of mis-adjustment due to slipping.

As shown in FIG. 6C, the spider cam post 404 and spider internal cam 405 hold the spider cam 401 above the lower horizontal surface 453 for level operation and for approaching an FDS 410 step. For ascending an FDS 410 step or stairs, with the spider system 400 in the position shown in FIG. 6C, the spider cam 401 has limited deflection margin for sensing step engagement before the rear drive wheel 602 contacts FDS 410 step. To provide the needed spider cam 401 deflection margin for steering, the spider 403 is rotated in PHS_9A to the FIG. 6D position while the caster system 300 is maintained engaging the lower surface 453. When the spider 403 reaches a required angle as shown in FIG. 6D, the caster system 300 is raised to clear the FDS 410 step and the spider cam 401 engages the FDS 410 step. The spider cams 401 then provide signals (CWD_LFT and CWD_RHT) for engagement and spider cam steering (DR_CAM_STR_LH and DR_CAM_STR_RH).

For ascending to a landing with the spider system 400 from the position shown in FIG. 6D, the spider system 400 position controls in PHS_7B to target spider angles (SPD_PN to SPD_PN_TG) as a function of drive wheel travel (DR_TRVL) to provide clearance for the front drive wheel 601 as it raises to the level of the FDS 410 step landing. The enhanced mobility wheelchair 100 is then backed (BCK) until the front drive wheels FDW 601 are fully on the landing (FDW_ENGD) or the caster runners 319 are engaged (CST_RN_ENGD).

For descending from an FDS 302 step landing, the wheelchair 100 advances (ADV) with the spider front drive wheels 601 and rear drive wheels 602 controlling pitch. When the front drive wheels 601 begin to leave the landing (FDS_ADV_P5), the software code invokes PHS_7D. PHS_7D phase ensures continued spider 403 rotation as the wheelchair advances (ADV). The spider 403 rotates as a function of drive wheel travel in PHS_7D until the spider 403 reaches an angle (SD_ANG<23°) to ensure positive spider cam 401 engagement sensing (SPD_EN_CAM). The wheelchair 100 is supported by the rear drive wheel 602 and the skid system 200 as the wheelchair descends the FDA 410 step landing. The spider system 400 continues to descend while providing signals for engagement and steering until the position shown in FIG. 6C is approached and the cycle repeats.

Wheel and Spider Motor Braking

One improvement in this invention is a manual means to release drive wheel brake system 444 to freewheel the wheelchair 100. Drive wheel 606 rotation is secured for the safety of the occupant and wheelchair when drive wheels 606 are not operating. The drive motor brake system 444, shown in FIG. 7C and FIG. 7D, are spring applied and rotationally linked to the drive motor 603 rotors. They are released by DC voltage to solenoids when the drive motors 603 are powered to operate. They may be manually released for freewheeling by 90° rotation of a release handle 608. The handle 608 has a cam surface which pulls a rod 450 to the arm 448 which pulls bolts 449 in the brake 607 to release it. The manual release handles 608 are held in the operate or freewheel positions by the linkage and springs in the brake.

Drive wheel brake system 444 with manual release handles 608 are included for both the left and right drive wheels 606. The release handles 608 are located under the seat and are accessible to the occupant. The wheelchair 100 can be propelled by hand rotating the upper drive wheels 606. A similar brake 502 is provided for the spider system 400 except without the manual release components.

Legrest Operation

Referring to FIG. 8A through FIG. 8D, a further improvement of this invention is power legrest operation with the ability to raise the legs for forward step climbing or to shorten the wheelchair for reduced turn diameter. The legrest system 700 pivots with a virtual legrest hinge line 702 near the occupant's knee joints. See FIG. 8B through FIG. 8D. This keeps the occupant's feet contacting the footrest for comfort during operation without requiring a second actuation and control system. The virtual hinge components 700 are all below the seat 705 level to not impede occupant lateral seat transfers. Legrest position is controlled by the occupant for comfort, clearance for forward step climbing, negotiating tight spacing and storage. The legrest 700 are operated by the LR_OP command as controlled by the extend legrest momentary switch 116 (EX_LR) to extend and by the retract legrest momentary switch 117 (RT_LR) to retract on the control device 106.

Seat Height Adjustment Operation

Referring to FIG. 9, seat height adjustment is a further improvement in this invention and is made possible with space provided by gearbox 102 height reduction relative to the previous invention. Improvement increases occupant access to high cabinets and high spaces in the home. Improvement assist occupant lateral transfers by raising the seat 705 to provide transfer to a same or lower level surface. The scissors actuator 809 operates the well-known scissors type lift system as required for access or transfers. The seat 705 is raised or lowered by the seat command value (ST_OP) with raising controlled by the raise seat momentary switch 118 (RS_ST) and lowering by the lower seat momentary switch 119 (LW_ST). The seat 705 must be in the lowest position (SH_DWN) for travel in the STAIR and SLOPE modes (TRVL_OK) for travel. Travel speed is reduced for level travel (PHS_1) with the seat raised (not SH_DWN).

The lowest seat position lowers the wheelchair and occupant center of gravity to reduce the chance of tip over, particularly in the lateral direction. The seat position is monitored by the angle of the torque tube scissors link A 802 to the seat frame 801, as measured by the scissors position sensor 810. See FIG. 1C.

Travel Operation

For LEVEL mode (MLL), the caster wheel 303 and front drive wheels 601 support the wheelchair 100 with the spider system 400 rotated to lift the rear drive wheels 602 off the horizontal surface 101 (SPD_PN_TG=28°). See FIG. 1C. This enables tight turns without tire scrubbing.

For SLOPE mode (MPL), SMALL ANGLE SLOPE travel operation (MP1), the spider system 400 controls pitch, and the skid system 200 and caster system 300 engage, except when needed for out-of-range pitch adjustment. For DOWN-SLOPE mode travel (MP2), the skid system 200 and rear drive wheels 602 support. See FIG. 15A. For UP-SLOPE mode travel (MP3), the caster system 300 and front drive wheels 601 support. See FIG. 15B.

For STAIR mode (MSL) operations, PHS_5 is the default phase for horizontal travel. PHS_5, 4-WHEEL DRIVE, is a 4-wheel travel phase primarily with spider system 400 pitch control (SPD_PC), skid engage (SKD_ENG), caster engage (CST_ENG) and drive wheel 606 drive per joystick deflection and direction (DR_JS_ST). However, pitch control varies for different pitch ranges. The spider system 400 controls pitch (SPD_PC) in the pitch range for spider pitch control (PTC_S_RG) from 5° below the target (PTC_TG) to 5° above the target. The caster system 300 controls pitch (CST_PC) from 3° above the target (PTC_HI) and higher with the caster and spider sharing pitch control from 3° to 5° above the target. The skid system 200 controls pitch (SKD_PC) from 3° below the target (PTC_LO) and lower with the skid and spider sharing pitch control from below the target, −3° to −5° (PTC_TG). Sharing pitch control avoids rapid duty swapping. Travel is controlled by the joystick (DR_JS_ST) but at a reduced speed or halted for better control on obstacles (TRVL_OK) and fore and aft pitch (CHR_ATT) or lateral pitch (ROLL_ATT) which vary from the targets with speed reduction factors PTC_FTR and ROLL_FTR. See FIG. 4A and FIG. 4B.

PHS_9, SPIDER CLIMB, is the other STAIR mode (MSL) default phase for step and stair climbing with the spider system 400 rotating (SPD_RO) for climbing, with either the skid system 200 supporting for pitch control (SKD_PC) and the caster system 300 engaging (CST_ENG) or with the caster system 300 supporting for pitch control (CST_PC) and the skid system 200 engaging (SKD_ENG) and the drive wheels 606 driving (DR_CAM_STR) to maintain the engagement of spider cams 401 driving to maintain caster runner engagement (DR_CST_STR).

In PHS_9 with the supporting drive wheels 602 in a low central position, balancing support can be provided by either the skid system 200 or caster system 300 depending upon the location of the center of gravity relative to the fore and aft position of the supporting drive wheels 602. The center of gravity location is controlled in PHS_9 to limit traction surface friction required to balance skid runner 204 and caster runner 319 fore and aft force components. See FIG. 14A through FIG. 14D discussion in DETAIL DESCRIPTION for means to address pitch adjustment to reduce friction required to balance runner fore and aft components.

Special FDS phases are provided for ascending a landing or descending a landing. These include:
1) PHS_9A for adjusting the spider system 400 for possible ascending an initial low FDS 428 step,
2) PHS_7B for spider ascending to an FDS 410, 428 step landing and
3) PHS_7D for spider system 400 descending from an FDS 410 step landing.

Special phases are also provided for ascending and descending an FUS 301 step landing:
1) PHS_8 to lift the rear drive wheels 602 by rotating the spider 401 for ascending an FUS 301 step landing,
2) PHS_4 to lift the caster wheel 303 to the FUS 301 step landing and advance the caster wheel 303 to rest on the FUS 301 step landing, and
3) PHS_6 for backward descending an FUS 301 step landing to provide caster system 300 support and pitch control (CST_PC) to prevent tip back.

Level Travel

The LEVEL mode (MLL) is invoked when requested (QLL) and the criteria (MLL) is met. PHS_1 is invoked from the LEVEL mode (MLL). In PHS_1, LEVEL TRAVEL, the wheelchair travels with the two front drive wheels 601 and the caster wheel 303 supporting. The skid system 200 position controls (SKD_PN) to a full up target (SKD_PN_TG=0). The spiders 403 are position controlled (SPD_PN) to the position for LEVEL TRAVEL, PHS_1 (SPD_PN_TG=28°). The caster controls pitch (CST_PC) to PTC_TG=0°. The drive wheels 606 joystick steer (DR_JS_ST) in the direction of joystick deflection for advancing (ADV) or backing (BCK). Joystick steering for pivoting control (PVT) is the same as advancing (ADV). See further discussion of joystick steering ((DR_JS_ST_LH) in DRIVE SYSTEM 600.

The forward step sensors 202 and skid wheel step sensor 205 are monitored to sense an FUS 201 up step approach (SKD_APR_FUS) or an FDS 203 down step approach (SKD_APR_FDS). The caster runner deflection sensing devices 305 are monitored to sense a rear FDS 410 step engagement (CST_RN_ENGD) or rear step height sensor 322 is monitored to sense an FUS 301 step (CST_APR_FUS) approach. The spider system 400 is monitored for spider cams 401 engaged (SPDR_ENGD) or rotated (not SPDR_4WD). If any these indications are positive the STAIR mode (MSL) is invoked, and the LEVEL mode (MLL) is ended. See DETAIL DESCRIPTION, FIG. 10B for further discussion of invoking MSL, STAIR MODE.

Advancing Up an FUS Step.

When the occupant anticipates ascending an FUS 201 step, the occupant raises (LR_OP with EX_LR) the legrest 700. The occupant advances (ADV) to an FUS 201 step in the LEVEL (MLL) or STAIR (MSL) mode. When advancing to a forward up step is sensed (SKD_APR_FUS= (WF_HT>1) & ADV)) the mode switches to STAIR mode (MSL) if not already in STAIR mode. PHS_2 is invoked with the legrest raised (LR_LFT) and forward up step indicated (SKD_APR_FUS).

As the skid system 200 advances up the FUS 201 step in PHS_2, FWD STEP APPROACH, the skid system 200 skid engages (SKD_ENG) targeting the most critical engagement forward step engagement (KFT_EMT) from the forward step ToF sensors 202. This holds the skid wheels 207 high to permit them to reach the FUS 201 step landing. If the skid is not full up (SKD_UP) the spider controls pitch (SPD_PC) to pitch target (PTC_TG=3°). If the skid system 200 is forced to the full up position with the pitch high (PTC_HI), the skid system 200 position controls (SKD_PN) to the full up position (SKD_PN to SKD_PN_TG=0) and the spider system 400 controls skid system engagement (SPD_EN_SKD) to skid engagement target (SKD_EN_TG=12).

The wheelchair 100 then 4-wheel advances (DR_JS_ST) up the FUS 201 step with the rear drive wheel 602 forcing the front drive wheels 601 against the forward up step 201 edge, the front drive wheels 601 rotating to ascend and the spider controlling pitch (SPD_PC) and the caster engaging (CST_ENG). As the front drive wheels 601 begin to ascend the step, the wheelchair pitch (CHR_ATT) rises, and the spider angle (SD_ANG) increases to maintain skid system engagement (SKD_EMT). When the spider angle (SD_ANG) reaches greater than 35° PHS_2 ends and PHS_5 begins with spider pitch control, skid system 200 controlling skid system engagement (SKD_EMT) and caster system 300 controlling caster engagement (CST_EMT). PHS_8 begins when advancing (ADV), the front drive wheels 601 are fully on the FUS 201 step landing (SPDR_ON_FUS=(SD_ANG>33°) & FDW_SUPT) and the spiders are supporting (SPDR_SUPT). See FIG.

In PHS_8, SPIDER FUS ASCEND, the drive wheels 606 advance (ADV) with joystick steering (DR_JS_ST). The spider system 400 engages the spider cams 401 (SPD_EN_CAM) to the spider engage target (SPD_EN_TG) if they are engaged (SPDR_ENGD) or if not engaged they position control (SPD_PN), to the spider position target (SPD_PN_TG) for PHS_8 as a function of drive wheel travel (DR_TRVL) to raise the rear drive wheels 602 with the FDW 601 supporting to level the four lower drive wheels 601/602. The SPD_PN_TG target places the rear drive wheels (RDW) 602 above the FUS 201 step landing. The skid system 200 engage (SKD_ENG). The caster system 300 controls pitch (CST_PC) while the caster wheel 303 supports while on the lower level 314. In PHS_8, when the four lower drive wheels 601/602 reach the FUS 201 step landing as indicated by rear drive wheel 602 supporting (RDW_SUPT) and lower spider wheels level (SPDR_ON_STP), PHS_4 is invoked and PHS_8 ends.

In PHS_4, CASTER LIFT/ADV FOR FUS ASCEND, the skid system 200 engage (SKD_ENG), and the caster system 300 position controls (CST_PN) to lift the caster wheel 303 to the height of the step level landing 201 (CST_PN_TG=CST_HORZ=2). The spider pitch controls (SPD_PC). The drive wheels 606 hold their position until the caster system 300 is lifted (CST_ANG=CST_PN_TG) and then the drive wheels 606 advance the wheelchair (DR_JS_ST) until the caster wheel 303 is fully on the landing of the FUS 201 step as indicated by caster system 300 being engaged (CST_ENGD). Then PHS_5, 4-WHEEL DRIVE is again active and the LEVEL mode (MLL) is selectable.

Backing Down an FUS Step.

The occupant backs the wheelchair 100 to an FUS 301 step in the LEVEL (MLL) or STAIR (MSL) mode. When caster backing to approach an FUS step (CST_APR_FUS) is sensed, the mode switches to STAIR mode if not already in STAIR mode. See FIG. 1C. In the STAIR mode, the wheelchair control enters PHS_5, 4-WHEEL DRIVE. In PHS_5, with the pitch near the target (PTC_TG), the spider system 400 controls pitch (SPD_PC), the skid system 200 engages (SKD_ENG) and the caster system 300 engages (CST_ENG). The caster wheel 303 lowers to the lower horizontal surface 314 when the caster wheel-to-step ToF sensor 304 no longer indicates engagement to the upper horizontal surface 325. See FIG. 5C. The caster wheel 303 supports and the caster controls pitch (CST_PC) as required. The spider system 400 4-wheel backs down (BCK) the FUS 301 step in PHS_5 until the spider cams 401 engage (SPDR_ENGD) on the lower side, the rear drive wheels 602 are not supporting (not RDW_SUPT) and the skid system 200 is not low (not SKD_LOW). This invokes PHS_6 and resets the travel distance (DR_TRVL). See FIG. 11.

In PHS_6, FDW & CSTR SUPT, the spider system 400 controls engagement (SPD_EN_CAM) to an engagement target (SPD_EN_TG) if engaged (SPDR_ENGD) or if not engaged the spider system 400 position controls (SPD_PN) to target a spider angle (SD_ANG) of 37° (SPD_PN_TG for PHS_6). This lowers the rear drive wheels 602 for supporting later in PHS_5. The caster wheel 303 pitch controls CST_PC and the skid system engages (SKD_ENG). The drive wheels 606 back the wheelchair (DR_JS_ST). PHS_6 continues until the drive wheels 606 travels backward (BCK) 3 inches (DR_TRVL=−3) and PHS_5 is re-invoked. The wheelchair 100 continues backing down in PHS_5 until the skid system 200 is on the same level as the drive wheels 606 and caster wheel 303. LEVEL mode (MLL) is again selectable.

Backing Up a Low FDS 428 Step

The wheelchair 100 backs up (BCK) to an FDS 410, 428 step, in the LEVEL mode (MLL) and PHS_1 or in the STAIR mode (MSL) and PHS_5. When the runner deflection sensing device 305 senses the caster runners 319 are engaged (CST_RN_ENGD), STAIR mode (MSL) is invoked if not in STAIR mode. The rear step sensor 322 and caster wheel sensor 304 monitor the rear step height (WR_HT) to determine if the FDS step is a rear low FDS 428 step (RE_LO_STP) or a rear high FDS 410 step (RE_HI_STP). See FIG. 5F. If the rear step height is a low rear FDS step 428 (RE_LO_STP) and the wheelchair 100 is backing (BCK), caster runners 319 are engaged (CST_RN_ENGD); then PHS_3 is invoked. In PHS_3, 4-WHEEL BACKING, the wheelchair 100 4-wheel backs up a low FDS 428 step with the skid system engaging (SKD_ENG), the spider controlling pitch (SPD_PC), the caster system 300 engaging (CST_ENG) and joystick steering (DR_JS_ST). PHS_3 ends when the spider system 400 is engaged (SPDR_ENGD) or the rear drive wheels 602 are lifted to an FDS step 428 landing (SPDR_ON_FDS) and PHS_5 is invoked. Level mode (MLL) is selectable when the LEVEL mode (MLL) criteria is met.

Backing Up a High FDS 410 Step

If a high rear step (RE_HI_STP) is sensed rather than a rear low step (RE_LO_STP), PHS_9A will be invoked and the wheelchair 100 will step up a high FDS 410 step by spider system 400 rotation. In PHS_9A, SPIDER TIP ROTATION, the caster wheel 303 engages (CST_ENG) to caster engagement target (CST_EMT) to the lower surface 100 while the spider system 400 is rotating (SPD_RO). See FIG. 1C. Caster engagement (CST_EMT=max of CST_RN_EMT*not PHS_9A or CWT_EMT) excluding caster runner engagement in PHS_9A to force caster wheel 303 to engage the lower surface 100. This ensures that the spider cam tip 427 has rotated down below the height of an FDS 410 step only a small height above a rear low step FDS 428 (RE_LO_STP). Thus assuring a positive spider cam engagement in the following PHS_9. See FIG. 6C. The skid system 200 pitch controls (SKD_PC) and the drive wheels 606 caster steer (DR_CST_STR). PHS_9A ends when SD_ANG reaches 60° and then PHS_9 is invoked.

In PHS_9, SPIDER CLIMB, with skid system 200 supporting (SKD_SUPT) and caster runners 319 engaged (CST_RN_ENGD), the spider system 400 rotates (SPD_RO) increasing (SD_ANG) to ascend when backing (BCK). The caster system 300 engages (CST_ENG). The skid system 200 pitch controls (SKD_PC) to pitch target (PTC_TG for PHS_9). The drive wheels 602 spider cam steer (DR_CAM_STR) to engage the spider cams 401 if the spider is engaged (SPDR_ENGD) or the caster runners 319 are not engaged (not CST_RN_ENGD). See FIG. 6D. If the caster runners are engaged (CST_RN_ENGD) and the spider is not (not SPDR_ENGD), the drive wheels 606 caster steer (DR_CST_STR_LH and DR_CST_STR_RH). See FIG. 5F. The drive wheels caster steer to a target (DR_CST_EN_TG=16) higher than the caster runner engage target (CST_EN_TG=12) to force the caster runners up to allow the spiders to engage the FDS 410 step riser for maintaining the drive wheels on the tread. See FIG. 6C. When the supporting drive wheels 602 passes under the center of gravity, the balance will shift from front to rear and the skid system 200 will no longer balance and support. When the skid system 200 is no longer supporting (not SKD_SUPT) and the caster system 300 is supporting (CST_SUPT), the skid system 200 will engage (SKD_ENG) and the caster system 300 will pitch control (CST_PC) to pitch target (PTC_TG). Balance and engage duties will swap between skid system 200 and caster system 300 as climbing continues from step-to-step. PHS_7B is invoked from PHS_9 when the spider system 400 ascends to an FDS 410, 428 step landing.

In PHS_7B, SPIDER ASCEND LANDING. drive wheel travel (DR_TRVL) is reset when PHS_7B is invoked. The drive wheels 606 travel at a speed per joystick deflection (DR_JS_ST). The skid system 200 pitch controls (SKD_PC). The caster system 300 engages (CST_ENG). The spider system 400 controls to a position angle (SPD_PN) per a function of drive wheel travel for PHS_7B (SPD_PN_TG). PHS_7B ends when the forward drive wheels (FDW) 601 are on the landing as indicated by the forward drive wheels 601 engaged (FDW_ENGD), and PHS_5 is invoked or when caster runner becomes engaged (CST_RN_ENGD) and PHS_9 is invoked.

When backing (BCK) on to an FDS 203 upper landing from a step or stairs, travel is slowed or halted by a travel speed factor (TRVL_OK) to allow the skid system 200 to track the FDS 203 step edge without supporting (not SKD_SUPT). See FIG. 1C. A special PHS_5 case named SKD_LFT_5_OK is invoked when the skid system 200 is low (SKD_LOW), the skid runners 204 are engaged (SKD_RN_ENGD), and the wheelchair is backing (BCK) on to an FDS 203 upper landing. In PHS_5 with SKD_LFT_5_OK, the drive wheels 606 target skid engagement (DR_SKD_EN_LH and DR_SKD_EN_RH). The skid system position controls (SKD_PN) to the full up position (SKD_PN_TG) unless they are pitch controlling (SKD_PC) because the pitch is low (PTC_LO). The caster engages (CST_ENG). The spider controls pitch (SPD_PC) if the skid system 200 is not full up (not SKD_UP). If the skid system 200 is full up (SKD_UP) the spider system 400 rotates to control skid engagement (SPD_EN_SKD). Once the wheelchair is fully on the landing with the skid system 200 no longer low (not SKD_LOW), the skid runners 204 are no longer engaged (not SKD_RN_ENGD) or not backing (BCK), SKD_LFT_5_OK ends. With skid system 200, caster system 300, and lower drive wheels 601/602 all resting or engaging the horizontal surface 101, LEVEL (MLL) mode selection is again available.

Ascending Stairs

Ascending the first stair step is identical to backing up an FDS 410, 428 step, as discussed previously in BACKING UP A HIGH FDS 410 STEP with LEVEL mode converting to STAIR mode and ascending with PHS_9A and PHS_9. Step ascending may continue in PHS_9 with pitch control cycling from one step to another between skid system pitch control (SKD_PC) and caster pitch control (CST_PC). Or with ascending to a landing phase (PHS_7B) as described above may be invoked for ascending to a landing as the lower spider drive wheels 601/602 become level (SPDR_ON_STP) and other PHS_7B criteria is met at any step. PHS_7B ends when caster runner 319 becomes engaged (CST_RN_ENGD) at an intermediate step or when the front drive wheels 601 are engaged (FDW_ENGD) on the landing. Ascending to the landing proceeds like described above for BACKING UP A HIGH FDS 410 STEP with PHS_5 with SKD_LFT_5_OK and PHS_5 with LEVEL mode (MLL) available for selection.

Descending Stairs or Advancing Down an FDS 410 Step.

The wheelchair advances (ADV) toward a step in the LEVEL (MLL) and PHS_1 or in the STAIR (MSL) mode and PHS_5. When the wheelchair 100 advances on a landing to an FDS 410 down step or descending stairs, skid approaching a down step is sensed (SKD_APR_FDS), and the STAIR mode (MSL) and PHS_5 are invoked if not already in STAIR mode (MSL). The wheelchair enters PHS_5 and the advancing (ADV) continues. The skid system 200 extends as it engages (SKD_ENG) the step edge. If the skid system 200 disengages as traveling continues, the wheelchair 100 travel halts with a zero-value drive speed factor (TRVL_OK=0 for not SKD_CST_NB_SUPT). The skid system 200 rapidly extends until the skid system 200 engages a lower step (SKD_ENGD) and advancing (ADV) restarts. Once the FDW 601 begins to depart the step as indicated by FDS_ADV_P5 and other PHS_7D criteria is met, the control is switched to PHS_7D and descending begins with spider rotation (SPD_RO).

In PHS_7D, SPIDER DESCEND LANDING, the drive wheel travel value (DR_TRVL) is reset to zero when invoked. The drive wheels 606 travel per joystick deflection (DR_JS_ST). The skid system 200 pitch controls (SKD_PC) to a pitch target (PTC_TG). The spider system 400 angle position is controlled (SPD_PN) to a target function (SPD_PN_TG) for PHS_7D of drive wheel travel (DR_TRVL). The caster system 300 engages (CST_ENG). PHS_7D ends when the spider system 400 is at an angle which provides substantial spider crowd engagement as indicated by SD_ANG<23° and then PHS_9 is invoked when no other mode is active.

PHS_9 for descending is the same as for ascending, with the drive wheels 606 caster steering (DR_CST_STR_LH and DR_CST_STR_RH) if caster runners are engaged (CST_RN_ENGD) and spider not engaged (not SPDR_ENGD), otherwise the drive wheels will spider cam steer (DR_CAM_STR_LH and DR_CAM_STR_RH). The spider system 400 rotates to descend (SPD_RO=+JLE* (BCK−ADV)*SPDR_OK) per forward joystick direction and deflection. The skid system 200 or caster system 300 pitch controls (SKD_PC or CST_PC) depending on which is supporting (SKD_SUPT or CST_SUPT and will engage (SKD_ENG or CST_ENG) if not supporting. The pitch target (PTC_TG) is raised if the skid runners 204 are supporting (SKD_RN_SUPT) or lowered if the caster runners 319 are supporting (CST_RN_SUPT) as discussed in DETAIL DESCRIPTION for FIG. 14A though FIG. 14D.

Step descending continues, cycling in PHS_9 with pitch control cycling between skid pitch control (SKD_PC) and caster pitch control (CST_PC). Once the wheelchair 100 is back on the lower landing with the two lower drive wheels 601/602, the skid system 200 and caster system 300 are all on the same level 101, the LEVEL mode (MLL) is again selectable.

Slope Travel

SLOPE mode (MPL) may be invoked from the LEVEL mode (MLL) by pressing the slope mode request switch (QPL). SMALL ANGLE SLOPE mode (MP1) is invoked by default if the criteria for DOWN-SLOPE mode (MP2) or UP-SLOPE mode (MP3) is not met. MP1 operation is similar to PHS_5 with the spider system 400 controlling pitch (SPD_PC) when the pitch (CHR_ATT) is within the spider pitch control range (PTC_S_RG), the skid system 200 assisting pitch control with pitch low (PTC_LO) and caster system 300 assisting pitch control (CST_PC) when the pitch is high (PTC_HI). The skid system 200 and caster system 300 engage (SKD_ENG and CST_ENG) when not controlling pitch. Drive wheel 606 travel is joystick controlled (DR_JS_ST). Travel speed is reduced by a speed factor (TRVL_OK) to allow balancing adjustment or slowly approaching operation limits and reversing before reaching them.

The mode switches to the DOWN-SLOPE mode (MP2) when the wheelchair 100 descends from a horizontal landing 456 to a steep down-slope 455 as indicated by the spider system 400 becoming engaged (SPDR_ENGD) on a sharp transition from a horizontal surface 456 to a sloped surface 455 and the caster wheel 303 is not supporting (not CWT_SUPT). See FIG. 13B and FIG. 15A. The mode also switches to the DOWN-SLOPE mode (MP2) when the slope 455 increases and the spider system 400 rotates to less than 26° (SD_ANG<26°) and with the caster wheel 303 not supporting (not CWT_SUPT). See FIG. 13A and FIG. 15A In the DOWN-SLOPE mode (MP2), the skid system 200 pitch controls (SKD_PC). The spider system 400 position controls (SPD_PN) to target SD_ANG to 32° (SPD_PN_TG=32°) which assures the rear drive wheel (RDW) 602 supporting (RDW_SUPT) and not the front drive wheel (FDW) 601 supporting (not FDW_SUPT) when the wheelchair 100 ascends to a horizontal landing 456 with a level pitch (CHR_ATT=0). This avoids spider crowd engagement (SPDR_ENGD) and the need for further spider system 400 rotation when transitioning from a slope 455 to a horizontal surface 456. The caster system 300 engages (CST_ENG). The drive wheels 606 are joystick steered (DR_JS_ST). The slope mode (MPL) returns to SMALL ANGLE SLOPE mode (MP1) when the slope decreases to 5° as indicated by a skid angle less than 27° (SKD_ANG<) 27°.

The slope mode (MPL) switches from the MP1 mode, to the MP3, UP-SLOPE mode when the spider system 400 angle (SD_ANG) exceeds 39° (SD_ANG)>39° and the pitch is high (PTC_HI) or when the skid system 200 is full up (SKD_UP), skid wheels 207 supporting (KWT_SUPT) and the pitch is high (PTC_HI). See FIG. 13C and FIG. 15B. In MP3, the skid system 200 position controls (SKD_PN) to the full up position (SKD_UP to SKD_PN_TG=0) if supporting (SKD_SUPT) or skid engage (SKD_ENG) if not supporting. The spider system 400 controls skid system 200 engagement (SPD_EN_SKD) if slope angle limiting angle criteria for UP-SLOPE mode is met (M3_SPD_LM_OK) or skid engagement (SKD_EMT) is less than the skid engage target (SKD_EMT<SKD_EN_TG). The caster system 300 controls pitch (CST_PC). The drive wheels 606 are joystick steered (DR_JS_ST). The UP-SLOPE mode (MP3) ends when the caster wheel 303 is no longer supporting (not CWT_SUPT) or the wheelchair pitch is low (PTC_LO).

Travel speed (DR_JS_ST) is limited in the slope mode (MPL) by the drive speed factor (TRVL_OK) which includes MPL_T_OK. The travel slowing allows time to correct the issue or the occupant to reverse direction to avoid an operational limit.

Although the description above contains many specificities, these should not be construed as limiting the scope of the invention but as merely providing illustrations of some of the presently preferred embodiments of this invention. For example, the spiders 403 could have four spider spokes 402 instead of three; the invention could be used to transport other cargo, mechanical arms, cameras etc.; other technologies could be used to sense distances to stair surfaces; criteria, duties, and phases could vary, linear actuators could be replaced by rotary actuators and so on. Values are provided to promote an understanding of functions, however the values could and will vary depending upon the particular embodiment of the invention. Gain factors for command and other functions are needed but are not included to simplify the equations.

Thus, the scope of the invention should be determined by the appended claims and their legal equivalents, rather than by the examples given.

REFERENCE NUMERALS

100 stair-climbing wheelchair
101 horizontal surface
102 gearbox
103 electrical motor drives
104 controller
105 seatback
106 control device
107 motor drive/battery box
108 hinge pins
109 seat back latch pins
110 left turn rotary sensor
111 right turn rotary sensor
112 left travel feedback signal
113 right travel feedback signal
114 inclinometer pitch signal
115 inclinometer roll signal
116 legrest extend switch, EX_LR
117 legrest retract switch, RT_LR
118 raise seat switch, RS_ST
119 lower seat switch, LW_ST
120 Level mode request switch, QLL
121 Slope mode request switch, QPL
200 skid system
201 forward facing up step, FUS
202 forward step ToF sensor
203 forward facing down step, FDS
204 skid runner
205 skid wheel-to-step height sensor
206 runner deflection sensing device
207 skid wheel
208 forward step sensor path
209 skid wheel-to-step height path
210 skid crossbar
211 skid torque tube
212 skid system bogie
213 stabilizing links
214 gearbox rotary points
215 skid actuator
216 skid runner rotary sensor
217 skid wheel and runner mount
218 skid runner link C
219 skid runner bogie B
220 skid runner bellcrank A
221 rotary attach points
222 extension spring
223 FDS step force 224 skid position rotary sensor
225 step tread
226 front step surface
227 forward step reading, KLFT_RD or KRFT_RD
228 forward step height, KLFT_HT or KRFT_HT
229 skid wheel sensor to step reading, KWT_RD
230 skid wheel-to-step height, KWT_HT
231 wheelchair forward step height, WF_HT
300 caster system
301 forward facing up step, FUS
302 forward facing down step, FDS
303 caster wheel
304 caster wheel height ToF sensor
305 runner deflection sensing device
306 caster position rotary sensor
307 caster system bogie B
308 stabilizing links C
309 rotary attach points
310 caster actuator
311 caster torque tube A
312 caster runner position sensor
313 caster wheel step height sensor path
314 horizontal surface
315 runner link F
316 rotary attach points
317 extension spring
318 runner bellcrank E
319 caster runner
320 caster runner bogie D
321 FDS step force
322 rear step height sensor
323 rear step height sensor path
324 15° up slope
325 upper horizontal surface
326 rear step sensor reading, RSTP_RD
327 rear step height for FUS 301, WR_HT
328 forward down step for an FDS 410, WR_HT
329 caster wheel-to-step reading, CWT_RD
330 caster wheel-to-step height, CWT_HT
331 surface below caster wheel
332 wheelchair rear step height, WR_HT
400 spider system
401 spider cam
402 spider spoke
403 spider
404 spider cam post
405 spider internal cam
406 cam-engaging arm
407 spider cam angle rotary sensor
408 spider rotation rotary sensor
409 spider shaft
410 forward facing down step, FDS
411 front drive wheel-to-step height sensor
412 rear drive wheel-to-step height sensor
413 spider cam gear
414 cam angle sensing gear
415 spider cam angle sensing system
416 spider cam preloading system
417 cam loading spring
418 spider angle sensor gearing
419 FDW step height sensor path
420 RDW step height sensor path
421 deflected spider cam
422 spider cam post
423 spider cam post
424 cam-engaging arm
425 spider cam post
426 forward facing down step, FDS
427 spider cam tip
428 RE_LO_STP
429 undeflected spider cam
430 deflected spider cam
431 cam loading force
432 spider cam post
433 spider cam post
434 undeflected spider cam
435 spider cam post
436 internal cam
437 large diameter hub
438 spring loading arm
439 arm stops
440 loading arm rotary axis
441 spring loading link
442 spider shaft angle gear
443 spider angle sensing gear
444 drive motor brake system
445 drive motor brake gear
446 Drive brake idler gear
447 brake gear
448 brake release arm
449 brake release bolts
450 brake release rod
451 brake release pivot
452 brake attach cover
453 lower horizontal surface
454 forward step landing, FUS
455 steep down slope
456 horizontal surface
457 aft frame horizontal line
458 spoke centerline
459 step engaging surface
460 spider cam rotary axis
461 spider central axis
500 spider drive system
501 spider motor
502 spider motor brake
503 spider motor gear
504 spider brake gear
505 spider brake idler
506 first stage planetary carrier C
507 gear B
508 gear D
509 fixed internal gear A
510 first stage ring gear E
511 sun gear H
512 planet gear G
513 second stage carrier I
514 second stage fixed internal gear F
600 drive wheel system
601 front drive wheel, FDW
602 rear drive wheel, RDW
603 drive wheel motor
604 central gear A
605 drive wheel gear train
606 drive wheels
607 drive motor brake
608 manual release handle
609 dog clutch
610 gear B
611 gear C
612 gear D
613 drive wheel axle
700 legrest system
701 legrest 702 virtual legrest hinge line
703 folding footrest
704 seated occupant legs
705 seat
706 forward facing up step, FUS
707 four-bar linkage
708 torque tube link A
709 stabilizing link B
710 intermediate link C
711 seat frame rotary points
712 legrest link D
713 legrest actuator
714 legrest position sensor
800 seat height adjustment system
801 seat frame
802 torque tube scissors link A
803 rotary attach point
804 scissors link B
805 scissors link pivot
806 seat frame guide slot
807 rotary attach point
808 gearbox guide slot
809 scissors actuator
810 scissors position sensor
900 horizontal
901 notional frame horizontal
902 pitch target
903 skid full down and supporting, SKD_SUPT
904 caster raised (CST_RSD=CST_ANG>13°)
905 (SKD_DWN: SKD_ANG=96°)
906 spider cam 401 contacting the step riser
907 caster not raised (not CST_RSD=CST_ANG<13°)
908 caster not raised
909 lower drive wheel resting on a lower level
911 forward down step height limit (FDS_HI)
912 frame level
913 upper drive wheel on upper landing and axis resting directly above step riser
914 caster raised
915 caster raised (CST_RSD=CST_ANG>13°)
916 front sensor to step height 411 reading (FWD_RD)
917 rear drive wheel sensor 412 to step height reading (RDW_RD)
918 forward down step height (FDS_HT)
919 spider rotation angle for skid lifting for FUS ascending limit
920 FUS step limit height
921 skid system full up
923 limiting down-slope angle
924 down-slope skid angle limit
925 (SPDR_LV_SPT=SD_ANG=32°)
926 caster raised (CST_RSD=CST_ANG>13°)
927 skid above lower limit for down-slope angle
928 rear drive wheel positioned for supporting on a level surface
929 caster raised for down slope
930 spider angle limit for UP-SLOPE mode (SD_ANG<41°)
931 skid system raised (SKD_RSD=SKD_ANG<9.5°)
932 skid system full up
933 limiting up-slope angle
934 spider positioned for front drive wheel contacting limiting up-slope
935 caster full down
936 skid angle for skid not raised (not SKD_RSD=SKD_ANG>9.5°)
937 CST_DWN=CST_ANG=−17°
938 skid not raised
939 fore and aft distance between the sensors
940 wheelchair pitch (CHR_ATT)
941 pitch height effect
950 front spider spoke angle (180°−SD_ANG)
951 spider spoke angle, SD_ANG
952 front drive wheel sensor 411 reading FDW_RD
953 front down step height, FDW_HT
954 wheel engagement range, W_EN_RG
955 front drive wheel engagement distance, FDW_ED
956 RDW sensor 412 reading, RDW_RD
957 rear drive wheel height, RDW_HT
958 rear drive wheel engagement distance, RDW_ED
960 CG 7.0° forward margin
961 Nominal CG
962 CG 3.5° aft margin

The invention claimed is:

1. A motorized vehicle with means to invoke a stair-climbing mode from a normal level mode when encountering step obstacles comprising:
   A. a frame;
   B. a LEVEL mode (MLL) comprising a default condition of operation adapted for a substantially horizontal surface;
   C. a STAIR mode (MSL) comprising a stair-climbing mode adapted for single or multiple step-climbing;
   D. a front balancing means or a skid system comprising an actuating means, a skid wheel pair, and a skid runner pair; said skid runner comprising articulating and biasing means;
   E. a rear balancing means or a caster system comprising an actuating means, a caster wheel or caster wheel pair, and a caster runner pair; said caster runner comprising articulating and biasing means;
   F. a spider system comprising a wheel cluster or a spider rotably mounted to the left and right side of said frame; said spider system further comprising a plurality of drive wheels mounted to spider spokes about a central axis; a spider system rotation means comprising a motor rotationally linked to said spider pair by a common shaft; a front drive wheel comprising a lower forward drive wheel; a rear drive wheel comprising a lower aft drive wheel; a spider pitch control duty (SPD_PC) comprising spider rotation with four drive wheels resting on a surface and targeting a pitch target (PTC_TG);
   G. a spider cam comprising one step engaging surface for each drive wheel; said spider cam rotary axis parallel to the spider system central axis and located aft of said spider central axis; where said spider cam contacting a step edge causes said spider cam to rotate relative to said spider spokes;
   H. a control system comprising sensors, algorithms, and motor controls;
   I. a plurality of sensing means comprising;
      a. a skid system position sensing means comprising a skid system position rotary sensor; a skid system angle (SKD_ANG); a skid system full up position indication (SKD_UP) comprising a zero said skid system angle (SKD_ANG) at the full up position; a low skid system indication (SKD_LOW) comprising said skid system angle (SKD_ANG) consistent with said skid wheel pair below a step landing;
      b. a caster runner engagement sensing means comprising a rotary sensor monitoring deflection of said caster runner; a caster runner engagement value (CSLA_EMT and CSRA_EMT) comprising a caster runner engagement sensing reading measured from the undeflected position; a caster runner engagement range comprising full deflection of said caster runner to a stop; a caster runner supporting indication (CST_RN_SUPT) comprising said caster runner engagement value (CSLA_EMT and CSRA_EMT) equal to caster runner engagement range; a caster runner engaged indication (CST_RN_ENGD) comprising a positive said caster runner engagement value (CSLA_EMT and CSRA_EMT);

c. a spider rotation angle sensing means comprising a rotary sensor rotationally linked to said spider system; a spider system angle (SD_ANG) comprising an angle measured from an aft frame horizontal line relative to the centerline of the nearest lower spoke centerline; a lower drive wheels horizontal indication (SPDR_ON_STP) comprising a predetermined range of said spider system angle (SD_ANG) range values with lower said drive wheel pairs substantially parallel to a notional frame horizontal plane; a 4-wheel drive spider angle range (SPDR_4WD) comprising a predetermined range of said spider system angle (SD_ANG) range values for spider negotiating up and down step with two lower drive wheels;

d. a spider cam angle sensing means comprising a rotary sensor rotationally linking said spider cam to said frame; a spider cam angle (SL_ANG or SR_ANG) consistent with spider angle when said spider cam is undeflected; a spider crowd engagement value (CWD_LFT or CWD_RHT) comprising said spider system angle (SD_ANG) minus said spider cam angle (SL_ANG or SR_ANG); a spider cam engaged indication (SPDR_ENGD) comprising a positive said spider crowd engagement value (CWD_LFT or CWD_RHT);

e. a motor drive velocity signal comprising a voltage or PWM signal from a motor drive; a vehicle advancing indication (ADV) comprising a motor drive velocity signal range consistent with the vehicle advancing; a vehicle backing indication (BCK) comprising a second motor drive velocity signal range consistent with the vehicle backing;

f. a caster wheel height sensing means comprising a distance sensor mounted on a caster wheel bogie or mount adjacent to said caster wheel and aimed down; a caster wheel height sensor reading (CWT_RD); a caster wheel-to-step height (CWT_HT) comprising said caster wheel height sensor reading (CWT_RD) minus the vertical distance from the sensor to the caster wheel lower surface; a wheel engagement range (W_EN_RG) comprising a small predetermined height; a caster wheel engagement value (CWT_EMT) comprising said wheel engagement range (W_EN_RG) minus caster wheel-to step height; a caster wheel engaged indication (CWT_ENGD) comprising a positive said caster wheel engagement value (CWT_EMT); a caster wheel supporting indication (CWT_SUPT) comprising said caster wheel engagement value (CWT_EMT) equal to said wheel engagement range (W_EN_RG);

g. a forward step height sensing means comprising a distance sensor attached to a bogie or mount for said skid wheel and aimed down and forward of the said motorized vehicle; a forward step height sensor reading (KLFT_RD or KRFT_RD); a skid wheel-to-forward step height (KLFT_HT or KRFT_HT) comprising a vertical distance from said sensor to a surface below said skid wheel subtracted from said forward step height sensor reading (KLFT_RD or KRFT_RD); a forward step engagement value (KLFT_EMT or KRFT_EMT) comprising said skid wheel-to-forward step height (KLFT_HT or KRFT_HT) subtracted from said wheel engagement range (W_EN_RG); a forward step engaged indication (KFT_ENGD) comprising a positive said forward step engagement value (KLFT_EMT or KRFT_EMT) and said vehicle advancing indication (ADV);

h. a skid wheel height sensing means comprising a distance sensor mounted on a skid wheel mount adjacent to said skid wheel and aimed down; a skid wheel height sensor reading (KWT_RD); a skid wheel-to-step height (KWT_HT) comprising said skid wheel height sensor reading (KWT_RD) minus the vertical distance from the sensor to below said skid wheel; a skid wheel engagement value (KW_EMT) comprising said wheel engagement range (W_EN_RG) minus said skid wheel-to-step height (KWT_HT); a skid wheel supporting indication (KWT_SUPT) comprising said skid wheel engagement value (KW_EMT) equal to said wheel engagement range (W_EN_RG);

i. a skid runner engagement sensing means comprising a rotary sensor monitoring deflection of said skid runner; a skid runner engagement value (KGLA_EMT or KGRA_EMT) comprising a sensor reading measured from the undeflected position; a skid runner supporting indication (SKD_RN_SUPT) comprising said skid runner engagement value (KGLA_EMT or KGRA_EMT) consistent with full runner deflection travel;

j. a skid system engagement value (SKD_EMT) comprising the maximum value of said skid runner engagement value (KGLA_EMT or KGRA_EMT), said forward step engagement value (KLFT_EMT or KRFT_EMT), and skid wheel engagement value (KW_EMT); a skid engagement target (SKD_EN_TG) comprising a predetermined mid-range said skid system engagement value (SKD_EMT);

k. a wheelchair forward step height value (WF_HT) comprising largest of said skid wheel-to-forward step height (KLFT_HT or KRFT_HT) minus said skid wheel-to-step height (KWT_HT);

(WF_HT=KLFT_HT−KWT_HT) or (WF_HT=KRFT_HT−KWT_HT);

l. a skid system advancing and approaching a forward facing down step indication (SKD_APR_FUS) comprising said vehicle advancing indication (ADV) and a negative said wheelchair forward step height value (WF_HT) less than a predetermine value consistent with the operational limit for normal level travel;

m. a skid system advancing to a forward facing up step indication (SKD_APR_FUS) comprising said vehicle advancing indication (ADV) and said wheelchair forward step height value (WF_HT) greater than a predetermine value consistent with the operational limit for normal level travel and said vehicle advancing indication (ADV);

n. a front drive wheels height sensing means comprising a distance sensor mounted on said frame adjacent to said front drive wheels and aimed down; a front drive wheels-to-step sensor reading (LFDW_RD or RFDW_RD) comprising the distance below said front drive wheels height sensing means to a surface; a front drive wheels-to-step height (FDW_HT) comprising a height below said front drive wheels to a surface computed from a function of front drive wheels sensor installation geometry, spider spoke geometry, drive wheel geometry, said spider system angle (SD_ANG) and said front drive wheels-to-step sensor reading (LFDW_RD or RFDW_RD); a front drive wheels engagement value (FDW_EMT) comprising said wheel engagement range (W_EN_RG) minus said front drive wheels-to-step height (FDW_HT); a front drive wheels supporting indication (FDW_SUPT) comprising said front drive wheels engagement value equal to said wheel engagement range (W_EN_RG) (FDW_EMT=W_EN_RG);
- o. a rear drive wheels height sensing means comprising a distance sensor mounted on said frame adjacent to said rear drive wheels and aimed down; a rear drive wheels-to-step sensor reading (RDW_RD) comprising the distance below said rear drive wheels height sensing means to a surface; a rear drive wheels-to-step height (RDW_HT) comprising a height below said rear drive wheels to a surface computed from a function of rear drive wheels sensor installation geometry, spider spoke geometry, drive wheel geometry, said spider system angle (SD_ANG) and said rear drive wheels-to-step sensor reading (RDW_RD); a rear drive wheels engagement value (RDW_EMT) comprising said wheel engagement range (W_EN_RG) minus said rear drive wheels-to-step height (RDW_HT); a rear drive wheels supporting indication (RDW_SUPT) comprising rear drive wheels engagement value (RDW_EMT) equal to said wheel engagement range (W_EN_RG);
- p. a rear step height sensing means comprising a distance sensor attached to a bogie or mount for said caster wheel and aimed down and behind said motorized vehicle; a rear step height sensor reading (RSTP_RD); a wheelchair rear step height value (WR_HT) comprising said rear step height sensor reading (RSTP_RD) minus a vertical distance from said sensor to a surface below the underside of said caster wheel plus said caster wheel-to-step height (CWT_HT);
- q. a caster system backing toward a forward facing up step indication (CST_APR_FUS) comprising said vehicle backing indication (BCK) and said wheelchair rear step height value (WR_HT) consistent with a small predetermined height below said caster wheel;
J. a LEVEL mode request switch (QLL); an algorithm for invoking said LEVEL mode (MLL) comprising a request by said LEVEL mode request switch (QLL) and said lower drive wheels horizontal indication (SPDR_ON_STP);
K. an algorithm for invoking said STAIR mode (MSL) from said LEVEL mode (MLL) comprising:
- a. said spider cam engaged indication (SPDR_ENGD),
- b. not said 4-wheel drive spider angle range (not SPDR_4WD),
- c. said skid system advancing to a forward facing up step indication (SKD_APR_FUS),
- d. said skid system advancing and approaching a forward facing down step indication (SKD_APR_FDS),
- e. said caster system backing toward a forward facing up step indication (CST_APR_FUS), or
- f. said caster runner engaged indication (CST_RN_ENGD);

whereby said motorized vehicle will accept a request for level travel if appropriate or automatically switch to stair-climbing when indicated.

2. Said motorized vehicle as disclosed in claim 1, with a stair-climbing control phase (PHS_9A) for rotating said spider system and spider cam tips to a low position for engaging spider low height steps when backing comprising:
A. a plurality of sensors and criteria comprising:
- a. a small rear step height (RE_LO_STP) comprising said wheelchair rear step height value (WR_HT) in a range from a small positive value to a predetermined low step height;
- b. a high rear step height (RE_HI_STP) comprising said wheelchair rear step height value (WR_HT) above said small rear step height (RE_LO_STP);
- c. a trimmed spider cam tip for backing over said small height rear steps comprising spider cam tip trimmed above said small rear step height (RE_LO_STP) with lower drive wheels horizontal;
- d. an engaging high steps spider angle (SPD_HI_STP) comprising said spider system angle (SD_ANG) consistent with said trimmed spider cam tip rotated below said small rear step height (RE_LO_STP);
B. a skid pitch control duty (SKD_PC) comprising commanding said skid system to control said frame pitch angle (CHR_ATT) to a predetermined said frame pitch target (PTC_TG) by raising or lowering said skid wheels and said skid runners;
C. an algorithm for backing over said small rear step height (RE_LO_STP) steps (PHS_3) comprising said frame balancing comprising said spider system rotation; said algorithm invoked by said vehicle backing indication (BCK), said caster runner engaged indication (CST_RN_ENGD), and said small rear step height (RE_LO_STP);
D. a caster engaging duty (CST_ENG) said caster wheel to a lower surface (CWT_EMT) comprising said caster system controlling caster engagement target which includes said caster wheel and excludes said caster runners;
E. an algorithm for ascending steps at said high rear step height (RE_HI_STP) (PHS_9A) comprising rotating said spider system to said engaging high steps spider angle (SPD_HI_STP) with said caster engaging duty (CST_ENG) targeting caster wheel engagement (CWT_EMT) to a lower surface before continuing backing; said skid pitch control duty (SKD_PC) controlling pitch; invoked by said vehicle backing indication (BCK), said caster runner engaged indication (CST_RN_ENGD) and said high rear step height (RE_HI_STP);

whereby the motorized vehicle can back over a small step with the spider cam tips clearing the small step or said vehicle can ascend a slightly higher step with the spider cam tips engaging step edges.

3. Said motorized vehicle as disclosed in claim 1, comprising means to resist step obstacles beyond said motorized vehicle capability further comprising:
A. a plurality of sensors comprising:
- a. a skid system full down position indication (SKD_DWN) comprising said skid system angle (SKD_ANG) at a predetermined angle consistent with the full down position;

b. a caster system position sensing means comprising a caster system position rotary sensor; a caster system angle (CST_ANG); a caster system raised position indication (CST_RSD) comprising said caster system angle (CST_ANG) above a predetermine value consistent with normal level travel; a caster system full down position indication (CST_DWN) comprising said caster system angle (CST_ANG) consistent with said caster system at the full down position;

c. a frame pitch angle sensing means comprising an inclinometer sensing the pitch angle of a notional horizontal frame plane; a frame pitch angle (CHR_ATT); a frame pitch target (PTC_TG) comprising a predetermined pitch angle or equation; a pitch frame level indication (PTC_LVL) comprising said frame pitch angle (CHR_ATT) within a level pitch range comprising said frame pitch target (PTC_TG) plus and minus a small angle range; a pitch frame high indication (PTC_HI) comprising said frame pitch angle (CHR_ATT) above said level pitch range; a low pitch indication (PTC_LO) comprising said frame pitch angle (CHR_ATT) below said level pitch range;

d. a forward down step height value (FDS_HT) comprising said front drive wheels-to-step sensor reading (LFDW_RD or RFDW_RD) minus said rear drive wheels-to-step sensor reading (RDW_RD) and minus the fore and aft distance between said sensors times the sine of said frame pitch angle (CHR_ATT) with said two sensors at the same height on said frame;

e. a forward down step height limit (FDS_HI) comprising a step height consistent with said pitch frame level indication (PTC_LVL), said spider cam contacting the step riser, said spider system rotated to a position with a lower drive wheel resting on a lower level, and an upper drive wheel resting on an upper level, and drive wheel rotation axis directly above said step riser;

f. a down step height for climbing OK indication (DN_STP_OK) comprising said forward down step height value (FDS_HT) less than said forward down step height limit (FDS_HI);

g. a starting from a lower landing indication comprising said caster system raised position indication (CST_RSD);

h. a starting from an upper landing indication comprising not said caster system raised position indication (not CST_RSD);

i. a skid system supporting indication (SKD_SUPT) comprising either skid wheel supporting indication or said skid runner supporting indication (SKD_RN_SUPT);

j. a skid system can raise pitch indication (SKD_CN_R_PTC) comprising not said skid system full down position indication (SKD_DWN) and not said skid system supporting indication (not SKD_SUPT) and not said low pitch indication (not PTC_LO);

k. a full up skid system condition comprising said skid system full up position indication (SKD_UP) and said skid system supporting indication (SKD_SUPT);

l. a spider angle for forward step OK indication (SPD_FUS_OK) comprising said spider system angle (SD_ANG) consistent with spider system rotated to lift said full up skid system condition to step height corresponding to a predetermined operational step height limit for ascending a forward facing up step;

B. a stair angle OK for backing to ascend from a lower landing indication (STR_BCK_OK) comprising;
   a. said vehicle backing indication (BCK) and said starting from a lower landing indication and said skid system can raise pitch indication (SKD_CN_R_PTC) or
   b. said vehicle advancing indication (ADV) or
   c. not in STAIR mode (not MSL);

C. a stair angle OK for advancing to descend an upper landing indication (STR_ADV_OK) comprising;
   a. said vehicle advancing indication (ADV) and said starting from an upper landing indication and said skid system can raise pitch indication (SKD_CN_R_PTC) or
   b. said vehicle backing indication (BCK) or
   c. not in STAIR mode (not MSL);

D. step height OK for backing to ascend a forward facing down step indication (FDS_BCK_OK) comprising:
   a. said vehicle backing indication (BCK) and said starting from a lower landing indication and said down step height for climbing OK indication (DN_STP_OK) or
   b. said vehicle advancing indication (ADV) or
   c. not in STAIR mode (not MSL);

E. a step height OK for advancing to descend a forward facing down step indication (FDS_ADV_OK) comprising:
   a. said vehicle advancing indication (ADV) said starting from an upper landing indication and said down step height for climbing OK indication (DN_STP_OK) or
   b. said vehicle backing indication (BCK) or
   c. not in STAIR mode (not MSL);

F. a step height OK for advancing to ascend a forward facing up step indication (FUS_ADV_OK) comprising:
   a. said vehicle advancing indication (ADV), and said spider system angle (SD_ANG) for forward step OK indication (SPD_FUS_OK) or
   b. said vehicle backing indication (BCK) or
   c. not in STAIR mode (not MSL);

G. a step height OK for backing to descend a forward facing up step indication (FUS_BCK_OK) comprising:
   a. said vehicle backing indication (BCK) and said caster wheel engaged indication (CWT_ENGD) and not said pitch frame high indication (not PTC_HI) or
   b. said vehicle advancing indication (ADV) or
   c. not in STAIR mode (not MSL);

H. step operational limits OK for travel (MSL_T_OK) comprising:
   a. said stair angle OK for backing to ascend from a lower landing indication (STR_BCK_OK),
   b. said stair angle OK for advancing to descend an upper landing indication (STR_ADV_OK),
   c. said step height OK for backing to ascend a forward facing down step indication (FDS_BCK_OK),
   d. said step height OK for advancing to descend a forward facing down step indication (FDS_ADV_OK),
   e. said step height OK for advancing to ascend a forward facing up step indication (FUS_ADV_OK) and
   f. said step height OK for backing to descend a forward facing up step indication (FUS_BCK_OK);

I. a significantly reduced vehicle travel speed factor (TRVL_OK) when not within operational limits (not MSL_T_OK)

whereby approaching an operational limit reduces vehicle speed, alerting the operator to retreat and permitting retreating without speed reduction.

4. Said motorized vehicle as disclosed in claim 1 being adapted for step-climbing with said spider system rotating through angles with said lower drive wheels horizontal indication (SPDR_ON_STP) and between spider spoke angles with limited or without said spider cam contacting a step edge; comprising a control means to rotate said spider system further comprising:

A. a plurality of sensing means comprising:
   a. a frame pitch angle sensing means comprising an inclinometer; a frame pitch angle (CHR_ATT) comprising the sensed pitch angle of a notional fore and aft frame horizontal line to the horizon; a frame pitch target (PTC_TG) comprising a predetermined pitch angle equation consistent with spider angles with limited exposure to step risers;
   b. a forward down step height value (FDS_HT) comprising said front drive wheels-to-step sensor reading (LFDW_RD or RFDW_RD) minus said rear drive wheels-to-step sensor reading (RDW_RD) and minus the fore and aft distance between said sensors times the sine of said frame pitch angle (CHR_ATT) with said two sensors at the same height on said frame;
   c. a drive wheels travel distance sensing means comprising motor control speed feedback and drive wheel geometry; a drive wheels travel distance value (LD_TRVL or RD_TRVL);
   d. a spider angle range for rear drive wheel support indication (SPDR_ON_FDS) comprising spider angle with said front drive wheels slightly lower than said rear drive wheels by a predetermined margin;
   e. a vehicle advancing to down step from an upper landing indication (FDS_ADV_P5) comprising said forward down step height value (FDS_HT) exceeding a predetermine value consistent with a high step, said lower drive wheels horizontal indication (SPDR_ON_STP) and not said caster runner engaged indication (not CST_RN_ENGD);
   m. a skid runner engagement sensing means comprising a rotary sensor monitoring deflection of said skid runner; a skid runner engagement value (KGLA_EMT or KGRA_EMT) comprising a sensor reading measured from the undeflected position; a skid runner supporting indication (SKD_RN_SUPT) comprising said skid runner engagement value (KGLA_EMT or KGRA_EMT) consistent with full deflection travel;
   f. a skid system supporting indication (SKD_SUPT) comprising either skid wheel supporting indication (KWT_SUPT) or said skid runner supporting indication (SKD_RN_SUPT);
B. a spider position control duty (SPD_PN) comprising commanding said spider system to control to said spider system angle target (SPD_PN_TG);
C. a skid pitch control duty (SKD_PC) comprising commanding said skid system to control said frame pitch angle (CHR_ATT) to a predetermined said frame pitch target (PTC_TG) by raising or lowering said skid wheels and skid runners,
D. an algorithm for ascending to a step landing (PHS_7B) comprising said spider position control duty (SPD_PN) with a spider ascending position target (SPD_PN_TG) as a function of said drive wheels travel distance value (LD_TRVL or RD_TRVL); further comprising said skid pitch control duty (SKD_PC) controlling pitch; said algorithm invoked at said vehicle backing indication (BCK) and said skid system supporting indication (SKD_SUPT) and said spider system angle range for rear drive wheel support indication (SPDR_ON_FDS) and not said caster runner engaged indication (not CST_RN_ENGD);
E. an algorithm for descending from a step (PHS_7D) comprising said spider position control duty (SPD_PN) with a spider descending position target (SPD_PN_TG) as a function of said drive wheels travel distance value (LD_TRVL or RD_TRVL); further comprising said skid pitch control duty (SKD_PC) controlling pitch; said algorithm invoked at said vehicle advancing to down step from an upper landing indication (FDS_ADV_P5);

whereby the spider can rotate to ascend to a step or descend from a step with said spider cam clearing step edges below front and rear lower drive wheels.

5. Said motorized vehicle as disclosed in claim 1 employing means to accommodate the horizontal component of a slanted runner balancing force comprising:

A. a SPIDER-CLIMB stair-climbing phase (PHS_9) comprising primary support by lower left and lower right drive wheels;
B. a plurality of sensors and indications comprising:
   a. a frame pitch angle sensing means comprising an inclinometer; a frame pitch angle (CHR_ATT) comprising the sensed pitch angle of a notional fore and aft frame horizontal line to the horizon; a frame pitch target (PTC_TG) comprising a predetermined pitch angle equation for shifting center of gravity for balancing;
   b. a skid runner engagement sensing means comprising a rotary sensor monitoring deflection of said skid runner; a skid runner engagement value (KGLA_EMT or KGRA_EMT) comprising a sensor reading measured from the undeflected position; a skid runner supporting indication (SKD_RN_SUPT) comprising said skid runner engagement value (KGLA_EMT or KGRA_EMT) consistent with full deflection travel;
   c. a center of gravity forward of supporting drive wheels indication comprising said skid runner supporting indication (SKD_RN_SUPT);
   d. a center of gravity aft of supporting drive wheels indication comprising said caster runner supporting indication (CST_RN_SUPT);
C. an algorithm with traction requirement reduction means comprising reducing supporting force horizontal component of a slanted skid runner by tending to balance center of gravity over supporting drive wheels by adjusting said frame pitch angle (CHR_ATT) to balancing said frame pitch target (PTC_TG);
D. a means for moving the center of gravity aft toward the supporting drive wheels comprising raising the said frame pitch angle (CHR_ATT); raising said frame pitch angle (CHR_ATT) comprising lowering said skid system to raise said frame pitch angle (CHR_ATT) to said frame pitch target (PTC_TG) comprising a function of said SPIDER-CLIMB stair-climbing phase (PHS_9), said skid runner engagement value (KGLA_EMT or KGRA_EMT), and not said caster runner supporting indication (not CST_RN_SUPT);

E. an algorithm with traction requirement reduction means comprising reducing supporting force horizontal component of a slanted caster runner by tending to balance center of gravity over supporting drive wheels by adjusting said frame pitch angle (CHR_ATT) to balancing said frame pitch target (PTC_TG);

F. a means for moving the center of gravity forward toward the supporting drive wheels comprising lowering said frame pitch angle (CHR_ATT); lowering said frame pitch angle (CHR_ATT) comprising lowering the caster system to lower said frame pitch angle (CHR_ATT) to said frame pitch target (PTC_TG) comprising a function of said SPIDER-CLIMB stair-climbing phase (PHS_9), caster runner engagement value (CSLA_EMT and CSRA_EMT), and not said skid runner supporting indication (not SKD_RN_SUPT);

whereby said motorized vehicle maintains traction on lower coefficient of friction stair treads.

6. Said motorized vehicle as disclosed in claim 1 adapted for forward facing up step ascending, comprising:

A. A plurality of sensors and indications comprising:
  a. a drive wheels travel distance sensing means comprising motor control speed feedback and drive wheel geometry; a drive wheels travel distance value (LD_TRVL or RD_TRVL);
  b. front drive wheels on forward facing up step edge indication (SPDR_ON_FUS) comprising said spider system angle (SD_ANG) increased to an angle consistent with said front drive wheel higher than said rear drive wheel and said front drive wheels supporting indication (FDW_SUPT);
  c. a caster system position sensing means comprising a caster system position rotary sensor; a caster system angle (CST_ANG); a caster system level position indication (CST_HORZ) comprising said caster system angle (CST_ANG) at predetermine value consistent with normal level travel;
  d. a leg rest raised indication (LR_LFT) comprising leg rest in a raised position consistent with a height suitable for clearing forward facing steps;

B. a skid engagement duty (SKD_ENG) comprising raising and lowering said skid wheels and said skid runners and targeting said skid system engagement value (SKD_EMT) to a predetermined said skid engagement target (SKD_EN_TG);

C. a spider controlling skid system engagement duty (SPD_EN_SKD) comprising rotating spider to raise or lower said skid system and targeting said skid system engagement value (SKD_EMT) to a predetermined said skid engagement target (SKD_EN_TG);

D. an advancing and skid system lifting to a forward facing up step means (PHS_2) comprising:
  a. an algorithm for not said skid system full up position indication (not SKD_UP) comprising said skid engagement duty (SKD_ENG) to lift said skid wheels to a forward facing up step landing;
  b. an algorithm for said skid system full up position indication (SKD_UP) comprising said spider controlling skid system engagement duty (SPD_EN_SKD) to lift said skid wheels by skid engagement (SKD_EMT) to a forward facing up step landing;

E. a 4-wheel operational phase (PHS_5) comprising two wheels of left and right spiders contacting the supporting surface with said spider pitch control duty (SPD_PC);

F. a spider position control duty (SPD_PN) comprising commanding said spider system to control to said spider system angle target (SPD_PN_TG);

G. a caster pitch control duty (CST_PC) comprising said caster system raising or lowering said caster wheel and said caster runners for controlling said frame pitch angle (CHR_ATT) to a predetermined said frame pitch target (PTC_TG);

H. a front drive wheels ascending a forward facing up step means comprising said 4-wheel operational phase (PHS_5) with said rear drive wheels forcing said front drive wheels against said forward up step, said front drive wheels gripping a forward up step edge and said front drive wheels rotating to ascend;

I. an advancing and lifting the rear drive wheels phase (PHS_8) comprising:
  a. an algorithm for not said spider cam engaged indication (not SPDR_ENGD) comprising said spider position control duty (SPD_PN) with spider position target (SPD_PN_TG) as a function of said drive wheels travel distance value (LD_TRVL or RD_TRVL) while said front drive wheels on forward facing up step edge indication (SPDR_ON_FUS) and said caster pitch control duty (CST_PC);
  b. an algorithm for said spider cam engaged indication (SPDR_ENGD) to rotating said spider system and targeting spider cam engagement (SPD_EN_CAM) to spider engage target (SPD_EN_TG);

J. a caster wheel lifting to a forward facing up step means (PHS_4) comprising an algorithm for lifting said caster wheel (CST_PN) to a predetermined caster position (CST_PN_TG) consistent with the level travel position (CST_HORZ); further comprising said vehicle advancing (DR_JS_ST) when said caster system is at the level travel position (CST_ANG=CST_HORZ) and until said caster wheel engaged indication (CWT_ENGD);

K. an algorithm sequence for forward ascending a forward facing up step comprising:
  a. said advancing and skid system lifting to a forward facing up step means (PHS_2) invoked by said leg rest raised indication (LR_LFT) and said skid system advancing to a forward facing up step indication (SKD_APR_FUS);
  b. said front drive wheels ascending a forward facing up step means occurring with said front drive wheels advancing to a forward facing up step in said 4-wheel operational phase (PHS_5);
  c. said advancing and lifting the rear drive wheels phase (PHS_8) invoked by said vehicle advancing indication (ADV), said spider cam engaged indication (SPDR_ENGD) and said front drive wheels on forward facing up step edge indication (SPDR_ON_FUS) and ending at said lower drive wheels horizontal indication (SPDR_ON_STP) and said rear drive wheels supporting indication (RDW_SUPT);
  d. said caster wheel lifting to a forward facing up step means (PHS_4) invoked when said advancing and lifting the rear drive wheels phase (PHS_8) ends;
  e. said caster wheel lifting to a forward facing up step means (PHS_4) ends at said caster system level position indication (CST_HORZ) and said caster wheel engaged (CWT_ENGD) and then invoking said 4-wheel operational phase (PHS_5);

whereby said motorized vehicle can ascend a forward facing up step.

7. Said motorized vehicle as disclosed in claim 1 adapted for backing down a forward facing up step (PHS_6), comprising:
   A. a plurality of sensors and indications comprising:
      a. a drive wheels travel distance sensing means comprising motor control speed feedback and drive wheel geometry; a drive wheels travel distance value (LD_TRVL or RD_TRVL);
      b. a spider crowd engagement target (SPD_EN_TG) comprising a predetermined spider crowd engagement value (CWD_LFT or CWD_RHT) in the midrange of spider crowd engagement;
   B. a 4-wheel operational phase (PHS_5) comprising two wheels of left and right spiders contacting the supporting surface with said spider pitch control duty (SPD_PC);
   C. a spider position control duty (SPD_PN) comprising commanding said spider system to control to said spider system angle target (SPD_PN_TG)
   D. a caster pitch control duty (CST_PC) comprising said caster system raising or lowering said caster wheel and said caster runners for controlling said frame pitch angle (CHR_ATT) to a predetermined said frame pitch target (PTC_TG);
   E. a backing down a forward facing up step phase (PHS_6), comprising said spider system rotating (SPDR_ENG) to target said spider crowd engagement target (SPD_EN_TG) for said spider cam engaged indication (SPDR_ENGD); for not at said spider cam engaged indication (not SPDR_ENGD) further comprising said spider position control duty (SPD_PN) to a predetermined said spider low step target (SPD_PN_TG) for said rear wheels on a lower step; further comprising said caster pitch control duty (CST_PC); further comprising said phase ending at a predetermined said drive wheels travel distance value (LD_TRVL or RD_TRVL) consistent with allowing said rear drive wheels to reach the lower landing and ensure that said spider cams are disengaged;
   F. an algorithm sequence for backing and descending a forward facing up step comprising:
      a. a backing in said 4-wheel operational phase (PHS_5) toward a forward facing up step;
      b. said backing down a forward facing up step phase (PHS_6) invoked at said vehicle backing indication (BCK), in said 4-wheel operational phase (PHS_5), said spider cam engaged indication (SPDR_ENGD), not said rear drive wheels supporting indication (not RDW_SUPT), and not said low skid system indication (not SKD_LOW);
      c. resume backing away from a forward facing up step in said 4-wheel operational phase (PHS_5);
      whereby said vehicle can backward descend forward facing up steps with limited spider rotation consistent with support by the same four supporting drive wheels.

8. Said motorized vehicle as disclosed in claim 1 for use as a wheelchair further comprising a seat for occupant seating.

9. A stair-climbing wheelchair as disclosed in claim 8 adapted for compact transport means comprising a folding seat back and articulated leg rest comprising:
   A. a hinged joint connecting the seat back to the seat bottom and a lockable connection to hold the seat back in the normal position and a lockable condition for a stowed position;
   B. a legrest with folding footrest comprising a powered articulation for compact positioning comprising folding the footrest and positioning said legrest near said frame;
   whereby the wheelchair can be stowed compactly for automobile or air transport.

10. A stair-climbing wheelchair as disclosed in claim 8 adapted for seat height adjustment comprising a power operated articulated seat.

11. A wheelchair as disclosed in claim 8 adapted for lifting feet for forward step-climbing comprising power operated legrest.

12. A motorized vehicle adapted for multiple slope ranges comprising:
   A. a frame;
   B. a LEVEL mode (MLL) comprising a default condition of operation adapted for substantially horizontal surfaces;
   C. a SLOPE mode (MPL) adapted for slopes;
   D. a front balancing means or a skid system comprising an actuating means, a skid wheel pair, and a skid runner pair; said skid runner comprising articulating and biasing means;
   E. a rear balancing means or a caster system comprising an actuating means, a caster wheel or caster wheel pair, and a caster runner pair; said caster runner comprising articulating and biasing means;
   F. a spider system comprising a wheel cluster or a spider rotably mounted to the left and right side of said frame; said spider system further comprising a plurality of drive wheels mounted to spider spokes about a central axis; a spider system rotation means comprising a motor rotationally linked to said spider pairs by a common shaft; a front drive wheel comprising a lower forward drive wheel; a rear drive wheel comprising a lower aft drive wheel;
   G. a spider cam comprising one step engaging surface for each drive wheel; said spider cam rotary axis parallel to the spider system central axis and located aft of said spider central axis; where said spider cam contacting a slope edge causes said spider cam to rotate relative to said spider spokes;
   H. a control system comprising sensors, algorithms, and motor controls;
   I. a plurality of sensing means and indications comprising:
      a. a spider system angle sensing means comprising a rotary sensor rotationally linked to said spider system; a spider system angle (SD_ANG) comprising an angle measured from an aft frame horizontal line relative to the centerline of the nearest lower spoke centerline; a 4-wheel drive spider range indication (SPDR_4WD) comprising a predetermined range of said spider system angles (SD_ANG) consistent with front and rear drive wheels contacting up obstacles and down obstacles; a spider positioned for rear drive wheels support indication (SPDR_LV_SPT) comprising said spider system rotated to a predetermined spider system angle (SD_ANG) range values consistent with said rear drive wheels rotated down slightly lower than said front drive wheel pairs ensuring said rear drive wheels support on a level surface with said frame at said level pitch angle;
      b. a spider cam angle sensing means comprising a rotary sensor rotationally linking said spider cam to said frame; a spider cam angle (SL_ANG or SR_ANG); a spider crowd engagement value (CWD_LFT or CWD_RHT) comprising said spider system angle (SD_ANG) minus said spider cam angle (SL_ANG or SR_ANG); a spider cam engaged indication (SPDR_ENGD) comprising a positive said spider crowd engagement value (CWD_LFT or CWD_RHT);

c. a frame pitch angle sensing means comprising an inclinometer sensing the pitch angle of a notional frame horizontal plane; a frame pitch angle (CHR_ATT); a frame pitch target (PTC_TG) comprising a predetermined pitch angle or equation; a pitch frame level indication (PTC_LVL) comprising said frame pitch angle (CHR_ATT) within a level pitch range comprising said frame pitch target (PTC_TG) plus and minus a small angle range; a pitch frame high indication (PTC_HI) comprising said frame pitch angle (CHR_ATT) above said level pitch range; a low pitch indication (PTC_LO) comprising said frame pitch angle (CHR_ATT) below said level pitch range;

d. a rear drive wheels height sensing means comprising a distance sensor mounted on said frame adjacent to said rear drive wheels and aimed down; a rear drive wheels-to-step sensor reading (RDW_RD) comprising the distance below said rear drive wheels height sensing means to a surface; a rear drive wheels-to-step height (RDW_HT) comprising a height below said rear drive wheels to a surface computed from a function of rear drive wheels sensor installation geometry, spider spoke geometry, drive wheel geometry, said spider system angle (SD_ANG) and said rear drive wheels-to-step sensor reading (RDW_RD); a wheel engagement range (W_EN_RG) comprising a small predetermined height; a rear drive wheels engagement value (RDW_EMT) comprising said wheel engagement range (W_EN_RG) minus said rear drive wheels-to-step height (RDW_HT);

e. a motor drive velocity signal; a vehicle advancing indication (ADV) comprising a motor drive velocity signal range consistent with the vehicle advancing; a vehicle backing indication (BCK) comprising a second motor drive velocity signal range consistent with the vehicle backing;

f. a LEVEL mode request switch (QLL); an algorithm for invoking said LEVEL mode (MLL) comprising a request by said LEVEL mode request switch (QLL) and said 4-wheel drive spider range indication;

g. a SLOPE mode request switch (QPL); a SLOPE mode (MPL) invoked by said LEVEL mode (MLL) and said SLOPE mode request switch (QPL) depressed;

h. a control system comprising sensors, algorithms, and motor controls;

i. a down-slope comprising a slope falling in front of the vehicle and rising behind the vehicle;

j. an up-slope comprising a slope rising in front of the vehicle and falling behind the vehicle;

J. a subset of slope modes for multiple slope angle ranges comprising;

a. a SMALL-ANGLE-SLOPE mode (MP1) comprising support by said front drive wheel pairs and said rear drive wheels; leveling means comprising said spider system rotation;

b. a DOWN-SLOPE mode (MP2) comprising said skid system and said rear drive wheels supporting; leveling means comprising said skid system positioning;

c. an UP-SLOPE mode (MP3) comprising said front drive wheel pairs and said caster system supporting; leveling means comprising caster system position control;

whereby fore and aft pitch stability is maintained by locating center of gravity between alternate sets of supporting wheels depending on slope direction.

13. Said motorized vehicle as disclosed in claim 12 adapted for slopes with multiple slope modes further comprising:

A. a plurality of sensors comprising;

a. a skid wheel height sensing means comprising a distance sensor mounted on a skid wheel bogie or mount adjacent to said skid wheel and aimed down; a skid wheel height sensor reading (KWT_RD); a skid wheel-to-step height (KWT_HT) comprising said skid wheel height sensor reading (KWT_RD) minus the vertical distance from the sensor to below said skid wheel; a skid wheel engagement value (KW_EMT) comprising said wheel engagement range (W_EN_RG) minus said skid wheel-to-step height (KWT_HT); a skid wheel supporting indication (KWT_SUPT) comprising said skid wheel engagement value (KW_EMT) equal to said wheel engagement range (W_EN_RG);

b. a skid system engagement value (SKD_EMT) comprising the said skid wheel engagement value (KW_EMT); a skid engagement target (SKD_EN_TG) comprising a predetermined mid-range of said skid system engagement value (SKD_EMT);

c. a skid system position sensing means comprising a skid system position rotary sensor; a skid system angle (SKD_ANG); a skid system full up position indication (SKD_UP) comprising said skid system angle (SKD_ANG) consistent with said skid system in a full up position;

d. a caster wheel height sensing means comprising a distance sensor mounted on a caster wheel mount adjacent to said caster wheel and aimed down; a caster wheel height sensor reading (CWT_RD); a caster wheel-to-step height (CWT_HT) comprising said caster wheel height sensor reading (CWT_RD) minus the vertical distance from the sensor to below said caster wheel; a caster wheel engagement value (CWT_EMT) comprising said wheel engagement range (W_EN_RG) minus caster wheel-to-step height (CWT_HT); a caster wheel supporting indication (CWT_SUPT) comprising said caster wheel engagement value (CWT_EMT) equal to said wheel engagement range (W_EN_RG);

e. a sharp angle transition to said down-slope from a horizontal indication comprising said SMALL-ANGLE-SLOPE mode (MP1), said spider cam engaged indication (SPDR_ENGD) and not said caster wheel supporting indication (not CWT_SUPT);

B. a motorized vehicle on a steep down slope indication comprising said spider system at said spider system angle (SD_ANG) consistent with a steep down-slope and not said caster wheel supporting indication (not CWT_SUPT);

C. a motorized vehicle on a steep up-slope indication comprising said spider system at said spider system angle (SD_ANG) consistent with a steep up-slope;
D. a SMALL-ANGLE-SLOPE mode (MP1) to invoke comprising said SLOPE mode (MPL), not said DOWN-SLOPE mode (not MP2), and not said UP-SLOPE mode (not MP3);
E. a spider position control duty (SPD_PN) comprising commanding said spider system to control to said spider system angle target (SPD_PN_TG);
F. a skid pitch control duty (SKD_PC) comprising commanding said skid system to control said frame pitch angle (CHR_ATT) to a predetermined said frame pitch target (PTC_TG) by raising or lowering said skid wheels and said skid runners;
G. said SMALL-ANGLE-SLOPE mode algorithm comprising:
 a. a skid engagement duty (SKD_ENG) comprising raising and lowering said skid wheels and said skid runners and targeting said skid system engagement value (SKD_EMT) to a predetermined said skid engagement target (SKD_EN_TG),
 b. a spider pitch control duty (SPD_PC) comprising commanding spider rotation with four drive wheels resting on a surface to control said frame pitch angle (CHR_ATT) to a predetermined said frame pitch target (PTC_TG) by controlling said spider system angle (SD_ANG),
 c. a caster engaging duty (CST_ENG) comprising commanding said caster system to control said caster wheel engagement value (CWT_EMT) to a predetermined caster wheel engagement target (CST_EN_TG), and
 d. a joystick travel speed and direction control duty (DR_JS_ST_LH and DR_JS_ST_RH) comprising commanding said left drive wheels and said right drive wheels to speeds related to joystick deflection;
H. said SMALL-ANGLE-SLOPE mode (MP1) ended by invoking LEVEL mode (MLL), DOWN-SLOPE mode (MP2) or UP-SLOPE mode (MP3);
I. a DOWN-SLOPE mode (MP2) invoked by said SMALL-ANGLE-SLOPE mode (MP1) and:
 a. said motorized vehicle descending said sharp angle transition to said down-slope from a horizontal indication or
 b. said motorized vehicle on a steep down slope indication;
J. said DOWN-SLOPE mode (MP2) algorithm comprising:
 a. said skid pitch control duty (SKD_PC) controlling pitch;
 b. said spider position control duty (SPD_PN) with SPD_PN_TG consistent with said spider system positioned for rear drive wheels support indication (SPDR_LV_SPT),
 c. a caster engaging duty (CST_ENG) commanding said caster system to control said caster wheel engagement value (CWT_EMT) to a predetermined caster wheel engagement target (CST_EN_TG), and
 d. a joystick travel speed and direction control duty (DR_JS_ST_LH and DR_JS_ST_RH) comprising commanding said left drive wheels and said right drive wheels to speeds related to joystick deflection;
K. said DOWN-SLOPE mode (MP2) ending comprising said skid system rise to said skid system angle (SKD_ANG) consistent with a small angle slope;
L. an UP-SLOPE mode (MP3) invoked by said SMALL-ANGLE-SLOPE mode (MP1) and:
 a. said motorized vehicle on said steep up-slope indication and said pitch frame high indication (PTC_HI), or
 b. said skid system full up position indication (SKD_UP) and said skid wheel supporting indication (KWT_SUPT);
M. said UP-SLOPE (MP3) mode algorithm comprising:
 a. a skid position control duty (SKD_PN) commanding said skid system to position control said skid system angle (SKD_ANG) to a skid position target (SKD_PN_TG); said skid position control duty (SKD_PN) targeting said skid position target (SKD_PN_TG consistent with said skid system full up position indication (SKD_UP),
 b. a spider engaging skid duty (SPD_EN_SKD) commanding said spider system to control said spider system angle (SD_ANG) to target a predetermined skid engagement value (SKD_EMT) by rotating said spider system to raise or lower said skid wheels by controlling said frame pitch angle (CHR_ATT);
 c. a caster pitch control duty (CST_PC) comprising said caster system raising or lowering said caster wheel and said caster runners for controlling said frame pitch angle (CHR_ATT) to a predetermined said frame pitch target (PTC_TG);
 d. a joystick travel speed and direction control duty (DR_JS_ST_LH and DR_JS_ST_RH) comprising commanding said left drive wheels and said right drive wheels to speeds related to joystick deflection;
N. said UP-SLOPE mode (MP3) ending comprising said not said caster wheel supporting indication (not CWT_SUPT) or said low pitch indication (PTC_LO);
whereby said motorized vehicle can negotiate a plurality of surface angle ranges and invoke operation modes suited for each range.

14. Said motorized vehicle as disclosed in claim 12 adapted for slopes, comprising a means to resist travel on slope angles beyond motorized vehicle operational limits further comprising:
A. a plurality of sensors comprising:
 a. a skid system position sensing means comprising a skid system position rotary sensor; a skid system angle (SKD_ANG); a skid system raised indication (SKD_RSD) comprising said skid system angle (SKD_ANG) consistent with said skid system raised above the normal position for level travel; a skid system full up position indication (SKD_UP) comprising said skid system angle (SKD_ANG) consistent with said skid system in a full up position;
 b. a caster position sensing means comprising a caster system position rotary sensor; a caster system angle (CST_ANG); a caster system raised position indication (CST_RSD) comprising said caster system angle (CST_ANG) above a predetermine value consistent with normal level travel; a caster system full down position indication (CST_DWN) comprising said caster system angle (CST_ANG) consistent with said caster system at the full down position;
B. a backing up said down-slope from a lower landing indication comprising said caster system at said caster system raised position indication (CST_RSD);
C. an advancing down said down-slope from an upper landing indication comprising said caster system not at said caster system raised position (not CST_RSD);

D. an advancing up said up-slope from a lower landing indication comprising said skid system at said skid system raised indication (SKD_RSD);
E. a backing down said up-slope from an upper landing indication comprising said skid system not at said skid system raised indication (not SKD_RSD);
F. a caster system can lower pitch indication (CST_CN_L_PTC) comprising said caster system not at said caster system full down position indication (CST_DWN) and not at said pitch frame high indication (not PTC_HI);
G. a skid indicating down-slope angle OK indication (SKD_DN_SL_OK) comprising said skid system angle (SKD_ANG) consistent with skid wheel above a down-slope at a predetermine operational limit angle and said spider system positioned for rear drive wheels support indication (SPDR_LV_SPT);
H. an UP-SLOPE mode slope OK indication (M3_SPD_LM_OK) comprising said spider system angle (SD_ANG) less than an angle consistent with said front drive wheels contacting a surface connecting said skid wheels with said skid system at said skid system full up position indication (SKD_UP) to said caster wheel with said caster system at said caster system full down position indication (CST_DWN) and said pitch frame level indication (PTC_LVL);
I. a down-slope angle OK for backing to ascend indication (DSLP_BCK_OK) criteria comprising:
 a. said DOWN-SLOPE mode (MP2), said vehicle backing indication (BCK), said backing up said down-slope from a lower landing indication (CST_RSD), said skid indicating down-slope angle OK indication (SKD_DN_SL_OK) and DSLP_BCK_OK or
 b. said vehicle advancing indication (ADV) or
 c. not DOWN-SLOPE mode (not MP2);
J. A down-slope angle OK for advancing to descend indication (DSLP_ADV_OK) comprising:
 a. said DOWN-SLOPE mode (MP2), said vehicle advancing indication (ADV), said advancing down said down-slope from an upper landing indication (not CST_RSD), and said skid indicating down-slope angle OK indication (SKD_DN_SL_OK) or
 b. said vehicle backing indication (BCK) or
 c. not DOWN-SLOPE mode (MP2);
K. an up-slope angle OK for advancing to ascend indication (USLP_ADV_OK) comprising:
 a. said UP-SLOPE mode (MP3), said vehicle advancing indication (ADV), said advancing up said up-slope from a lower landing indication (SKD_RSD), said caster system can lower pitch indication (CST_CN_L_PTC), and said UP-SLOPE mode slope OK indication (M3_SPD_LM_OK) or
 b. said vehicle backing indication (BCK) or
 c. not said UP-SLOPE mode (not MP2);
L. an up-slope angle OK for backing to descend indication (USLP_BCK_OK) comprising:
 a. said UP-SLOPE mode (MP3), said vehicle backing indication (BCK), said backing down said up-slope from an upper landing indication (not SKD_RSD), said caster system can lower pitch indication (CST_CN_L_PTC), and said UP-SLOPE mode slope OK indication (M3_SPD_LM_OK) or
 b. said vehicle advancing indication (ADV) or
 c. not said UP-SLOPE mode (not MP3);
M. slope operational limits OK for travel (MPL_T_OK) comprising;
 a. said down-slope angle OK for backing to ascend indication (DSLP_BCK_OK),
 b. said down-slope angle OK for advancing to descend indication (DSLP_ADV_OK,
 a. said up-slope angle OK for advancing to ascend indication (USLP_ADV_OK) and
 c. said up-slope angle OK for backing to descend indication (USLP_BCK_OK);
N. a significantly reduced vehicle travel speed factor (TRVL_OK) when not within slope operational limits (not MPL_T_OK);
whereby approaching an operational limit reduces vehicle speed, alerting the operator to retreat and permitting retreating without speed reduction.

15. A motorized vehicle as disclosed in claim 12 for use as a wheelchair further comprising a seat for occupant seating.

16. A motorized vehicle with a cam for monitoring a wheel cluster or spider engagement to a step and further comprising a hole in the cam and a post for limiting rotation of the cam, further comprising:
A. a frame;
B. a spider system comprising a wheel cluster or a spider rotably mounted to the left and right side of said frame; said spider system comprising a plurality of drive wheels mounted to spider spokes about a central axis;
C. a balancing means comprising an actuated articulated member with balancing wheels and/or articulated runners attached;
D. a control system comprising sensors, algorithms, and motor controls;
E. a spider cam comprising one step engaging surface for each drive wheel; said spider cam rotary axis parallel to the spider system central axis and located aft of said spider central axis; where said spider cam contacting a step edge causes said spider cam to rotate relative to said spider spokes;
F. a plurality of sensors and indications comprising:
 a. a spider rotation angle sensing means comprising a rotary sensor rotationally linked to said spider system; a spider system angle (SD_ANG);
 b. a spider cam angle sensing means comprising a rotary sensor rotationally linking said spider cam to said frame; a spider cam angle (SL_ANG or SR_ANG) for left side or right side spider cam;
G. a means for urging said spider cam to match said spider rotation and a means for limiting said spider cam rotation by step contact comprising:
 a. posts mounted on said spider spokes,
 b. internal cams in said spider cam,
 c. said posts protruding into said internal cams in said spider cam,
 d. one area of the internal cam with a shape to limit the rotation of said spider cam for trailing said spider system rotation in unison,
 e. further comprising a spring-loaded connection between said spider system and said spider cam biasing said internal cam to contact said posts;
 f. a second area of said internal cams with a shape limiting said spider cam rotation resulting from step contact by a predetermined angle and
 g. a spider crowd engagement value (CWD_LFT or CWD_RHT) comprising said spider cam angle (SL_ANG or SR_ANG) subtracted from said spider system angle (SD_ANG);

whereby providing a more compact system for determining engagement of said spider system to a step edge and not needing adjustment and not subject to slippage over the previous means.

17. Said motorized vehicle as disclosed in claim 16, comprising spider to step edge engagement sensing with a rotary angle sensors further comprising;
 A. an absolute spider rotation angle sensing means comprising an absolute rotary angle sensor rotationally linked to rotate one revolution for each spider spoke; an absolute spider rotation angle (SD_ANG);
 B. an absolute spider cam angle sensing means comprising an absolute rotary angle sensor rotationally linked to rotate one revolution for each spider spoke; an absolute spider cam angle (SL_ANG or SR_ANG);
 C. an absolute spider crowd engagement angle comprising said absolute spider cam angle (SL_ANG or SR_ANG) subtracted from said absolute spider rotation angle (SD_ANG);
 whereby said control system can determine the spider crowd engagement at powering up regardless of the spider and spider cam positions at system powering down or after interrupting power.

18. Said motorized vehicle as disclosed in claim 16 for use as a wheelchair further comprising a seat for occupant seating.

* * * * *